US009967622B2

(12) United States Patent
Kitazato et al.

(10) Patent No.: US 9,967,622 B2
(45) Date of Patent: May 8, 2018

(54) RECEIVER, RECEPTION METHOD, PROGRAM, AND INFORMATION PROCESSING SYSTEM FOR UTILIZING A TRIGGER CORRELATION TABLE

(71) Applicant: Saturn Licensing LLC, New York, NY (US)

(72) Inventors: Naohisa Kitazato, Tokyo (JP); Yoshiharu Dewa, Tokyo (JP); Yasuaki Yamagishi, Kanagawa (JP); Jun Kitahara, Saitama (JP); Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days. days.

(21) Appl. No.: 13/741,863

(22) Filed: Jan. 15, 2013

(65) Prior Publication Data

US 2013/0191860 A1 Jul. 25, 2013

Related U.S. Application Data

(60) Provisional application No. 61/632,390, filed on Jan. 24, 2012, provisional application No. 61/596,020, filed on Feb. 7, 2012.

(51) Int. Cl.
*H04N 7/10* (2006.01)
*H04N 21/462* (2011.01)
(Continued)

(52) U.S. Cl.
CPC ..... *H04N 21/4622* (2013.01); *H04N 21/2362* (2013.01); *H04N 21/23614* (2013.01);
(Continued)

(58) Field of Classification Search
CPC .......................... H04N 21/858; H04N 21/8166
(Continued)

(56) References Cited

U.S. PATENT DOCUMENTS 6,460,180 B1    10/2002 Park et al.
2003/0065738 A1*    4/2003 Yang .................. G06F 8/65
                                                            709/215
(Continued)

FOREIGN PATENT DOCUMENTS

EP          1 487 214         12/2004
JP          2005-510145        4/2005
(Continued)

OTHER PUBLICATIONS

U.S. Appl. No. 13/562,946, filed Jul. 31, 2012, Eyer.
(Continued)

*Primary Examiner* — Gigi L Dubasky
(74) *Attorney, Agent, or Firm* — Oblon, McClelland, Maier & Neustadt, L.L.P.

(57) ABSTRACT

Disclosed herein is a receiver including: a reception section operable to receive AV content transmitted by a broadcasting wave; a trigger acquisition section operable to acquire trigger information adapted to operate an application program to be executed in response to the received AV content; a table acquisition section operable to acquire a correlation table correlating the trigger information to commands adapted to control the operation of the application program; an application acquisition section operable to acquire, based on the acquired correlation table, the application program transmitted by the broadcasting wave when the command correlated to the trigger information indicates the acquisition of the application program; and a control section operable to
(Continued)

control the operation of the acquired application program in accordance with the command correlated to the trigger information.

18 Claims, 35 Drawing Sheets

(51) Int. Cl.
    *H04N 21/236*     (2011.01)
    *H04N 21/2362*     (2011.01)
    *H04N 21/434*     (2011.01)
    *H04N 21/81*     (2011.01)
    *H04N 21/858*     (2011.01)

(52) U.S. Cl.
    CPC ..... *H04N 21/4345* (2013.01); *H04N 21/4348* (2013.01); *H04N 21/8173* (2013.01); *H04N 21/8586* (2013.01)

(58) Field of Classification Search
    USPC .......................................................... 725/32
    See application file for complete search history.

(56) References Cited

U.S. PATENT DOCUMENTS

| | | |
|---|---|---|
| 2005/0015802 A1 | 1/2005 | Masson |
| 2009/0276819 A1 | 11/2009 | Kim et al. |
| 2011/0075990 A1 | 3/2011 | Eyer |
| 2011/0088075 A1 | 4/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1* | 12/2011 | Eyer ............................ 348/563 |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0189010 A1* | 7/2012 | Lee et al. ....................... 370/392 |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1* | 1/2013 | Eyer ............................... 725/40 |
| 2013/0305308 A1* | 11/2013 | Lee ........................ H04H 20/28 725/116 |

FOREIGN PATENT DOCUMENTS

| | | |
|---|---|---|
| JP | 2010-166335 | 7/2010 |
| JP | 2011-41242 | 2/2011 |
| JP | 2011-066556 | 3/2011 |
| WO | WO 2011/074218 | 6/2011 |

OTHER PUBLICATIONS

U.S. Appl. No. 13/559,166, filed Jul. 26, 2012, Eyer.
U.S. Appl. No. 13/490,216, filed Jun. 6, 2012, Eyer.
U.S. Appl. No. 13/554,688, filed Jul. 20, 2012, Eyer.
U.S. Appl. No. 13/559,188, filed Jul. 26, 2012, Kitazato.
U.S. Appl. No. 13/527,435, filed Jun. 19, 2012, Eyer.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, Yamagishi.
U.S. Appl. No. 13/679,624, filed Nov. 16, 2012, Yamagishi.
U.S. Appl. No. 13/708,313, filed Dec. 7, 2012, Kitazato et al.
International Search Report dated Feb. 19, 2013 in PCT/JP2013./050410 filed on Jan. 11, 2013 (with English translation).
Extended European Search Report dated Sep. 7, 2015, in European Patent Application No. 13740646.8.

* cited by examiner

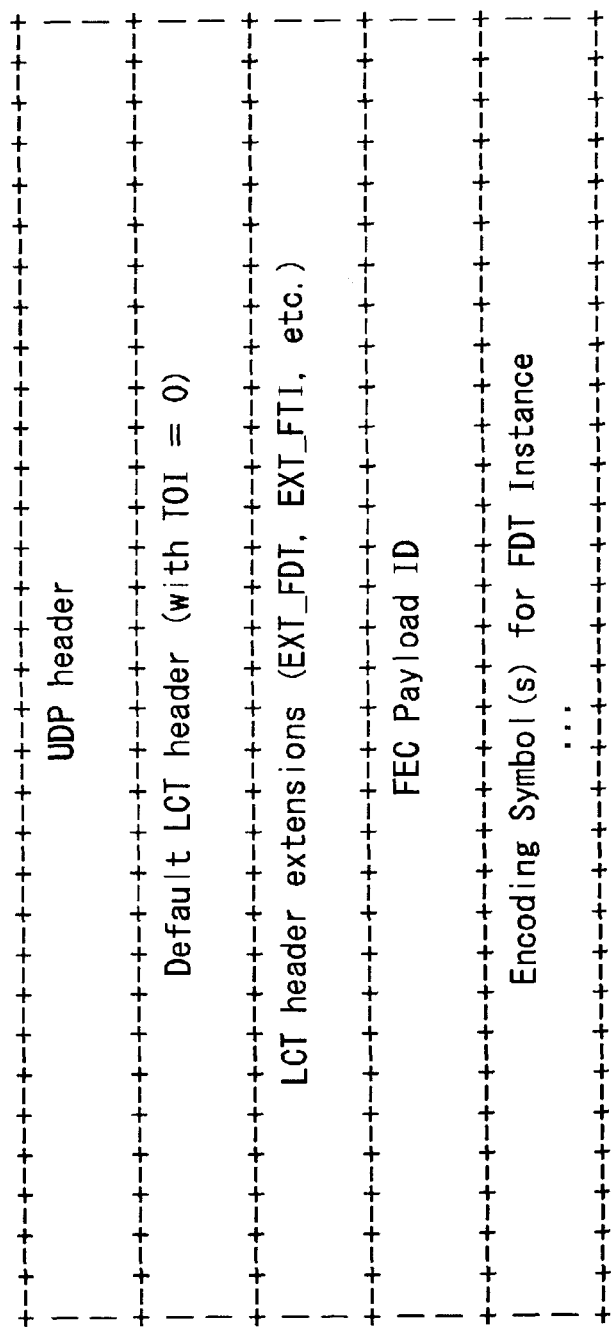

FIG. 7

```xml
<xs:schema xmlns:xs="http://www.w3.org/2001/XMLSchema" xmlns:fl="http://www.example.com/flute" targetNamespace="http://www.example.com/flute" elen
 <xs:element name="FDT-Instance">
  <xs:complexType>
   <xs:sequence>
    <xs:element name="File" maxOccurs="unbounded">
     <xs:complexType>
      <xs:attribute name="Content-Location" type="xs:anyURI" use="required"/>
      <xs:attribute name="TOI" type="xs:positiveInteger" use="required"/>
      <xs:attribute name="Content-Length" type="xs:unsignedLong" use="optional"/>
      <xs:attribute name="Transfer-Length" type="xs:unsignedLong" use="optional"/>
      <xs:attribute name="Content-Type" type="xs:string" use="optional"/>
      <xs:attribute name="Content-Encoding" type="xs:string" use="optional"/>
      <xs:attribute name="Content-MD5" type="xs:base64Binary" use="optional"/>
      <xs:attribute name="FEC-OTI-FEC-Encoding-ID" type="xs:unsignedLong" use="optional"/>
      <xs:attribute name="FEC-OTI-FEC-Instance-ID" type="xs:unsignedLong" use="optional"/>
      <xs:attribute name="FEC-OTI-Maximum-Source-Block-Length" type="xs:unsignedLong" use="optional"/>
      <xs:attribute name="FEC-OTI-Encoding-Symbol-Length" type="xs:unsignedLong" use="optional"/>
      <xs:attribute name="FEC-OTI-Max-Number-of-Encoding-Symbols" type="xs:unsignedLong" use="optional"/>
      <xs:anyAttribute processContents="skip"/>
     </xs:complexType>
    </xs:element>
   </xs:sequence>
   <xs:attribute name="Expires" type="xs:string" use="required"/>
   <xs:attribute name="Complete" type="xs:boolean" use="optional"/>
   <xs:attribute name="Content-Type" type="xs:string" use="optional"/>
   <xs:attribute name="Content-Encoding" type="xs:string" use="optional"/>
   <xs:attribute name="FEC-OTI-FEC-Encoding-ID" type="xs:unsignedLong" use="optional"/>
   <xs:attribute name="FEC-OTI-FEC-Instance-ID" type="xs:unsignedLong" use="optional"/>
   <xs:attribute name="FEC-OTI-Maximum-Source-Block-Length" type="xs:unsignedLong" use="optional"/>
   <xs:attribute name="FEC-OTI-Encoding-Symbol-Length" type="xs:unsignedLong" use="optional"/>
   <xs:attribute name="FEC-OTI-Max-Number-of-Encoding-Symbols" type="xs:unsignedLong" use="optional"/>
   <xs:anyAttribute processContents="skip"/>
  </xs:complexType>
 </xs:element>
</xs:schema>
```

FIG. 9

```
<?xml version="1.0" encoding="UTF-8"?>
<FDT-Instance xmlns:xsi="http://www.w3.org/2001/XMLSchema-instance"
 xmlns:fl="http://www.example.com/flute"
 xsi:schemaLocation="http://www.example.com/flute-fdt.xsd" Expires="2890842807">
<File
Content-Location="http://www.example.com/menu/tracklist.html"
Content-Linkage="id1"
TOI="1"
Content-Type="text/html"/>
<File
Content-Location="http://www.example.com/tracks/track1.mp3"
Content-Linkage="id2"
TOI="2"
Content-Length="6100"
Content-Type="audio/mp3"
Content-Encoding="gzip"
Content-MD5="+VP5IrWpIoFkZWc11iLDdA=="
Some-Private-Extension-Tag="abc123"/>
</FDT-Instance>
```

FIG.12

| item | description |
|---|---|
| program_id(Ch-ID) | The unique ID for the target program. Provider can define it freely. |
| media_time (MT) | The time stamp of the target time position of the program. |
| domain_name (URL) | The domain name of the provider's server (in which TPT files are located) |

FIG. 13

| Element/Attribute(with@) | | | | Number to be permitted | Description & Value |
|---|---|---|---|---|---|
| tpt | | | | | |
| | @id | | | 1 | domain_name/Program_id |
| | @type | | | 1 | "static", "dynamic" |
| | @version | | | 0..1 | TPT version number |
| | @updating_time | | | 0..1 | Supposed TPT updating duration(only for type="dynamic") |
| | @present_following | | | 0..1 | "present" "following" |
| | @end_mt | | | 0..1 | The end time for TPT time scope |
| | @expire_date | | | 0..1 | Expire date for caching TPT document.(only for type="static") |
| | command | | | 1..N | |
| | | @id | | 1 | Equal to Trigger_id |
| | | @start_time | | 0..1 | The start time of the command valid period |
| | | @end_time | | 0..1 | The end time of the command valid period |
| | | @destination | | 0..1 | Device type "receiver":receiver itself "external_1" external device type1 "external_2" external device type2 |
| | | @action | | 1 | Action "execute" "register" "suspend" "terminate" "event" |
| | | application | | 1 | Description for target App |
| | | | @id | 1 | App ID |
| | | | @type | 1 | App type |
| | | | @url | 0..1 | App URL |
| | | | @priority | 0..1 | Priority to Persist 1:High 0:Normal |
| | | | @expire_date | 0..1 | Expire date for caching the application |
| | | | capability | 0..N | Receiver required capability |
| | | | @essential | 0..1 | no: not essential yes:essential |
| | | event | | 0..1 | Description for event |
| | | | @id | 1 | Event ID |
| | | | data | 0..1 | Embedded data |
| | | diffusion | | 0..1 | Randomized diffusion of command execution timing |
| | | | @rate | 1 | Timing number of diffusion |
| | | | @range | 1 | Diffusion time range |
| | | | @period | 1 | Period for applying command diffusion(from start_time) |

FIG.14

Capability value

| value | Meaning |
|---|---|
| flute | FLUTE IS AVAILABLE. FLUTE IS USED TO TRANSMIT AN APPLICATION. |
| raptor | raptor IS AVAILABLE AS FEC. Raptor FEC IS USED FOR FLUTE TRANSMISSION. |
| html5 | HTML5 IS AVAILABLE IN THE BROWSER. DATA BROADCASTING APPLICATION IS IN HTML FORMAT. |
| browser_a | Browser Profile A (CE-HTML) IS AVAILABLE IN THE BROWSER. DATA BROADCASTING APPLICATION IS IN Profile A FORMAT. |
| mp4 | MP4 IS AVAILABLE. CONTENT ACTIVATED FROM A DATA BROADCASTING APPLICATION IS IN MP4 FORMAT. |
| zip | wrapper FOR Zip FORMAT OF Files IS AVAILABLE. |
| avc_40 | AVC level 4.0 IS AVAILABLE. CONTENT ACTIVATED FROM A DATA BROADCASTING APPLICATION IS CODED WITH AVC level 4.0. |
| avc_42 | AVC level 4.2 IS AVAILABLE. CONTENT ACTIVATED FROM A DATA BROADCASTING APPLICATION IS CODED WITH AVC level 4.2. |
| mp3 | MP3 IS AVAILABLE. AUDIO OF THE FILE USED BY A DATA BROADCASTING APPLICATION IS IN MP3 FORMAT. |
| he_aac | HE_AAC3 IS AVAILABLE. AUDIO OF THE FILE USED BY A DATA BROADCASTING APPLICATION IS IN AAC FORMAT. |
| dts | DTS IS AVAILABLE. AUDIO OF THE FILE USED BY A DATA BROADCASTING APPLICATION IS IN DTS FORMAT. |

FIG.15

```
<tpt id=xbc.com/1 type="static" expire_date="2011-01-21">
  <command id=1 start_time=0, end_time=600, destination="receiver" action="register">
    <application id="1" type="html" url="xxx.com/yyy1" expire_date="2011-01-21">
      <capability essential="no">flute</capability>
      <capability essential="yes">avc_40</capability>
  </command>
  <command id=2 start_time=600, end_time=3500, destination="receiver" action="execute">
    <application id="1" type="html" url="xxx.com/yyy1" expire_date="2011-01-21" />
    <diffusion rate=10 range=60 period=600 />
  </command>
  <command id=3 start_time=1800, end_time=2000, destination="receiver" action="event">
    <application id="1" />
    <event id="event1">
      <data>zzzzzz・・・・・z</data>
    </event>
  </command>
  <command id=4 start_time=2400, end_time=2520, destination="receiver" action="suspend">
    <application id="1" />
  </command>
  <command id=5 start_time=3500, end_time=3600, destination="receiver" action="terminate">
    <application id="1" />
  </command>
  <command id=12 start_time=2400, end_time=2520, destination="receiver" action="execute">
    <application id="2" type="html" url="xxx.com/yyy2" expire_date="2011-01-22" />
  </command>
  <command id=15 start_time=2520, end_time=3600, destination="receiver" action="terminate">
    <application id="2" />
  </command>
</tpt>
```

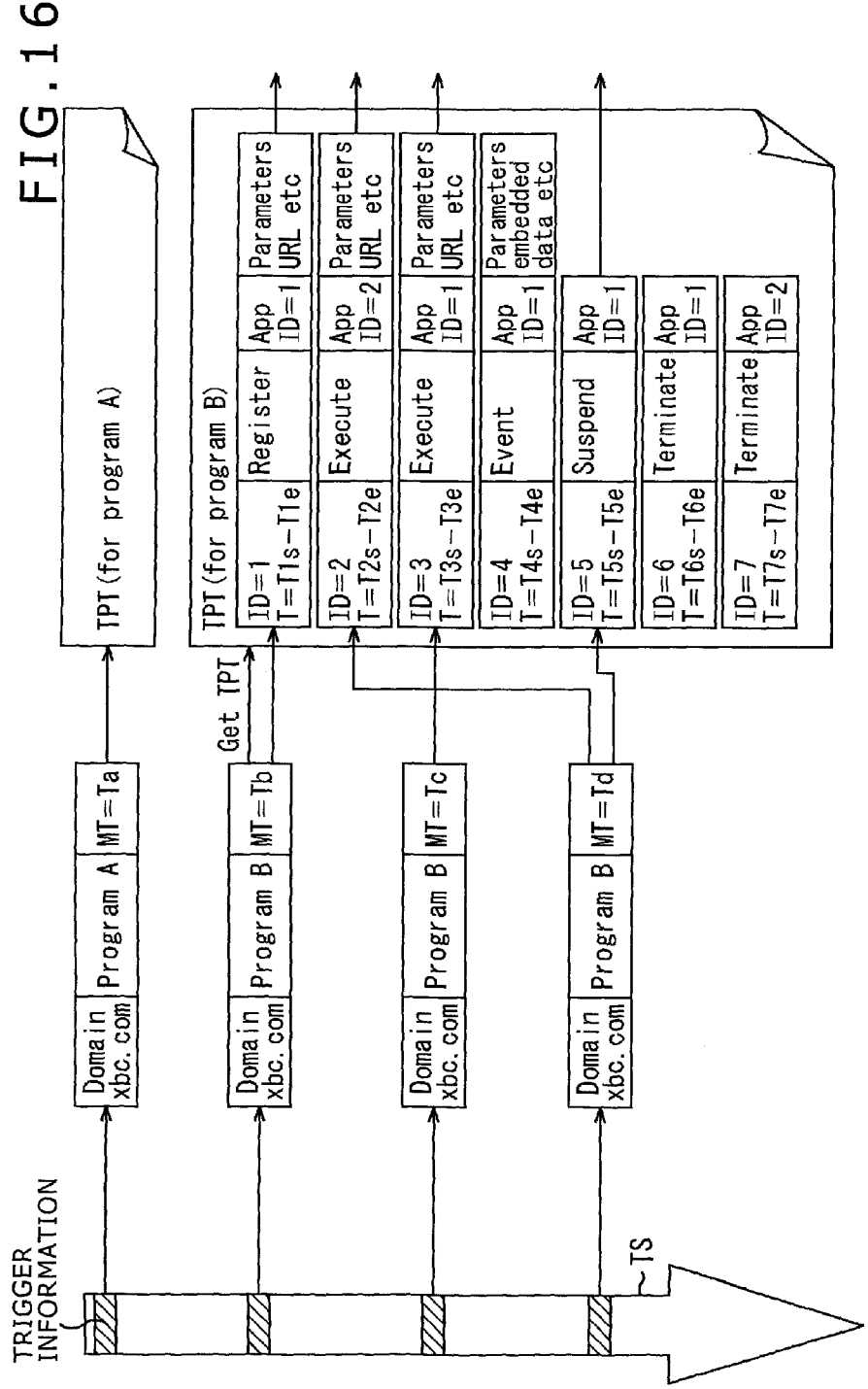

FIG. 23

| Element/Attribute(with@) | | | Number to be permitted | Description & Value |
|---|---|---|---|---|
| tpt | | | 1 | |
| | @id | | 1 | domain_name/Program_id |
| | @type | | 1 | "static", "dynamic" |
| | @version | | 0..1 | TPT version number |
| | @updating_time | | 0..1 | Supposed TPT updating duration (only for type="dynamic") |
| | @present_following | | 0..1 | "present" "following" |
| | @end_mt | | 0..1 | The end time for TPT time scope |
| | @expire_date | | 0..1 | Expire date for caching TPT document. (only for type="static") |
| | capability | | 0..N | Receiver required capability |
| | | @essential | 0..1 | no:not essential yes:essential |
| | command | | 1..N | |
| | | @id | 1 | Equal to Trigger_id |
| | | @start_time | 0..1 | The start time of the command valid period |
| | | @end_time | 0..1 | The end time of the command valid period |
| | | @destination | 0..1 | Device type "receiver":receiver itself "external_1":external device type1 "external_2":external device type2 |
| | | @action | 1 | Action "execute" "register" "suspend" "terminate" "event" |
| | | application | 1 | Description for target App |
| | | | @id | 1 | App ID |
| | | | @type | 1 | App type |
| | | | @url | 0..1 | App URL |
| | | | @priority | 0..1 | Priority to Persist 1:High 0:Normal |
| | | | @expire_date | 0..1 | Expire date for caching the application |
| | | event | 0..1 | Description for event |
| | | | @id | 1 | Event ID |
| | | | data | 0..1 | Embedded data |
| | | diffusion | 0..1 | Randomized diffusion of command execution timing |
| | | | @rate | 1 | Timing number of diffusion |

```
<tpt id=xbc.com/1 type="static" expire_date="2011-01-21">
  <capability essential="no">flute</capability>
  <capability essential="yes">avc_40</capability>
  <command id=1 start_time=0, end_time=600, destination="receiver" action="register">
    <application id="1" type="html" url="xxx.com/yyy1" expire_date="2011-01-21"/>
  </command>
  <command id=2 start_time=600, end_time=3500, destination="receiver" action="execute">
    <application id="1" type="html" url="xxx.com/yyy1" expire_date="2011-01-21"/>
    <diffusion rate=10 range=60 period=600/>
  </command>
  <command id=3 start_time=1800, end_time=2000, destination="receiver" action="event">
    <application id="1"/>
    <event id="event1">
      <data>zzzzzz·····z</data>
    </event>
  </command>
  <command id=4 start_time=2400, end_time=2520, destination="receiver" action="suspend">
    <application id="1"/>
  </command>
  <command id=5 start_time=3500, end_time=3600, destination="receiver" action="terminate">
    <application id="1"/>
  </command>
  <command id=12 start_time=2400, end_time=2520, destination="receiver" action="execute">
    <application id="2" type="html" url="xxx.com/yyy2" expire_date="2011-01-22"/>
  </command>
  <command id=15 start_time=2520, end_time=3600, destination="receiver" action="terminate">
    <application id="2"/>
  </command>
</tpt>
```

FIG.24

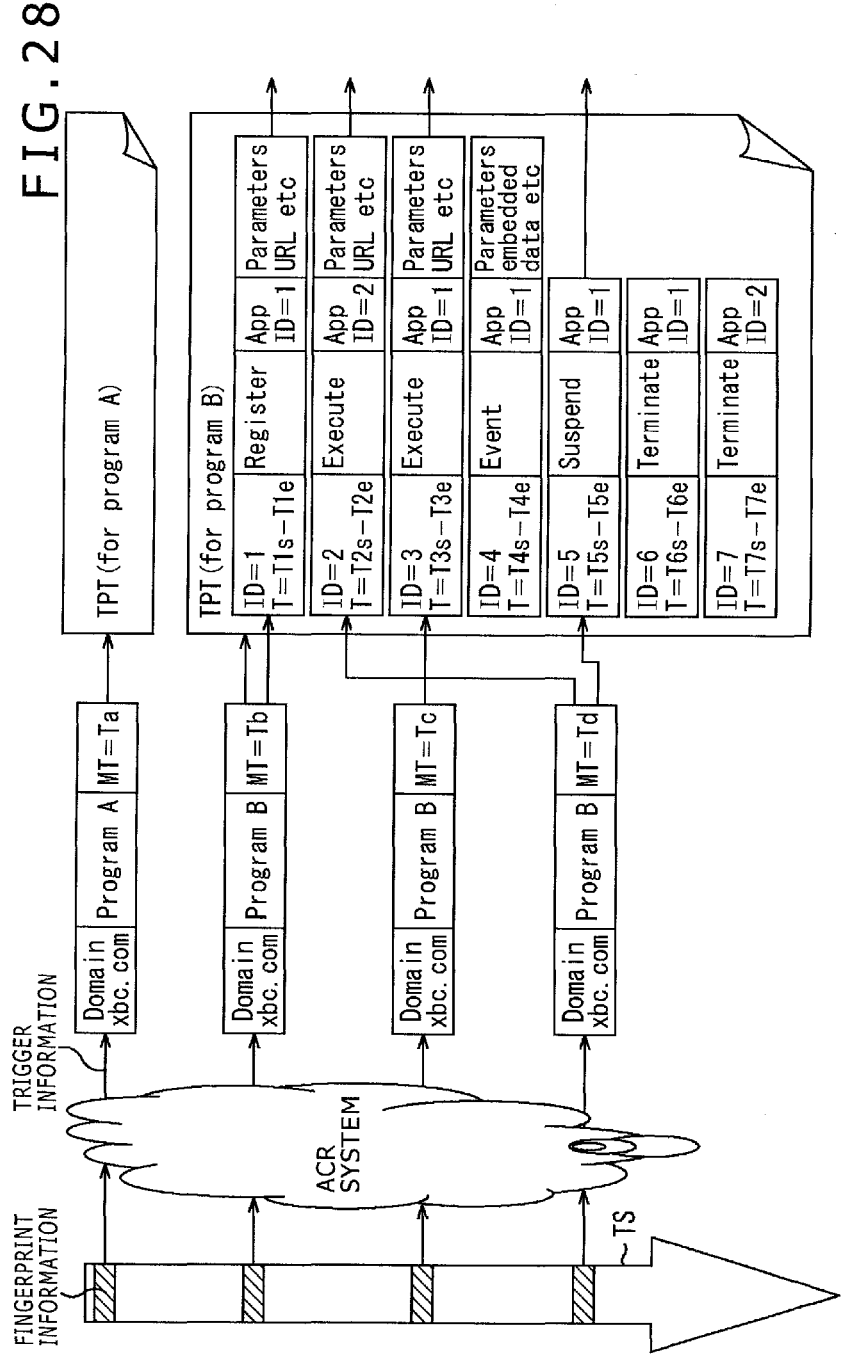

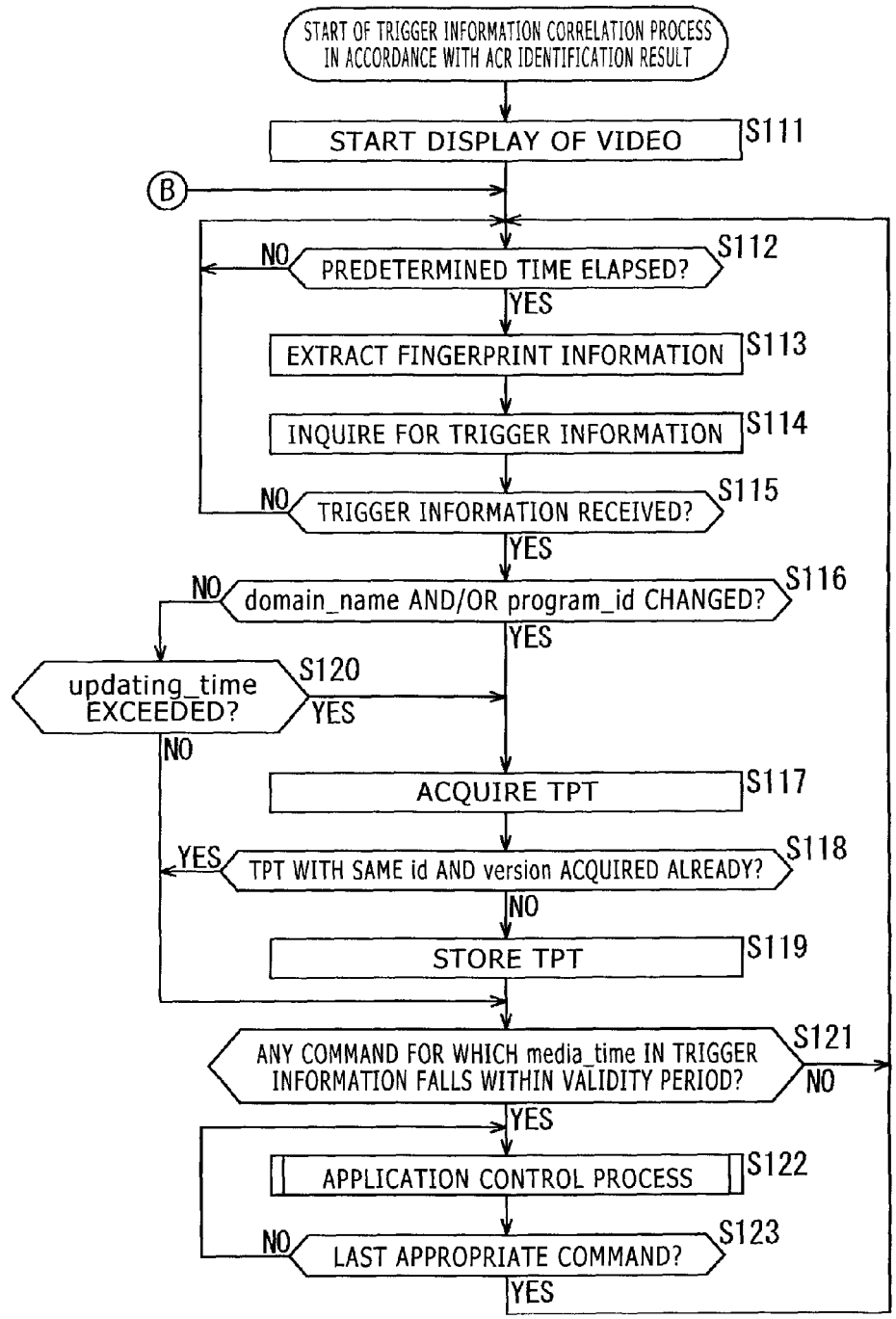

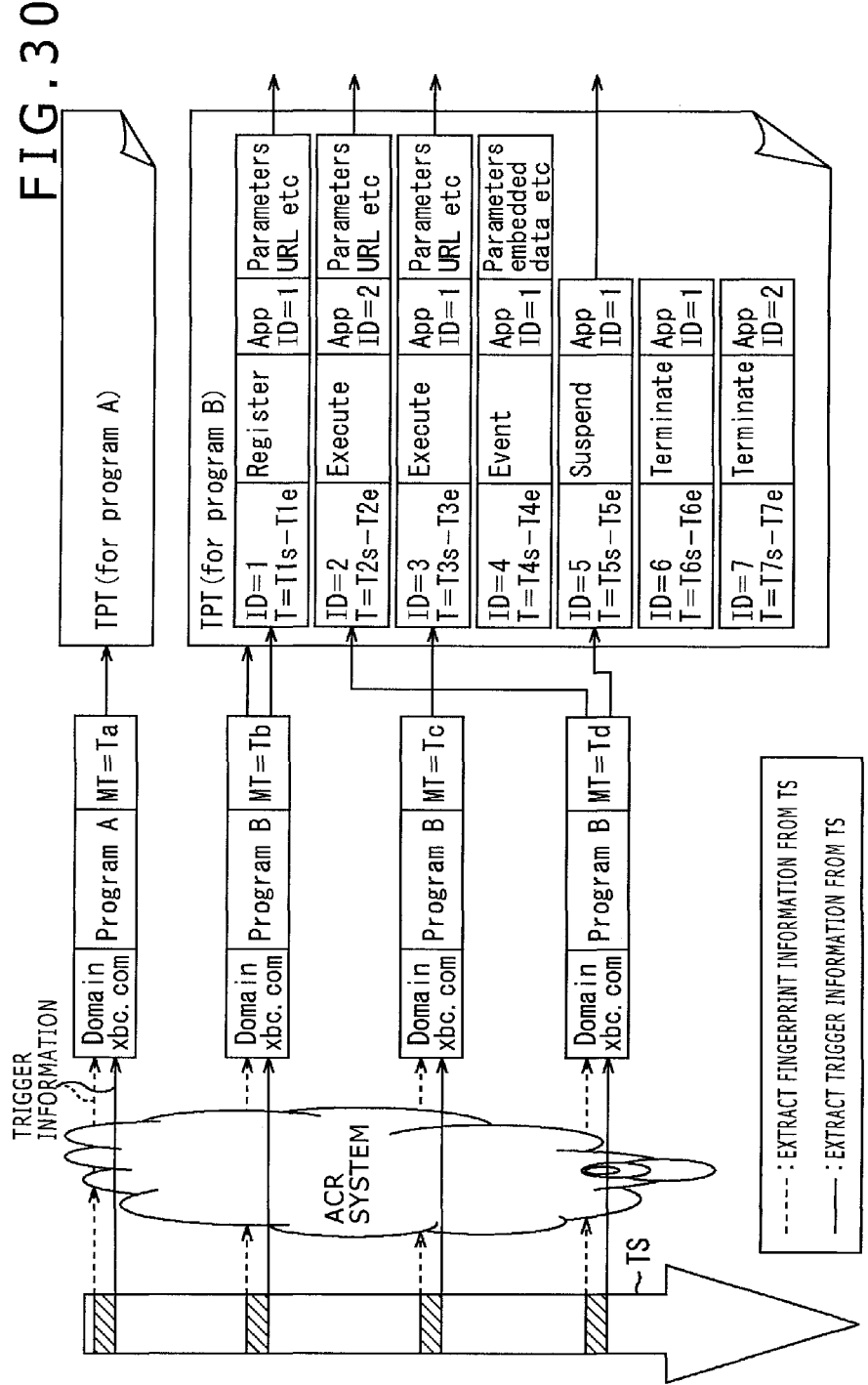

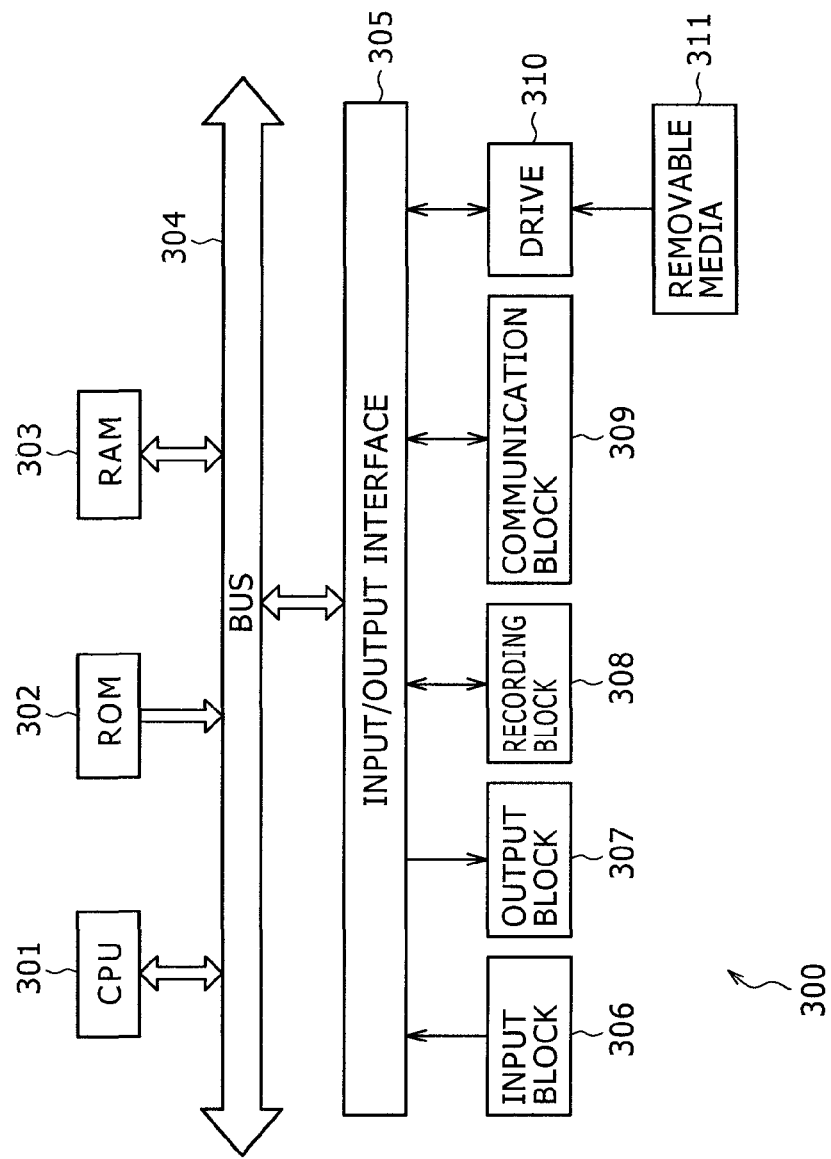

RECEIVER, RECEPTION METHOD, PROGRAM, AND INFORMATION PROCESSING SYSTEM FOR UTILIZING A TRIGGER CORRELATION TABLE

CROSS-REFERENCE TO RELATED APPLICATION

This application claims the benefit of priority of Provisional Application Ser. No. 61/632,390, filed on Jan. 24, 2012, and Provisional Application Ser. No. 61/596,020, filed on Feb. 7, 2012, the entire contents of which are incorporated herein by reference.

BACKGROUND

The present technology relates to a receiver, reception method, program and information processing system, and more particularly to a receiver, reception method, program and information processing system that can provide an application program to be executed in response to AV (Audio Visual) content.

A service designed to provide an application program to be executed in response to a television program is expected to become prevalent. Such an application program is delivered by a broadcasting wave or from a server connected to the Internet to a receiver adapted to receive a digital television broadcasting signal. Therefore, studies are under way to implement such a service (refer, for example, to Japanese Patent Laid-Open No. 2011-66556).

SUMMARY

At present, however, a technical scheme adapted to provide an application program delivered by a broadcasting wave or via the Internet has yet to be established.

The present technology has been devised in light of the foregoing, and it is an object of the present technology to provide an application program to be executed in response to AV content.

A receiver according to a first mode of the present technology includes a reception section operable to receive AV content transmitted by a broadcasting wave, a trigger acquisition section operable to acquire trigger information adapted to operate an application program to be executed in response to the received AV content, a table acquisition section operable to acquire a correlation table correlating the trigger information to commands adapted to control the operation of the application program, an application acquisition section operable to acquire, based on the acquired correlation table, the application program transmitted by the broadcasting wave when the command correlated to the trigger information indicates the acquisition of the application program, and a control section operable to control the operation of the acquired application program in accordance with the command correlated to the trigger information.

In the receiver, the application program is transmitted as NRT (Non-RealTime) content for NRT service using a FLUTE (File Delivery over Unidirectional Transport) session, and the application acquisition section refers to an FDT (File Delivery Table) pinpointed by an SMT (Service Map Table) and NRT-IT (NRT Information Table) based on source information indicating the source of the application program written in the correlation table so as to acquire the application program transmitted using a FLUTE session.

In the receiver, the control section verifies whether the receiver has necessary capability to operate the application program to be acquired. The application acquisition section acquires the application program transmitted using a FLUTE session when the receiver has capability to operate the application program.

The application acquisition section acquires the application program delivered via the Internet based on the source information written in the NRT-IT if the application program transmitted using a FLUTE session cannot be acquired.

The correlation table correlates the command to the validity time of the command. If it is found that the time indicating the progress of the AV content acquired from the trigger information satisfies a given validity condition set with reference to the validity time of the command based on the correlation table, the control section controls the operation of the acquired application program in accordance with the valid command.

The trigger information is transmitted by the broadcasting wave. The trigger acquisition section acquires the trigger information transmitted by the broadcasting wave.

The receiver further includes a feature quantity extraction section operable to extract a feature quantity from data of the received AV content. In the receiver, the trigger acquisition section acquires the trigger information appropriate to the identification result of the AV content identified using the extracted feature quantity.

The control section verifies whether the receiver has necessary capability to operate the application program to be acquired based on the acquired correlation table. The table acquisition section acquires a correlation table different from the acquired correlation table if the receiver does not have capability to operate the application program.

The table acquisition section acquires the correlation table in accordance with the priority set in advance for acquiring the correlation table.

In the receiver, at least not only identification information of the NRT service but also an IP address and port number used for the transmission of the NRT content are written in the SMT, at least not only identification information of the NRT service and NRT content but also the source information of the application program are written in the NRT-IT, and at least not only identification information of the NRT content but also a TOI (Transport Object Identifier) are written in the FDT. The application acquisition section refers to the NRT-IT to pinpoint the identification information of the NRT service and NRT content correlated to the source information matching that written in the correlation table. The application acquisition section refers to the SMT to pinpoint the FDT from a FLUTE session of a TSI (Transport Session Identifier) pinpointed by a combination of the IP address and port number correlated to the identification information matching that of the pinpointed NRT service. The application acquisition section refers to the FDT to acquire the application program based on an object identified by the TOI correlated to the identification information matching that of the pinpointed NRT content.

The command indicates one of acquisition or registration of the application program, acquisition or activation thereof, firing of an event, suspension of the application program or termination thereof in accordance with the command. The control section controls the acquisition or registration of the application program, acquisition or activation thereof, firing of an event in the application program under execution, suspension of the application program under execution or termination thereof in accordance with the command.

A reception method and program according to the first mode of the present technology are those appropriate to the above receiver according to the first mode of the present technology.

In the receiver, reception method and program according to the first mode of the present technology, AV content transmitted by a broadcasting wave is received. Trigger information is acquired which is adapted to operate an application program to be executed in response to the received AV content. A correlation table is acquired which correlates the trigger information to commands adapted to control the operation of the application program. The application program transmitted by the broadcasting wave is acquired based on the acquired correlation table when the command correlated to the trigger information indicates the acquisition of the application program. The operation of the acquired application program is controlled in accordance with the command correlated to the trigger information.

An information processing system according to a second mode of the present technology includes a receiver, a first information processor, and a second information processor. In the information processing system, the receiver includes a reception section operable to receive AV content transmitted by a broadcasting wave, a trigger acquisition section operable to acquire trigger information adapted to operate an application program to be executed in response to the received AV content transmitted by the broadcasting wave, a table acquisition section operable to acquire, from the first information processor, a correlation table correlating the trigger information to commands adapted to control the operation of the application program, an application acquisition section operable to acquire, based on the acquired correlation table, the application program transmitted by the broadcasting wave when the command correlated to the trigger information indicates the acquisition of the application program, and a control section operable to control the operation of the acquired application program in accordance with the command correlated to the trigger information. The application acquisition section acquires the application program from the second information processor if the application program transmitted by the broadcasting wave cannot be acquired. The first information processor includes a first provision section operable to provide the correlation table in response to an inquiry from the receiver. The second information processor includes a second provision section operable to provide the application program in response to an inquiry from the receiver.

In the information processing system according to the second mode of the present technology, the receiver receives the AV content transmitted by the broadcasting wave. The receiver acquires trigger information adapted to operate the application program to be executed in response to the received AV content transmitted by the broadcasting wave. The receiver acquires, from the first information processor, a correlation table correlating the trigger information to commands adapted to control the operation of the application program. The receiver acquires, based on the acquired correlation table, the application program transmitted by the broadcasting wave when the command correlated to the trigger information indicates the acquisition of the application program. The receiver controls the operation of the acquired application program in accordance with the command correlated to the trigger information. The receiver acquires the application program from the second information processor if the application program transmitted by the broadcasting wave cannot be acquired. The first information processor provides the correlation table in response to an inquiry from the receiver. The second information processor provides the application program in response to an inquiry from the receiver.

An information processing system according to a third mode of the present technology includes a receiver, a first information processor, a second information processor, and a third information processor. The receiver includes a reception section operable to receive AV content transmitted by a broadcasting wave, a feature quantity extraction section operable to extract a feature quantity from data of the received AV content, a trigger acquisition section operable to acquire trigger information adapted to operate an application program to be executed in response to the received AV content, the trigger information being appropriate to the identification result of the AV content identified by the first information processor using the feature quantity, a table acquisition section operable to acquire, from the second information processor, a correlation table correlating the trigger information to commands adapted to control the operation of the application program, an application acquisition section operable to acquire, based on the acquired correlation table, the application program transmitted by the broadcasting wave when the command correlated to the trigger information indicates the acquisition of the application program, and a control section operable to control the operation of the acquired application program in accordance with the command correlated to the trigger information. The application acquisition section acquires the application program from the third information processor if the application program transmitted by the broadcasting wave cannot be acquired. The first information processor includes a first provision section operable to provide the trigger information appropriate to the identification result of the AV content identified using the feature quantity from the receiver. The second information processor includes a second provision section operable to provide the correlation table in response to an inquiry from the receiver. The third information processor includes a third provision section operable to provide the application program in response to an inquiry from the receiver.

In the information processing system according to the third mode of the present technology, the receiver receives the AV content transmitted by the broadcasting wave. The receiver extracts a feature quantity from data of the received AV content. The receiver acquires trigger information adapted to operate the application program to be executed in response to the received AV content. The trigger information is appropriate to the identification result of the AV content identified by the first information processor using the feature quantity. The receiver acquires, from the second information processor, a correlation table correlating the trigger information to commands adapted to control the operation of the application program. The receiver acquires, based on the acquired correlation table, the application program transmitted by the broadcasting wave when the command correlated to the trigger information indicates the acquisition of the application program. The receiver controls the operation of the acquired application program in accordance with the command correlated to the trigger information. The receiver acquires the application program from the third information processor if the application program transmitted by the broadcasting wave cannot be acquired. The first information processor provides the trigger information appropriate to the identification result of the AV content identified using the feature quantity from the receiver. The second information processor provides the correlation table in response to an inquiry from the receiver. The third information processor provides the application program in response to an inquiry from the receiver.

The first to third modes of the present technology provide an application program to be executed in response to AV content.

BRIEF DESCRIPTION OF THE DRAWINGS

FIG. 6 is a diagram illustrating an example of an FDT packet format;
FIG. 7 is a diagram illustrating an example of an FDT schema;
FIG. 9 is a diagram illustrating an example of writing an FDT Instance;
FIG. 12 is a diagram illustrating examples of information items contained in trigger information;
FIG. 13 is a diagram illustrating an example of a TPT format;
FIG. 14 is a diagram illustrating specific examples of values specified as a capability element;
FIG. 15 is a diagram illustrating an example of writing a TPT;
FIG. 16 is a diagram illustrating an example of correlation between trigger information and commands;
FIG. 23 is a diagram illustrating an example of the TPT format appropriate to each class;
FIG. 24 is a diagram illustrating an example of writing a TPT appropriate to each class;
FIG. 28 is a diagram illustrating an example of correlation between the trigger information and commands;
FIG. 29 is a flowchart describing the trigger information correlation process;
FIG. 30 is a diagram illustrating an example of correlation between the trigger information and commands;
FIG. 35 is a diagram illustrating a configuration example of a computer.

DETAILED DESCRIPTION OF THE PREFERRED EMBODIMENTS

A description will be given below of the preferred embodiments of the present technology with reference to the accompanying drawings.

[Basic Concept of the Present Technology]

Figure 1:
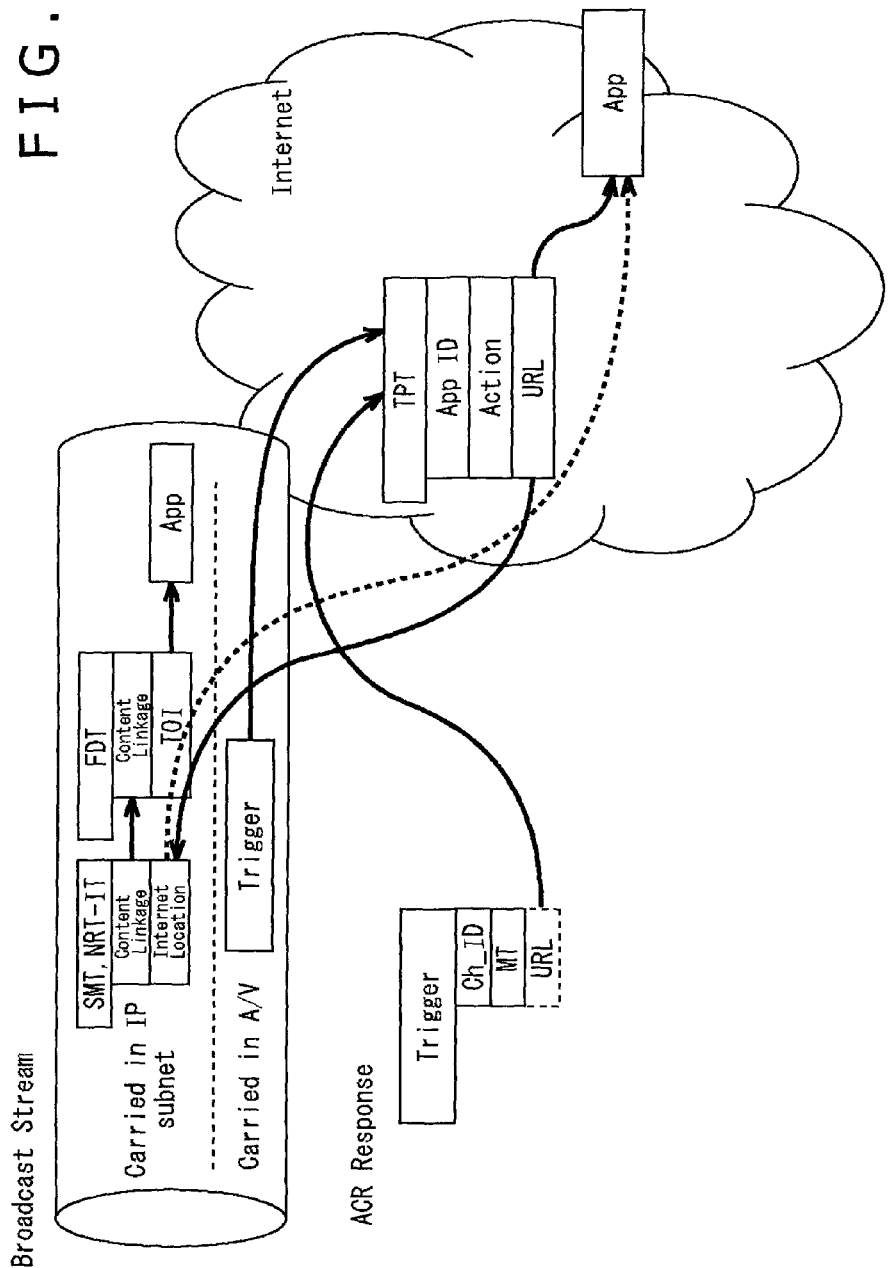
FIG. 1 is a diagram describing the basic concept of the present technology.

FIG. 1 is a diagram describing the basic concept of the present technology.

The present technology is designed to provide a data broadcasting application, delivered by a broadcasting wave or from a server connected to the Internet, to a receiver. Here, the term "data broadcasting application (App)" refers to an application program for data broadcasting executed in response to AV content such as television program or commercial.

The operation of a data broadcasting application is controlled in accordance with the command pinpointed based on trigger information (Trigger) and TPT (Trigger Parameter Table). Trigger information is adapted to operate the data broadcasting application. Trigger information is either contained in and transmitted by a broadcasting wave or acquired from an identification result of ACR identification process. The term ACR (Automatic Content Recognition) refers to a technique adapted to identify content using a feature quantity acquired from AV content.

On the other hand, the term "TPT" refers to a correlation table correlating commands adapted to control a data broadcasting application to validity periods of the commands. The command validity period is determined as AV content progresses. The receiver pinpoints, based on the TPT, the command correlated to the trigger information and acquires the data broadcasting application from a broadcasting wave or a server on the Internet in accordance with the command.

Figure 2:
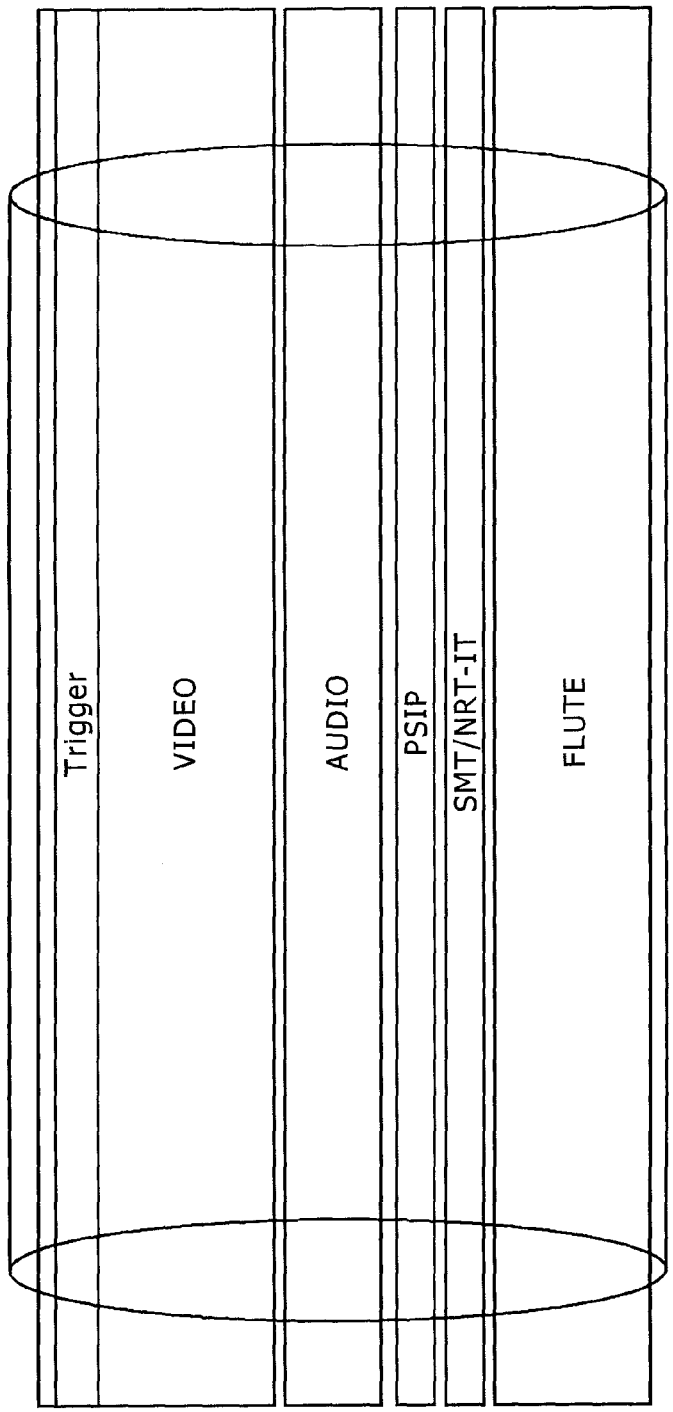
FIG. 2 is a diagram illustrating the configuration of a broadcasting stream.

A description will be given here of how a data broadcasting application transmitted by a broadcasting wave is acquired. FIG. 2 is a diagram illustrating the configuration of a broadcasting stream.

A broadcasting stream includes not only video and audio streams but also PSIP, SMT, NRT-IT and FLUTE. Trigger information is inserted in the video and audio streams.

The PSIP (Program and System Information Protocol) transmits information including control information and program information necessary to select and receive a specific channel. The receiver prepares a list of NRT content provided, for example, by NRT service based on information obtained from the PSIP. Here, the term "NRT (Non-Real-Time) service" refers to a service designed to temporarily store NRT content transmitted by NRT broadcasting in the storage of the receiver first and then play back the NRT content.

The SMT (Service Map Table) indicates attribute information on the service levels of the NRT services contained in the transport stream. Further, the NRT-IT (NRT Information Table) indicates attribute information on the content level of a single NRT service. The SMT and NRT-IT are contained in an SSC (Service Signaling Channel) transmitted with a fixed IP address and over a fixed UDP port. Here, "224.0.23.60" and "4937" are, for example, used respectively as an IP address and port number.

The receiver can pinpoint the acquisition position (e.g., time position) in the broadcasting stream of desired NRT content by referring to the SMT and NRT-IT.

Figure 3:
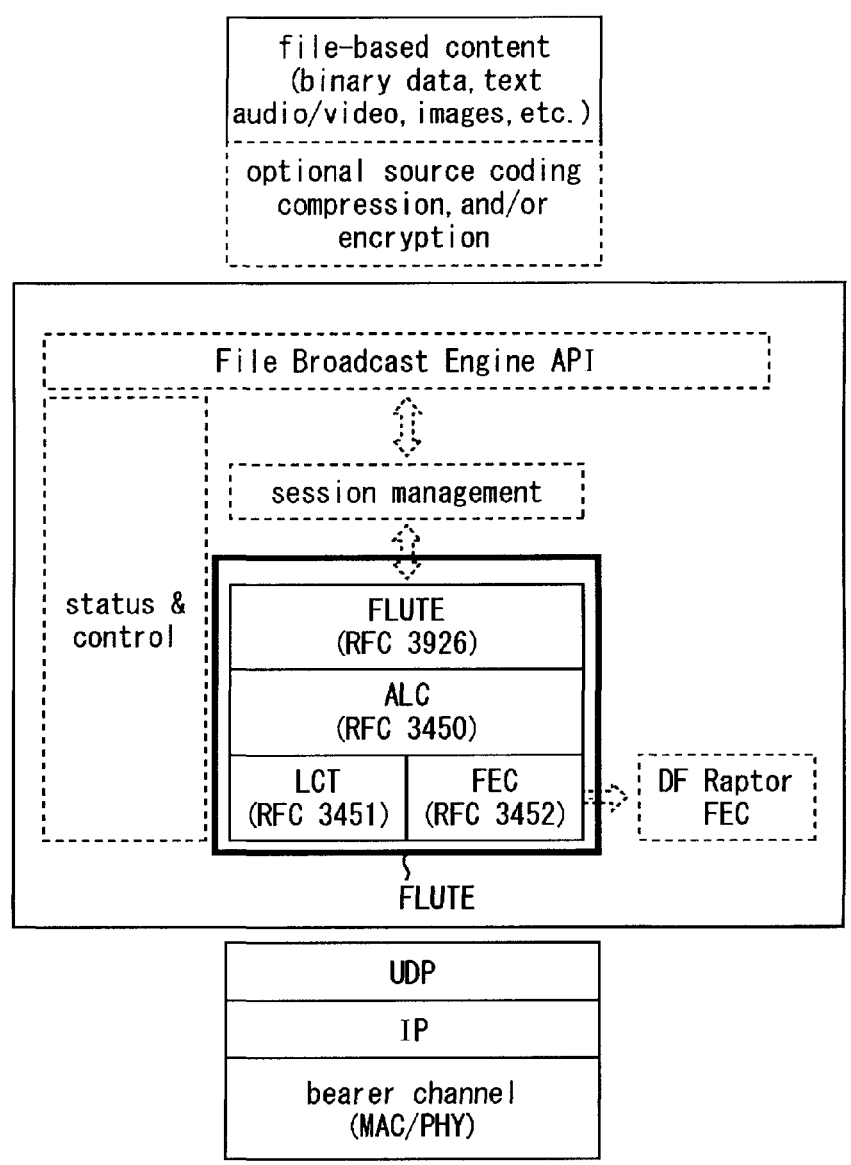
FIG. 3 is a diagram describing a FLUTE protocol stack.

The FLUTE (File Delivery over Unidirectional Transport) is a protocol designed to manage file sessions transmitted by a broadcasting wave. Here, as illustrated in FIG. 3, the FLUTE is located at a level higher than the physical layer, i.e., the layer located at the lowermost level and the TS (Transport Stream), IP (Internet Protocol) and UDP (User Datagram Protocol) layers, i.e., the layers located above the physical layer. On the other hand, various files such as NRT content are located above the FLUTE. That is, an IP packet with a specified UDP port for IP communication is transmitted in NRT broadcasting so as to establish a FLUTE session. Then, the file making up, for example, NRT content is pinpointed by a FLUTE session.

As illustrated in FIG. 3, on the other hand, the FLUTE is a general term for FEC (Forward Error Correction), LCT (Layered Coding Transport), ALC (Asynchronous Layered Coding) and FLUTE protocol stacks. It should be noted that FLUTE is defined in detail as RFC3926. Each of FEC, LCT and ALC are defined in detail respectively as RFC3452, RFC3451 and RFC3450. It should be noted that FEC is used to provide improved resistance against data loss during mobile reception with a portable terminal and that FEC need not always be used during reception with a fixed terminal. On the other hand, a desired scheme can be used as an FEC algorithm.

Incidentally, TOI (Transport Object Identifier) is used to manage, for example, a file to be transmitted as an object in FLUTE. Further, TSI (Transport Session Identifier) is used to manage a collection of a plurality of objects as a session.

Figure 4:
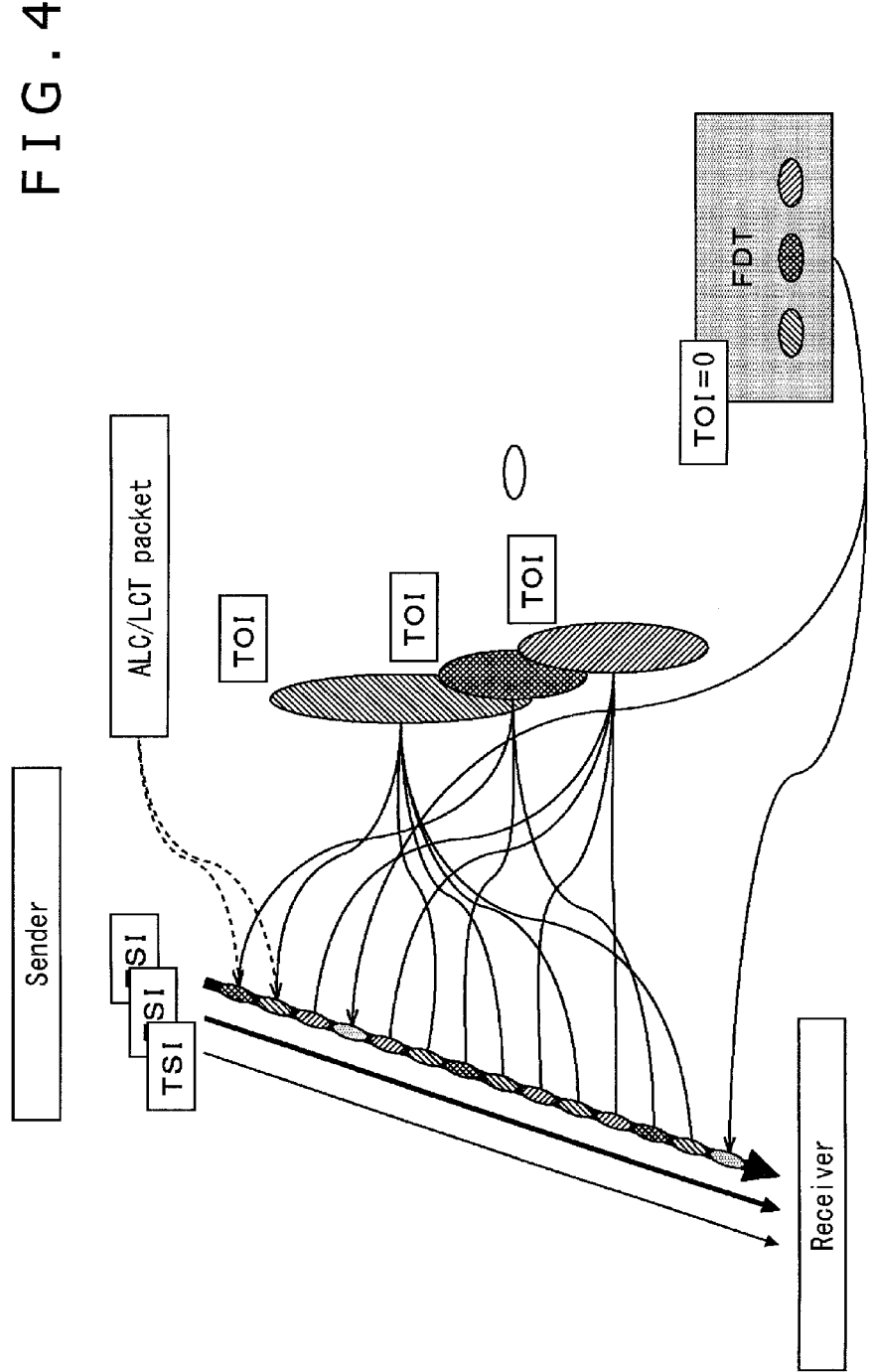
FIG. 4 is a diagram describing session management by FLUTE.

FIG. 4 is a diagram describing session management by FLUTE.

Figure 5:
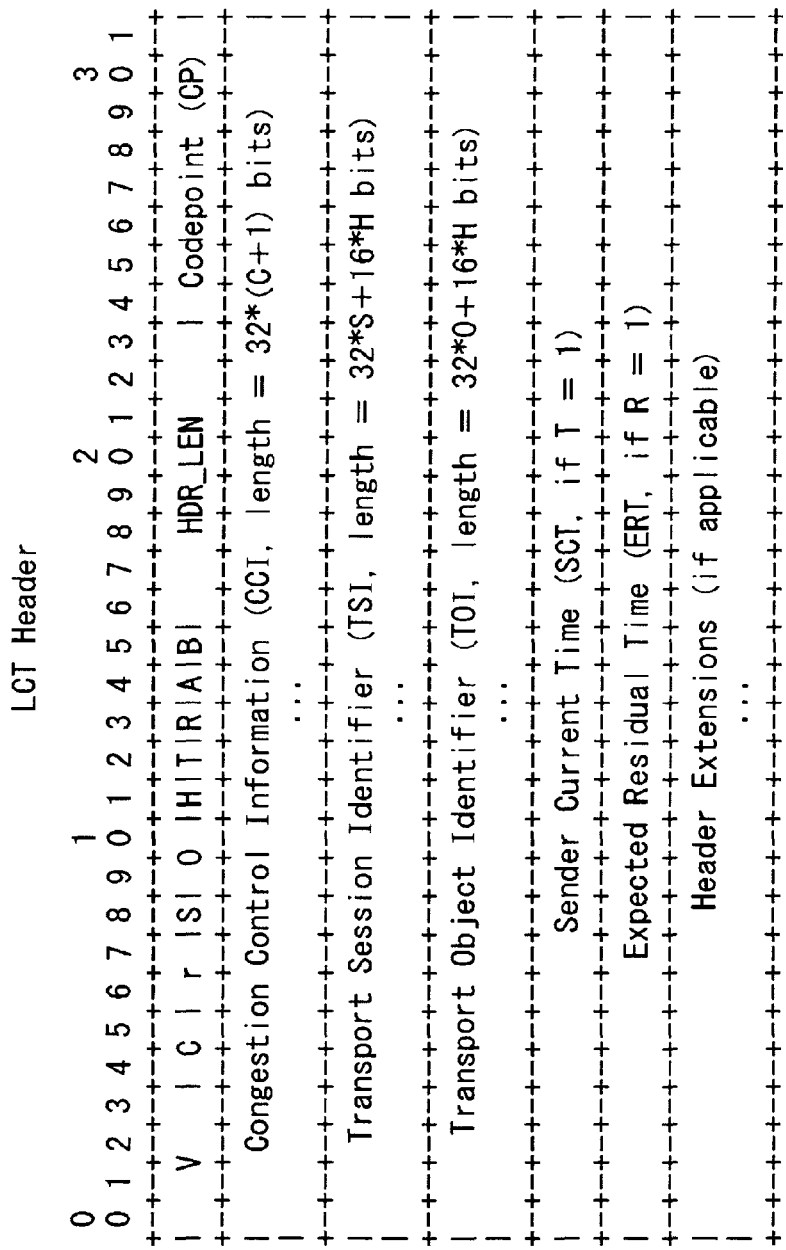
FIG. 5 is a diagram illustrating an example of a header format.

As illustrated in FIG. 4, each of the objects transmitted from the sender to the receiver is transmitted in an IP packet to which, an ALC/LCT header is attached. Identification information of each session is written in the header as a Transport Session Identifier (TSI) as illustrated in FIG. 5. Further, identification information of a plurality of objects transmitted for each session is written in the header as a Transport Object Identifier (TOI). That is, it is possible to pinpoint a specific file using two pieces of identification information, i.e., TSI and TOI, in a session by FLUTE.

Figure 8:
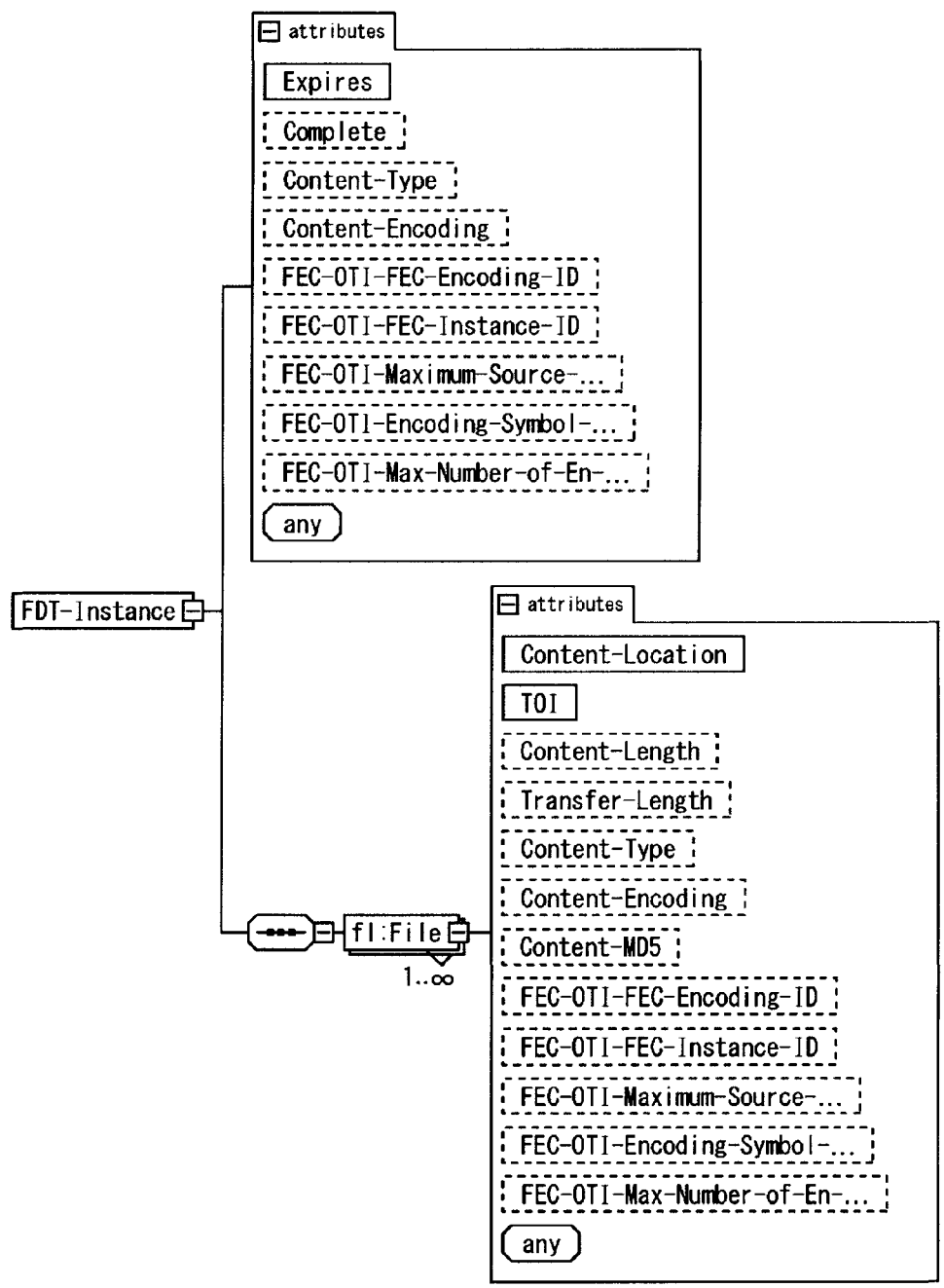
FIG. 8 is a diagram illustrating an example of an FDT schema.

Further, an FDT (File Delivery Table) is periodically transmitted in a session by FLUTE. FDT is used to transmit various pieces of attribute information for an NRT service file. An FDT is transmitted for each TSI as a TOI=0 file as illustrated in FIG. 6. Index information for each TSI is written in the FDT. Further, an FDT is transmitted by an FDT Instance, i.e., an object adapted to transmit an FDT. Therefore, an FDT Instance is stored in an FDT packet as shown in FIG. 6. It should be noted that information as illustrated in FIGS. 7 and 8 is, for example, defined as an FDT schema.

Further, FIG. 9 is a diagram illustrating an example of writing an FDT Instance. It should be noted that an FDT Instance can be written as desired and that the writing of an FDT Instance is not limited to the example of writing shown in FIG. 9.

As described above, NRT content often includes a plurality of files. Therefore, the receiver recovers NRT content from the plurality of files using index information written in the FDT. That is, the receiver can download NRT content via an IP packet included in a broadcasting stream by using a FLUTE session. Then, the present technology transmits a data broadcasting application using a FLUTE session in the same manner as for NRT content.

That is, the receiver acquires a data broadcasting application transmitted by a broadcasting wave using a FLUTE session. It should be noted, however, that although a data broadcasting application is, as a general rule, transmitted by a broadcasting wave, the receiver may fail to receive the application for some reason or other. In such a case, the receiver accesses the application server via the Internet to acquire the data broadcasting application provided by the application server.

While the basic concept of the present technology has been described above, the receiver must acquire trigger information as a prerequisite to acquiring a data broadcasting application transmitted by a broadcasting wave. Trigger information can be acquired in one of the following two ways, namely, acquiring trigger information (trigger) transmitted by a broadcasting wave and acquiring trigger information (ACR Response) appropriate to the identification result of the ACR identification process. Therefore, a description will be given below of a case in which trigger information is acquired by the former method as a first embodiment and a case in which trigger information is acquired by the latter method as a second embodiment.

First Embodiment

Configuration Example of the Broadcasting System

Figure 10:
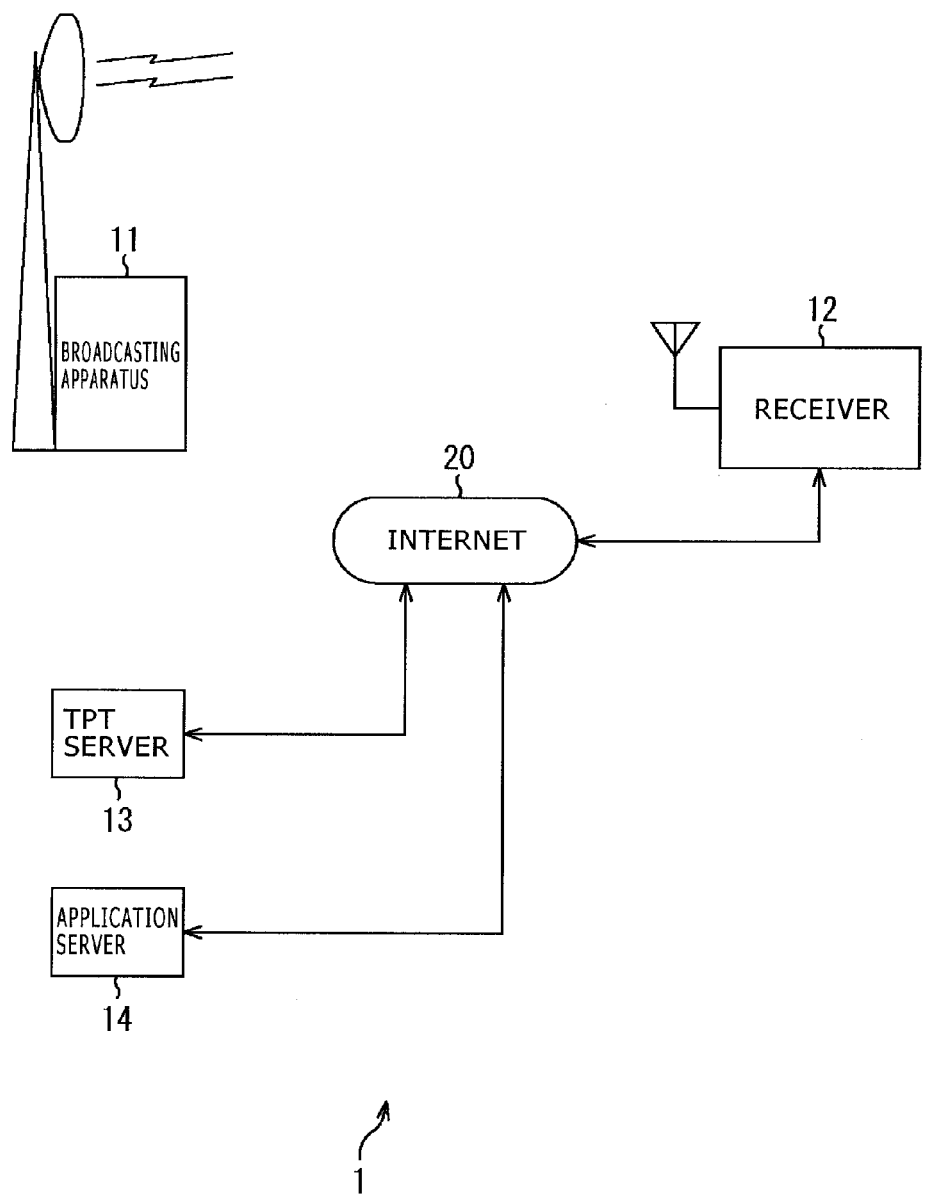
FIG. 10 is a diagram illustrating the configuration of an embodiment of a broadcasting system to which the present technology is applied.

FIG. 10 illustrates a broadcasting system 1 according to the first embodiment. The broadcasting system 1 includes a broadcasting apparatus 11, receiver 12, TPT server 13, and application server 14. On the other hand, the receiver 12, TPT server 13, and application server 14 are connected to each other via the Internet 20.

The broadcasting apparatus 11 is designed to transmit a digital television broadcasting signal (hereinafter simply referred to as the broadcasting signal) for AV content such as television programs and commercials. Further, the broadcasting apparatus 11 transmits trigger information in the broadcasting signal. Trigger information is used to operate a data broadcasting application to be executed in response to AV content. Trigger information is inserted in a video or audio signal of AV content or arranged in a transport stream of the broadcasting signal for transmission.

The receiver 12 acquires video and audio of the AV content by receiving the broadcasting signal transmitted from the broadcasting apparatus 11. The receiver 12 outputs the acquired video to a display and the audio to a speaker. It should be noted that the receiver 12 may be a standalone unit or incorporated, for example, in a television receiver or video camcorder.

Further, the receiver 12 acquires a TPT by accessing the TPT server 13 via the Internet 20 in accordance with trigger information from the broadcasting apparatus 11.

The TPT server 13 is provided, for example, by a broadcaster engaged in broadcasting television programs using the broadcasting apparatus 11 to manage TPTs. The TPT server 13 provides a managed TPT to the receiver 12 via the Internet 20 in response to an inquiry from the receiver 12.

The receiver 12 pinpoints the valid command based on the TPT acquired from the TPT server 13 if the time indicating the progress of AV content acquired from trigger information falls within the validity period or if the valid start time is exceeded. The receiver 12 controls the operation of the data broadcasting application in accordance with the pinpointed command.

Further, the receiver 12 acquires a data broadcasting application transmitted by a broadcasting wave in accordance with the pinpointed command. It should be noted, however, that the receiver 12 acquires the data broadcasting application by accessing the application server 14 via the Internet 20 if the receiver 12 fails to acquire the data broadcasting application from the broadcasting wave.

The application server 14 is provided, for example, by a broadcaster engaged in broadcasting television programs using the broadcasting apparatus 11 to manage data broadcasting applications. The application server 14 provides a managed data broadcasting application to the receiver 12 via the Internet 20 in response to an inquiry from the receiver 12.

The broadcasting system 1 is configured as described above.

[Configuration Example of the Receiver]

Figure 11:
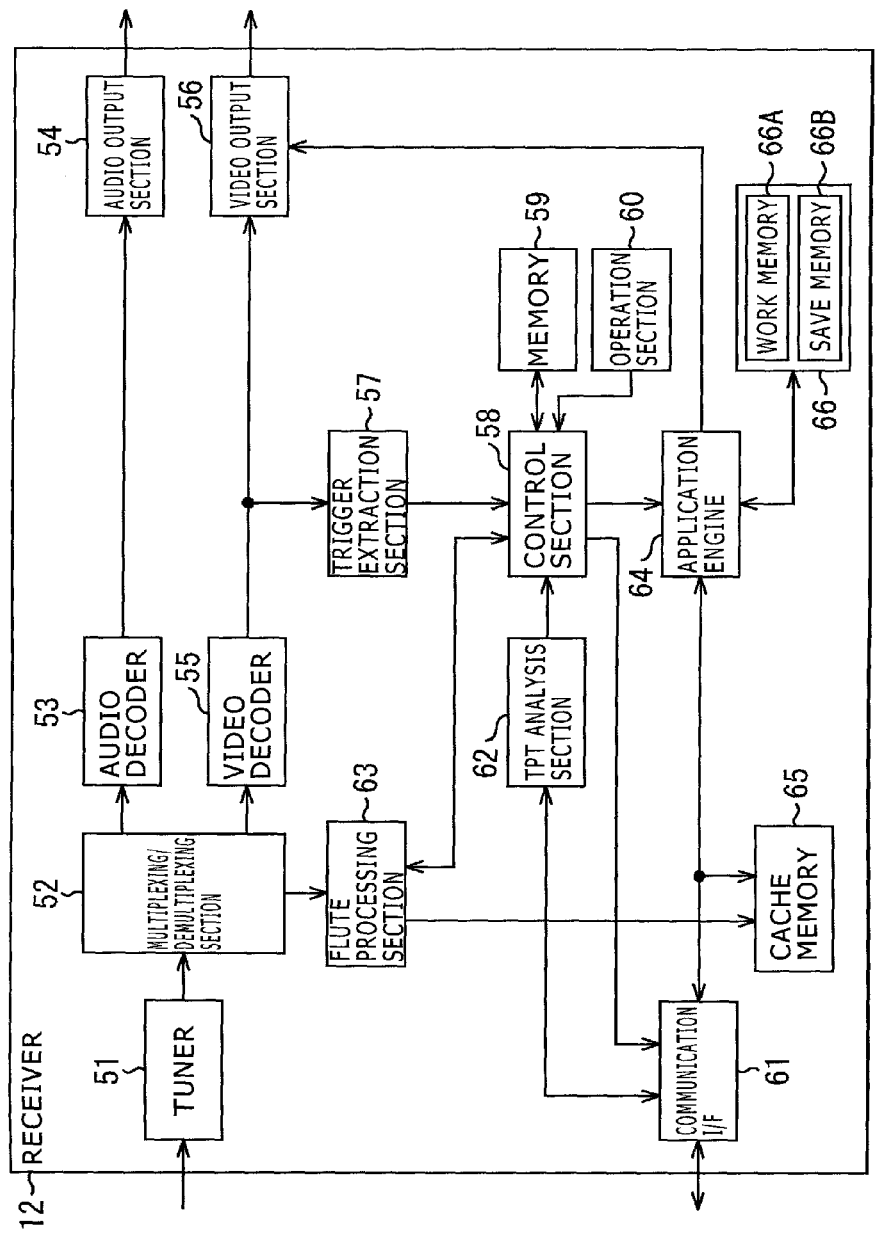
FIG. 11 is a diagram illustrating the configuration of an embodiment of a receiver to which the present technology is applied.

FIG. 11 illustrates a configuration example of the receiver 12 shown in FIG. 10.

The receiver 12 includes a tuner 51, multiplexing/demultiplexing section 52, audio decoder 53, audio output section 54, video decoder 55, video output section 56, trigger extraction section 57, control section 58, memory 59, operation section 60, communication I/F 61, TPT analysis section 62, flute processing section 63, application engine 64, cache memory 65 and application memory 66.

The tuner 51 receives a broadcasting signal for a user-selected channel, demodulates the signal and supplies the resultant broadcasting stream to the multiplexing/demultiplexing section 52.

The multiplexing/demultiplexing section 52 demultiplexes the audio and video streams multiplexed on the broadcasting stream supplied from the tuner 51, supplying the audio stream to the audio decoder 53 and the video stream to the video decoder 55. Further, the multiplexing/demultiplexing section 52 demultiplexes the PSIP, SMT, NRT-IT and FLUTE multiplexed on the broadcasting stream.

The audio decoder 53 decodes the audio stream supplied from the multiplexing/demultiplexing section 52, supplying the resultant audio signal to the audio output section 54. The audio output section 54 outputs the audio signal supplied from the audio decoder 53 to the speaker (not shown) provided at a later stage.

The video decoder 55 decodes the video stream supplied from the multiplexing/demultiplexing section 52, supplying the resultant video signal to the video output section 56 and trigger extraction section 57. The video output section 56 outputs the video signal supplied from the video decoder 55 to the display (not shown) provided at a later stage.

The trigger extraction section 57 constantly monitors the video signal supplied from the video decoder 55, extracting trigger information embedded in the video signal and supplying the trigger information to the control section 58.

It should be noted that although a case will be described here in which trigger information is embedded in a video signal, the trigger extraction section 57 constantly monitors the audio signal supplied from the audio decoder 53 and extracts trigger information embedded in the audio signal if trigger information is embedded in an audio signal. On the other hand, if trigger information is arranged in a transport stream, the trigger extraction section 57 extracts trigger information from a PCR packet including trigger information supplied from the multiplexing/demultiplexing section 52.

The control section 58 executes the control program stored in advance in the memory 59, thus controlling the operation of each of the sections of the receiver 12. The operation section 60 receives various user operations and supplies an operation signal corresponding to the received user operation to the control section 58.

Further, the control section 58 controls the communication I/F 61 in accordance with the trigger information supplied from the trigger extraction section 57, accessing the TPT server 13 via the Internet 20 and requesting a TPT. The communication I/F 61 receives the TPT transmitted from the TPT server 13 via the Internet 20, supplying the TPT to the TPT analysis section 62.

The TPT analysis section 62 acquires the TPT supplied from the communication I/F 61. The TPT analysis section 62 analyzes the acquired TPT and stores it in its internal memory (not shown). Further, the TPT analysis section 62 supplies the TPT stored in its memory in response to a request from the control section 58.

On the other hand, the control section 58 pinpoints the valid command based on the TPT from the TPT analysis section 62 if the time indicating the progress of AV content acquired from time information (media_time) contained in trigger information from the trigger extraction section 57 falls within the validity period of the command or if the valid start time is exceeded. The control section 58 controls, for example, the acquisition or registration of the data broadcasting application, acquisition or activation thereof, firing of an event, suspension of the data broadcasting application or termination thereof in accordance with the pinpointed command.

The flute processing section 63 constantly monitors the broadcasting stream demultiplexed by the multiplexing/demultiplexing section 52, acquiring an SMT and NRT-IT. The flute processing section 63 refers to the acquired SMT and NRT-IT under control of the control section 58, acquiring an FDT. The flute processing section 63 refers to the acquired FDT, acquiring a data broadcasting application transmitted by a FLUTE session and storing it in the cache memory 65.

The application engine 64 reads the data broadcasting application stored in the cache memory 65 and executes the application under control of the control section 58. The video signal of the data broadcasting application under execution is supplied to the video output section 56.

The video output section 56 combines the video signal supplied from the application engine 64 and that supplied from the video decoder 55, outputting the combined video signal.

The application memory 66 includes a work memory 66A and save memory 66B. The application engine 64 stores the data relating to the data broadcasting application under execution (more specifically includes, for example, the level of the information being displayed) in the work memory 66A. Further, when pausing the data broadcasting application under execution, the application engine 64 moves the data in the work memory 66A of the application memory 66 to the save memory 66B. Then, when resuming the data broadcasting application under execution that has been paused, the application engine 64 moves the data in the save memory 66B to the work memory 66A, restoring itself to its original state before the pause.

Further, the application engine 64 controls the communication I/F 61 under control of the control section 58, accessing the application server 14 via the Internet 20 and requesting a data broadcasting application. The communication I/F 61 receives the data broadcasting application from the application server 14, storing the application in the cache memory 65.

It should be noted that although not illustrated in FIG. 11, if NRT content is transmitted by a FLUTE session, the flute processing section 63 acquires the NRT content from the broadcasting stream demultiplexed by the multiplexing/demultiplexing section 52 based on the SMT and NRT-IT, accumulating the NRT content in the storage (not shown). Then, the NRT content accumulated in the storage is read and played back as appropriate.

The receiver 12 is configured as described above.

[Details of Trigger Information]

A detailed description will be given of trigger information. FIG. 12 illustrates examples of information items contained in trigger information.

program_id is identification information of AV content. That is, the receiver 12 notifies the TPT server 13 of the program_id, allowing for the TPT server 13 to identify, for example, a television program adapted to pinpoint the TPT based on the program_id. It should be noted, however, that program_id may be referred to as channel_id (Ch_ID).

media_time is information indicating a specific time position of AV content along the time axis over which AV content progresses. For example, media_time indicates the time relative to a reference time, i.e., a specific time such as the start time or AM 0:00, along the time axis over which a television program progresses. On the other hand, the time specified as media_time is, for example, in units of seconds or milliseconds.

domain_name is information adapted to pinpoint the TPT server 13, and information indicating the domain name of the TPT server 13 is, for example, specified. That is, the TPT server 13 is provided by a business operator such as a broadcaster engaged in broadcasting television programs using the broadcasting apparatus 11. Therefore, domain_name is different from one business operator to another.

For example, trigger information includes a character string made up of values adapted to specify domain_name, program_id and media_time and predetermined characters such as "/" and "?mt=" that are connected together. More specifically, if domain_name is "xbc.com," program_id is "1," and media_time is "1000," the character string indicating the trigger information is "xbc.com/1?mt=1000." Therefore, attaching "http://" at the beginning of this character string provides a character string indicating the URL (Uniform Resource Locator) adapted to access the TPT server 13. It should be noted, however, that a URL rather than a domain name may be directly specified as domain_name.

It should be noted that desired information items may be included in trigger information and are not limited to those in the example shown in FIG. 12.

Trigger information is configured as described above.

[Details of the TPT]

A detailed description will be given below of the TPT. FIG. 13 is a diagram illustrating an example of a TPT format.

As illustrated in FIG. 13, a TPT includes a tpt element, command element, application element, event element and diffusion element.

Information about the TPT is written in the tpt element. The tpt element includes the id attribute, type attribute, version attribute, updating_time attribute, present_following attribute, end_mt attribute and expire_date attribute.

Information adapted to identify the TPT is specified as the id attribute. For example, a character string made up of domain_name and program_id connected by "/" is specified as the id attribute.

"static" or "dynamic" is specified as the type attribute as its attribute value. "static" is specified to update the TPT only if the program_id included in the trigger information is changed. On the other hand, "dynamic" is specified to update the TPT even if the program_id included in the trigger information remains unchanged.

Information indicating a version of the TPT is specified as the version attribute.

Information indicating the updating period of the TPT is specified as the updating_time attribute. The updating_time attribute is specified only when "dynamic" is specified as the type attribute.

"present" or "following" is specified as the present_following attribute as its attribute value. "present" indicates that the TPT is, for example, for the current television program. "following" indicates that the TPT is, for example, for the next television program.

Information indicating the end time of the media_time of the AV content appropriate to the TPT is specified as the end_mt attribute.

Information indicating the expiry date of the TPT is specified as the expire_date attribute. The expire_date attribute is specified only when "static" is specified as the type attribute.

Information related to a command is written in the command element. The command element includes the id attribute, start_time attribute, end_time attribute, destination attribute and action attribute.

Information adapted to identify the command is specified as the id attribute.

Information indicating the start time of the validity period of the command identified by the id attribute is specified as the start_time attribute. Information indicating the end time of the validity period of the command identified by the id attribute is specified as the end_time attribute.

That is, the validity period of the command is indicated by the start_time attribute and end_time attribute that indicate two points along the time axis over which the correlated AV content progresses. Then, when the timing at which the AV content progresses falls within the validity period, the valid command is enabled. On the other hand, if the timing at which the AV content progresses has yet to reach or has already exceeded the validity period, the valid command is disabled. On the other hand, the end_time attribute is not essential. If only the start_time attribute is specified, the valid command is enabled when the timing at which the AV content progresses exceeds the valid start time indicated by the start_time attribute.

The device to be controlled by the command in relation to a data broadcasting application is specified as the destination attribute. Here, the receiver itself (receiver 12) is specified as a device to be controlled by the command. In addition, if an external device (not shown) is connected to the receiver 12, the external device is specified as a device to be controlled by the command. For example, "receiver" is specified as the destination attribute if the receiver 12 is controlled by the command. "external_1" or "external_2" is specified as the destination attribute if the external device is controlled by the command. It should be noted, however, that if no device is specified as the destination attribute, it is assumed that "receiver" is specified.

The action attribute indicates that one of "execute," "register," "suspend," "terminate" and "event" is used as a command.

The execute command (execute) is designed to instruct the receiver 12 to acquire or activate a data broadcasting application.

The register command (register) is designed to instruct the receiver 12 to acquire or register a data broadcasting application.

The suspend command (suspend) is designed to instruct the receiver 12 to suspend and pause the data broadcasting application under execution.

The terminate command (terminate) is designed to instruct the receiver 12 to terminate the data broadcasting application under execution.

The event command (event) is designed to instruct the receiver 12 to fire an event in the data broadcasting application under execution.

Information about the data broadcasting application is written in the application element. The application element includes the id attribute, type attribute, url attribute, priority attribute, expire_date attribute and capability element.

An application ID adapted to identify the data broadcasting application is specified as the id attribute. An application type indicating information about the file attribute of the data broadcasting application and so on is specified as the type attribute. An application URL indicating the source of the data broadcasting application is specified as the url attribute if the execute or register command is used as a command. Therefore, the URL of the application server 14 is specified as the url attribute.

Information indicating the priority for acquiring and storing the data broadcasting application appropriate to the command is specified as the priority attribute. Information indicating the expiry date of the data broadcasting application is specified as the expire_date attribute. If the data broadcasting application is registered, the expiry date of the data broadcasting application and the priority for storing the application are stored, and the data broadcasting application is managed in accordance with the expiry date and priority.

It should be noted that the url and expire_date attributes are essential if the execute or register command is used as a command. On the other hand, "0" is normally specified as the priority attribute, and "1" is specified to raise the priority.

Various capabilities required of the receiver 12 are specified as the capability element. The capability element includes the essential attribute. "yes" is specified as the essential attribute when the required capability is essential, and "no" is specified if the capability is optional.

FIG. 14 is a diagram illustrating specific examples of values specified as the capability element.

When "flute" is specified as the capability element, it is verified whether the FLUTE session capability is available with the receiver 12. The receiver 12 receives the data broadcasting application transmitted by a FLUTE session if it supports the FLUTE session capability.

On the other hand, when "raptor" is specified as the capability element, it is verified whether the Raptor FEC capability is available. Raptor FEC is available in a FLUTE session if the receiver 12 supports the Raptor FEC capability. Further, when "htm15" or "browser_a" is specified as the capability element, it is verified whether the HTML5 or CE-HTML document format is available. The receiver 12 acquires the data broadcasting application written in one of these document formats if it supports that document format.

When "mp4" is specified as the capability element, it is verified whether MP4 format playback is available. The receiver 12 acquires the data broadcasting application in MP4 format if it supports MP4 format. Similarly, when "zip" is specified as the capability element, it is verified whether the wrapper for the zip format of files is available.

When "avc_40" is specified as the capability element, it is verified whether AVC level 4.0 playback is available. The receiver 12 receives content compression-coded according to AVC level 4.0 activated from the data broadcasting application if it supports this compression coding scheme. The same is true when "avc_42" is specified as the capability element.

When "mp3," "he_aac" or "dts" is specified as the capability element, it is verified whether MP3, HE_AAC3 (High Efficiency Advanced Audio Coding) or DTS (Digital Theater Systems) format playback is available. The receiver 12 acquires the data broadcasting application using audio data in one of these formats if it supports that format.

It should be noted that values relating to the capabilities required of the receiver 12 for the acquisition and playback of the data broadcasting application are specified as the capability element and that these values are not limited to the specific examples shown in FIG. 14.

Referring back to FIG. 13, information about event commands is written in the event element. The event element includes the id attribute and data element.

An event ID is specified as the id attribute. The event ID is adapted to identify an event to be fired in the data broadcasting application specified by the application ID if the event command is used as a command. On the other hand, additional event data is specified as the data element. Additional event data is referred to when an event is fired if the event command is used as a command.

It should be noted that the event element is essential if "event" is specified as the action attribute.

Information adapted to diffuse the probability of the timing at which to apply the command to the receiver 12 is specified as the diffusion element. Specifying this value prevents concentration of access from the plurality of receivers 12 by distributing access during the acquisition of the data broadcasting application by the plurality of receivers 12. The diffusion element includes the rate attribute, range attribute and period attribute. The number of divisions, maximum delay time and diffusion period for applying the command are specified respectively as these attributes.

[Example of Writing a TPT]

FIG. 15 is a diagram illustrating an example of writing a TPT.

In the example shown in FIG. 15, "xbc.com/1" is specified as the id attribute of the tpt element. That is, this means, for example, that the TPT is for a television program (program_id="1") broadcast by the xbc broadcasting station (domain_name="xbc.com").

Further, "static" is specified as the type attribute of the tpt element. Therefore, the TPT is updated only if the program_id is changed. Still further, "2011-01-21" is specified as the expire_date attribute. Therefore, the TPT is valid until Jan. 21, 2011.

It should be noted that all information is not given for simplification of the explanation. However, seven command elements are written in this tpt element.

In the first command element, "1" is specified as the id attribute, "0" as the start_time attribute, "600" as the end_time attribute, "receiver" as the destination attribute, and "register" as the action attribute. That is, the command (id=1) is the register command executed for the receiver 12 within a validity period from 0th second to 600th second.

Further, an application element is written between the start and end tags of the command element. In the application element, "1" is specified as the id attribute, "html" as the type attribute, "xxx.com/yyy1" as the url attribute, and "2011-01-21" as the expire_date attribute. That is, the application element means that a data broadcasting application (id=1) written in HTML (Hyper Text Markup Language) can be acquired from the application server 14 pinpointed by the URL, i.e., "xxx.com/yyy1." On the other hand, the data broadcasting application is valid until Jan. 21, 2011.

Further, "flute" is written as the capability element between the start and end tags of the application element. Still further, "no" is specified as the essential attribute of the capability element. That is, a FLUTE session is an optional capability. Therefore, the receiver 12 need not support the FLUTE session capability. In the case of this example of writing, if the receiver 12 does not support the FLUTE session capability, it is only necessary to acquire the data broadcasting application from the application server 14. Therefore, "no" is specified as the essential attribute.

Further, "avc_40" is written as the capability element, and "yes" is specified as the essential attribute thereof. That is, AVC level 4.0 is an essential capability. Therefore, the receiver 12 must support the capability to play back content compression-coded according to AVC level 4.0. In the case of this example of writing, if the receiver 12 does not support AVC level 4.0, it is unable to play back content activated from the data broadcasting application. Therefore, "yes" is specified as the essential attribute.

Similarly, the second command element indicates that the command (id=2) is the execute command executed for the receiver 12 within a validity period from 600th second to 3500th second. The second command element also means that the data broadcasting application (id=1) acquired in response to the execute command can be acquired from the application server 14 pinpointed by the URL, i.e., "xxx.com/yyy1." It should be noted that because the diffusion element is written, the receiver 12 accesses the application server 14 at a timing determined by the values specified as the rate, range and period attributes.

The third command element indicates that the command (id=3) is the event command executed for the data broadcasting application (id=1) executed by the receiver 12 within a validity period from 1800th second to 2000th second. Further, application and event elements are written between these start and end tags of the command element. "1" is specified as the id attribute in the application element. Further, "event1" is specified as the id attribute, and "zzzzzzz . . . z" is written as the data element in the event element. That is, the command causes the data broadcasting application to use the data, i.e., "zzzzzzz . . . z," as a result of firing of an event.

Further, the fourth command element indicates that the command (id=4) is the suspend command executed for the data broadcasting application (id=1) executed by the receiver 12 within a validity period from 2400th second to 2520th second. Still further, the fifth command element indicates that the command (id=5) is the terminate command executed for the data broadcasting application (id=1) executed by the receiver 12 within a validity period from 3500th second to 3600th second.

The sixth command element indicates that the command (id=12) is the execute command executed for the receiver 12 within a validity period from 2400th second to 2520th second. Further, in the application element between the start and end tags of the command element, "2" is specified as the id attribute, "html" as the type attribute, "xxx.com/yyy2" as the url attribute, and "2011-01-22" as the expire_date attribute. That is, this means that the data broadcasting application (id=2) acquired in response to the execute command can be acquired from the application server 14 pinpointed by the URL, i.e., "xxx.com/yyy2."

Similarly, the seventh command element indicates that the command (id=15) is the terminate command executed for the data broadcasting application (id=2) by the receiver 12 within a validity period from 2520th second to 3600th second.

It should be noted that a TPT can be written as desired and that the writing of a TPT is not limited to the example of writing shown in FIG. 15.

A TPT is configured as described above.

[Correlation between Trigger Information and Commands]

A description will be given next of an example of a process adapted to pinpoint a command correlated to trigger information using a TPT. FIG. 16 is a diagram illustrating an example of correlation between trigger information and commands.

As illustrated in FIG. 16, when trigger information is extracted from a video signal, the receiver 12 determines whether to acquire a TPT from the TPT server 13 based on domain_name and program_id included in the trigger information. It should be noted that, in the example shown in FIG. 16, the program_ids of programs A and B, i.e., television programs, commercials and so on, are "10" and "20," respectively.

We assume, for example, that the receiver 12 stores the TPT (for program A) for program A (program_id="10") broadcast by the xbc broadcasting station (domain_name="xbc.com"). When trigger information, i.e., "xbc.com/20?mt=Tb," is extracted from a video signal, the value of program_id has changed. Therefore, the receiver 12 determines that it should acquire a TPT. Then, the receiver 12 accesses the TPT server 13 pinpointed by the URL ("http://xbc.com/20?mt=Tb") acquired from the trigger information, acquiring the TPT.

As a result, the receiver 12 stores the TPT (for program B) shown in FIG. 16. It should be noted that the TPT shown in FIG. 16 is equivalent to that shown in FIG. 15. However, only the parameters such as the id attribute, start_time attribute, end_time attribute and action attribute of the command element and the id attribute and URL of the application element are shown here for simplification of the explanation.

Then, for example, if "Tb" is specified as media_time contained in the first trigger information ("xbc.com/20?mt=Tb"), the Tb falls within a validity period from T1s to T1e. As a result, the receiver 12 pinpoints the register command based on the TPT because the register command is appropriate to the id attribute of "1." Then, the receiver 12 acquires and registers a data broadcasting application with an application ID of "1" in accordance with the register command. Here, a data broadcasting application is basically acquired from a broadcasting wave. However, if the data broadcasting application cannot be acquired therefrom for some reason or other, it is acquired from the application server 14.

Next, if the second trigger information ("xbc.com/20?mt=Tc") is extracted, media_time, i.e., Tc, falls within the validity period from T3s to T3e. As a result, the receiver 12 pinpoints the execute command based on the TPT because the execute command is appropriate to the id attribute of "3." Then, the receiver 12 activates the acquired data broadcasting application in accordance with the execute command.

Next, if the third trigger information ("xbc.com/ 20?mt=Td") is extracted, media_time, i.e., Td, falls within the validity period from T5s to T5e. As a result, the receiver 12 pinpoints the suspend command based on the TPT because the suspend command is appropriate to the id attribute of "5." Then, the receiver 12 pauses the data broadcasting application under execution with an application ID of "1."

Further, media_time, i.e., Td, also falls within the validity period from T2s to T2e. As a result, the receiver 12 pinpoints the execute command based on the TPT because the execute command is appropriate to the id attribute of "2" in the command element. Then, the receiver 12 acquires and activates the data broadcasting application with an application ID of "2."

Then, although not illustrated in FIG. 16, if media_time included in the extracted trigger information falls within the validity period, the receiver 12 controls the operation of the data broadcasting application in accordance with the valid command.

As described above, if trigger information from the broadcasting apparatus 11 is extracted, the receiver 12 pinpoints the command appropriate to media_time included in the trigger information based on the stored TPT and controls the operation of the data broadcasting application in accordance with the pinpointed command.

[State Transition of the Data Broadcasting Application]

Figure 17:
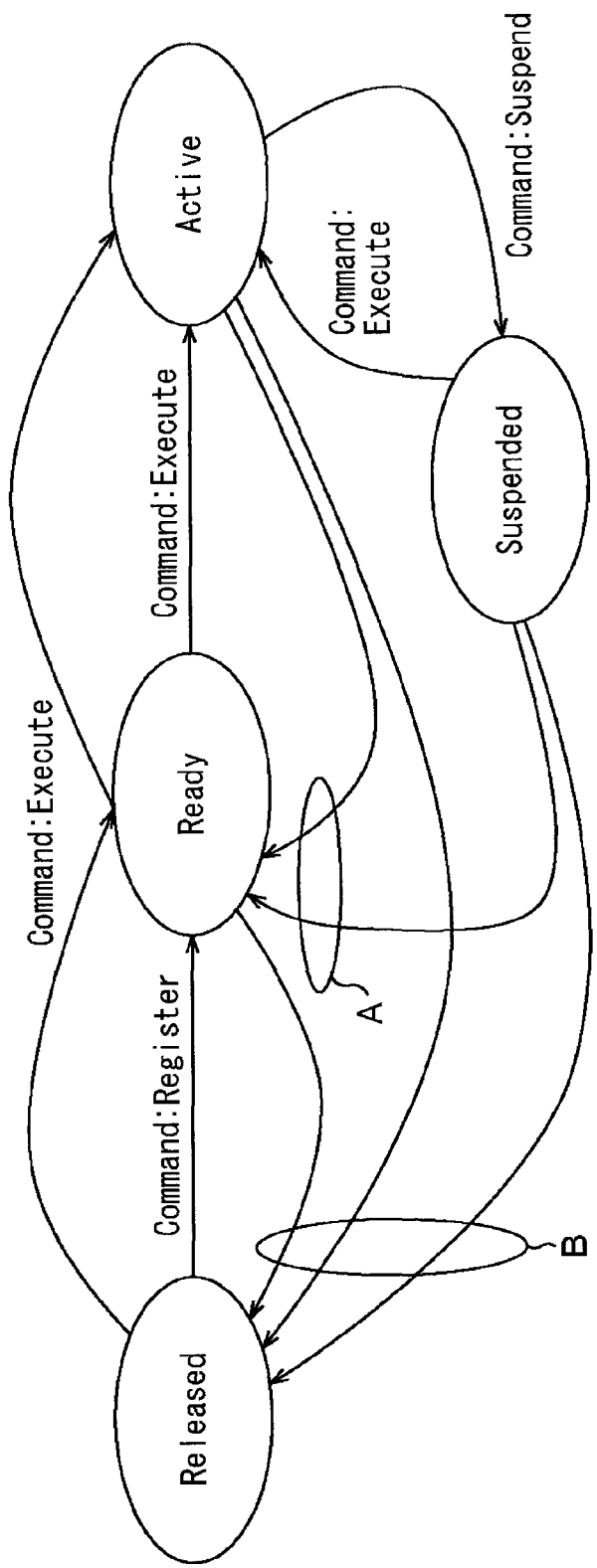
FIG. 17 is a diagram illustrating the state transitions of a data broadcasting application.

FIG. 17 is a state transition diagram of a data broadcasting application operating in the receiver 12 in accordance with the register, execute, event, suspend and terminate commands. As illustrated in FIG. 17, the data broadcasting application is defined to be in one of four different states, namely, released (Released), ready (Ready), active (Active) and suspended (Suspended) states.

The released state refers to the state in which the data broadcasting application has yet to be acquired by the receiver 12. The ready state refers to the state in which the data broadcasting application has been registered by the receiver 12 but has yet to be activated. The active state refers to the state in which the data broadcasting application has been activated and is currently under execution. The suspended state refers to the state in which the data broadcasting application has been suspended and the information indicating the state of the application at the time of suspension is stored in the save memory 66B.

If the register command is pinpointed and a data broadcasting application is acquired (registered) in accordance with the register command when the data broadcasting application is in the released state (when the application has yet to be acquired by the receiver 12), the application makes a transition to the ready state.

If the execute command is pinpointed and a data broadcasting application is activated in accordance with the execute command when the data broadcasting application is in the ready state, the application makes a transition to the active state.

On the other hand, if the execute command is pinpointed and a data broadcasting application is acquired and activated in accordance with the execute command when the data broadcasting application is in the released state (when the application has yet to be acquired by the receiver 12), the application makes a transition to the active state.

If the suspend command is pinpointed and a data broadcasting application is suspended in accordance with the suspend command when the data broadcasting application is in the active state, the application makes a transition to the suspended state.

If the execute command is pinpointed and a suspended data broadcasting application is resumed in accordance with the execute command when the data broadcasting application is in the suspended state, the application makes a transition to the active state.

If the terminate command is pinpointed and an active data broadcasting application is terminated in accordance with the terminate command when the data broadcasting application is in the active or suspended state, the application makes a transition to the ready state ("A" in FIG. 17). It should be noted that a transition to the ready state takes place not only based on the terminate command but also when other data broadcasting application is executed.

On the other hand, if the expiry date of a data broadcasting application for a command is exceeded when the application is in the ready, active or suspended state, the application makes a transition to the released state ("B" in FIG. 17).

[Method of Acquiring a Data Broadcasting Application]

A description will be given next of how a data broadcasting application transmitted by a broadcasting wave is acquired with reference to FIG. 18. If the register or execute command is pinpointed as a command correlated to trigger information based on a TPT, the receiver 12 attempts to acquire a data broadcasting application transmitted by a broadcasting wave. At this time, the receiver 12 refers to each of the tables, i.e., SMT, NRT-IT and FDT, transmitted by a broadcasting wave.

Figure 18:
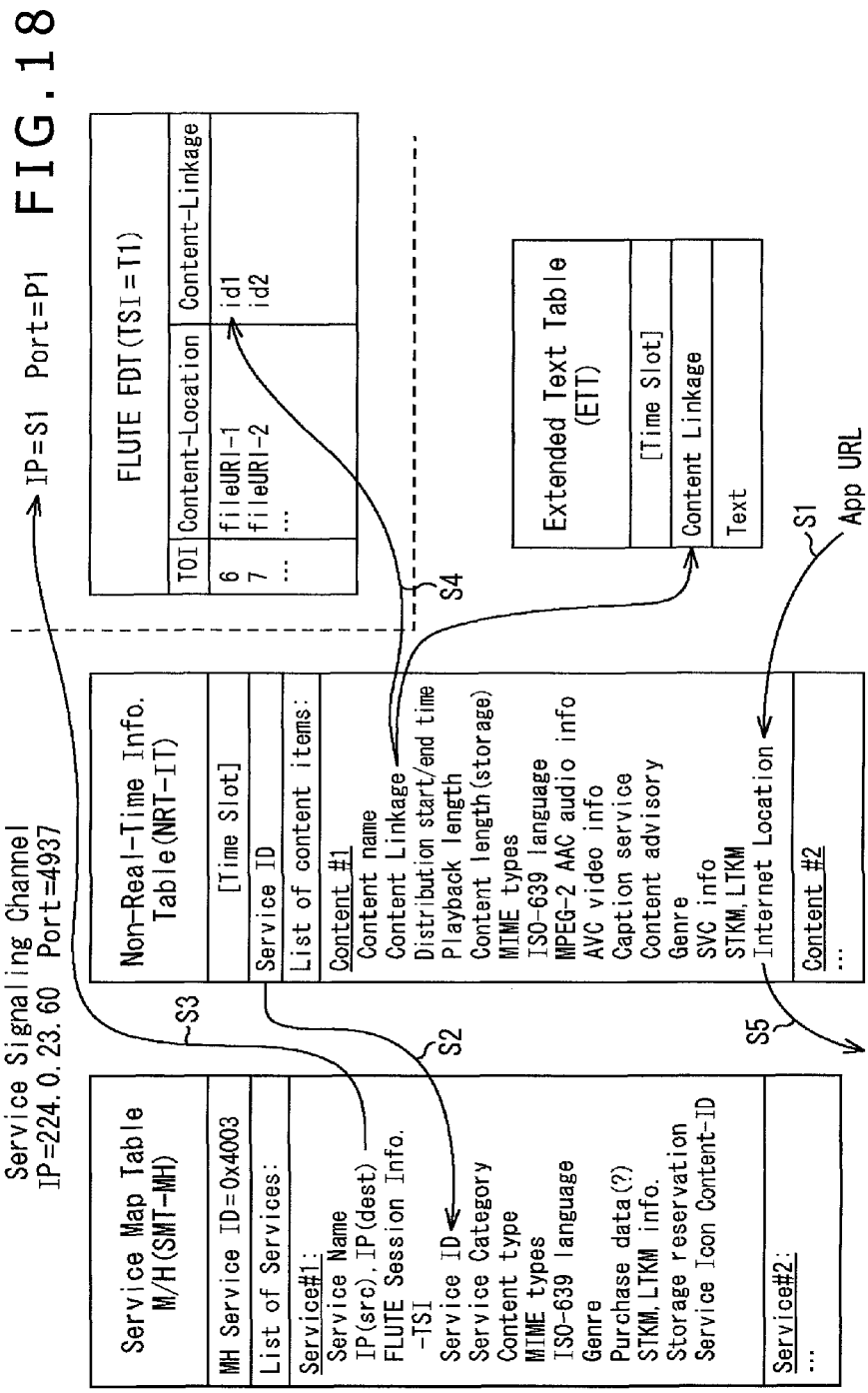
FIG. 18 is a diagram illustrating examples of tables transmitted by a broadcasting wave.

FIG. 18 is a diagram illustrating examples of tables transmitted by a broadcasting wave. In FIG. 18, an SMT, NRT-IT and FDT are shown.

Service level attribute information of an NRT service is written in an SMT (Service Map Table). For example, NRT-service-by-NRT-service attribute information such as Service#1, #2 and so on is written in an SMT.

The name of the NRT service is written in Service Name.

The IP addresses of the transmission source and transmission destination are written in IP(src) and IP(dest), respectively. On the other hand, a port number is written in FLUTE Session Info. A different port number is specified for each NRT service. That is, a FLUTE session is conducted by transmitting a series of IP packets that are differentiated one from the other by the IP addresses of the IP packet transmission source and destination and the port number of the destination. Each of the NRT services is pinpointed by a combination of these IP addresses and the port number.

Identification information of the NRT service is written in Service ID. Further, the category to which the NRT service belongs is written in Service Category. The type of content provided by the NRT service is written in Content type. For example, a MIME type such as HTML is written in MIME types. A language such as Japanese or English is written in ISO-639 language. Information about the genre to which the NRT content belongs is written in Genre.

It should be noted that although not described in detail, it is possible to write, in SMT, other information about NRT service such as Purchase data, STKM, LTKM info, Storage reservation and Service Icon Content-ID.

Content level attribute information included in an NRT service is written in NRT-IT (NRT Information Table). For example, NRT-content-by-NRT-content attribute information such as Content#1, #2 and so on is written in NRT-IT.

The Service ID adapted to identify the NRT service is written in NRT-IT. This Service ID is correlated to the Service ID of each NRT service written in the SMT.

The name of the NRT content is written in Content name. Identification information of the NRT content is written in Content Linkage. It should be noted, however, that Content Linkage may be written as Content ID. Information indicating the start and end times of the NRT content is written in Distribution start/end time. The playback time of the NRT content is written in Playback length. The amount of the NRT content data stored in the storage is written in Content length.

For example, a MIME type such as HTML is written in MIME types. A language such as Japanese or English is written in ISO-639 language. Information about video and audio data compression is written respectively in MPEG-2 AAC audio info and AVC video info. Information about caption is written in Caption service.

Further, for example, the URL of the application server 14 is written in Internet Location as information adapted to acquire a data broadcasting application delivered via the Internet 20. That is, the receiver 12 can acquire a data broadcasting application from the application server 14 via the Internet 20 by referring to Internet Location if it fails to acquire the application transmitted by a broadcasting wave for some reason or other. It should be noted, however, that Internet Location may be written as Content URL.

It should be noted that although not described in detail, it is possible to write, in NRT-IT, other information about NRT content such as Content advisory, Genre, SVC info and STKM, LTKM info.

Attribute information about a file to be delivered using a FLUTE session is written in an FDT (File Delivery Table). For example, TOI, Content Location and Content Linkage are written in an FDT in a manner correlated with each other.

Identification information of a file object to be transmitted is written in TOI (Transport Object Identifier). 0 is written in TOI of the FDT Instance, and identification information to be stored in the download header, for example, is written in TOI of the file object to be transmitted.

Identification information of a file is written in Content Location in the form of a URI (Uniform Resource Identifier). Identification information of NRT content is written in Content Linkage. This Content Linkage is correlated to Content Linkage of each piece of NRT content written in the NRT-IT.

It should be noted that TOI, Content Location and Content Linkage are examples of attribute information written in an FDI and that other attribute information can also be written therein.

Content Linkage and Text are written in ETT (Extended Text Table) in a manner correlated with each other. Identification information of content is written in Content Linkage. This Content Linkage is correlated to Content Linkage of each piece of NRT content written in the NRT-IT. Text information is written in Text.

Each of the tables, i.e., SMT, NRT-IT, FDT and ETT, is configured as described above.

Incidentally, the receiver 12 acquires a data broadcasting application transmitted by a broadcasting wave by referring to the SMT, NRT-IT and FDT. This is achieved more specifically in the following manner. It should be noted that we assume that a data broadcasting application is transmitted as the above NRT content (in place of NRT content).

That is, if the receiver 12 pinpoints, based on the TPT, the register or execute command as a command correlated to trigger information, the URL of the application server 14 is specified in each of these commands as an application URL adapted to indicate the source of the data broadcasting application. Therefore, the receiver 12 acquires that URL.

Then, the receiver 12 searches the Internet Locations of the pieces of NRT content written in the NRT-IT for the URL matching the acquired application URL by referring to the NRT-IT, thus pinpointing the NRT content meeting this requirement (S1).

Next, the receiver 12 searches for the same Service ID (SMT) as the Service ID (NRT-IT) correlated to the Internet Location pinpointed in S1 by referring to the SMT, pinpointing the NRT service meeting this requirement (S2). Further, the receiver 12 acquires the IP(src), IP(dest) and FLUTE Session Info correlated to the Service ID pinpointed in S2. Then, the receiver 12 acquires the FDT with TOI=0 from the FLUTE session (TSI=T1) pinpointed by a combination of the acquired IP addresses (S1) and port number (P1) (S3).

Next, the receiver 12 searches for the same Content Linkage (FDT) as the Content Linkage (NRT-IT) correlated to the Internet Location pinpointed in S1 by referring to the FDT acquired in S3, pinpointing the Content Linkage (Content Linkage=id1) meeting this requirement (S4). Then, the receiver 12 pinpoints the TOI (TOI=6) correlated to the Content Linkage pinpointed in S4.

As a result, the receiver 12 acquires a data broadcasting application based on the object identified by the pinpointed TOI (TOI=6) in the FLUTE session (TSI=T1).

As described above, a URL is basically written in Internet Location of the NRT-IT. This URL is used to acquire a data broadcasting application from the application server 14 via the Internet 20 if the application transmitted by a broadcasting wave cannot be acquired. In the present technology, the URL written there is correlated to the application URL written in the TPT. Then, when the Internet Location of the NRT-IT is pinpointed, the TOI of the FDT is pinpointed by reverse lookup, so to speak, by referring to the SMT and NRT-IT. As a result, the data broadcasting application transmitted by a FLUTE session is acquired.

It should be noted that if the receiver 12 fails to acquire the data broadcasting application transmitted by a broadcasting wave by the above method, it acquires the application from the application server 14 via the Internet 20 as originally intended by referring to the Internet Location of the NRT-IT (S5).

A description has been given of how a data broadcasting application transmitted by a broadcasting wave is acquired.

[Trigger Information Correlation Process]

A description will be given next of the trigger information correlation process performed when the receiver 12 receives trigger information with reference to the flowcharts shown in FIGS. 19 to 21.

(Trigger Information Correlation Process)

A description will be given first of the trigger information correlation process with reference to the flowchart shown in FIG. 19. It should be noted that this trigger information correlation process is performed repeatedly while the user watches a television program, that is, while the receiver 12 receives a broadcasting signal.

When a given channel is selected by user operation, the receiver 12 starts to display the image of the television program of that channel (step S11).

In step S12, the trigger extraction section 57 waits until trigger information can be extracted from the video signal from the video decoder 55. Then, if trigger information is extracted from the video signal after the reception of trigger information included in the broadcasting signal by the receiver 12, the process proceeds to step S13.

In step S13, the control section 58 analyzes the trigger information extracted by the trigger extraction section 57, determining whether either or both of the domain_name and program_id included in the trigger information have changed. When it is determined in step S13 that either or both of domain_name and program_id have changed, the process proceeds to step S14.

In step S14, the control section 58 accesses the TPT server 13 pinpointed by the URL acquired, for example, by adding "http://" at the beginning of the trigger information by controlling the communication I/F 61, requesting a TPT. Then, the TPT analysis section 62 acquires the TPT from the TPT server 13 by controlling the communication I/F 61.

In step S15, the TPT analysis section 62 analyzes the acquired TPT, determining whether a TPT with the same id and version has already been acquired. It should be noted that the id and version are specified, for example, by the id and version attributes of the tpt element, respectively. If it is determined in step S15 that a TPT with the same id and version has yet to be acquired, the process proceeds to step S16.

In step S16, the TPT analysis section 62 stores the acquired TPT (e.g., the TPT shown in FIG. 15), and the process proceeds to step S18.

On the other hand, if it is determined in step S13 that none of the domain_name and program_id have changed, the process proceeds to step S17.

In step S17, the TPT analysis section 62 determines whether the updating period indicated by the updating_time attribute written in the stored TPT has been exceeded. When it is determined in step S17 that the updating period has been exceeded, the process proceeds to step S14. Then, the TPT analysis section 62 acquires a new TPT from the TPT server 13. The new TPT is stored if a TPT with the same id and version has yet to be acquired.

It should be noted that when it is determined in step S15 that a TPT with the same id and version has been acquired, or if it is determined in step S17 that the updating period has yet to be exceeded, the process proceeds to step S18.

In step S18, the control section 58 determines, based on the TPT from the TPT analysis section 62, whether there is any command for which media_time included in the trigger information from the trigger extraction section 57 falls within the validity period. When it is determined in step S18 that there is a command for which media_time falls within the validity period, the process proceeds to step S19.

In step S19, the control section 58 performs the application control process by controlling the flute processing section 63 and application engine 64. In this application control process, a valid command for which media_time falls within the validity period is pinpointed, and one of acquisition or registration of the data broadcasting application, acquisition or activation thereof, firing of an event, suspension of the data broadcasting application or termination thereof is controlled in accordance with the pinpointed command.

It should be noted that the application control process will be described in detail later with reference to the flowchart shown in FIG. 20.

In step S20, the control section 58 determines whether the target valid command is the last appropriate command that falls within the validity period. If it is determined in step S20 that the target valid command is not the last appropriate command, the process returns to step S19 to repeat the subsequent processes. That is, the processes in steps S19 and S20 are repeated until the execution of all the valid commands is complete.

On the other hand, when it is determined in step S20 that the target valid command is the last appropriate command, or if it is determined in step S18 that there is no command for which media_time falls within the validity period, the process returns to step S12 to repeat the subsequent processes.

This concludes the description of the trigger information correlation process.

(Application Control Process)

A detailed description will be given next of the application control process for step S19 shown in FIG. 19 with reference to the flowchart shown in FIG. 20.

In step S31, the control section 58 pinpoints, based on the TPT from the TPT analysis section 62, which one of the register, execute, terminate, event and suspend commands is the valid command for which media_time, included in the trigger information extracted by the trigger extraction section 57, falls within the validity period. That is, the TPT is used as a dictionary adapted to pinpoint the command from media_time included in the trigger information.

In step S32, the control section 58 determines whether the command pinpointed in step S31 is the register command. When it is determined that the command is the register command, the process proceeds to step S33.

In step S33, the control section 58 performs the application acquisition process by controlling the flute processing section 63. In this application acquisition process, the SMT and NRT-IT are looked up in reverse based on the Internet Location of the NRT-IT correlated to the application URL of the TPT, allowing for a data broadcasting application transmitted by a FLUTE session to be acquired. The flute processing section 63 stores the acquired data broadcasting application in the cache memory 65.

Further, the control section 58 stores the expiry date of the acquired data broadcasting application and the priority for storing the application in a manner correlated to the application in the memory 59. As a result, the data broadcasting application stored in the cache memory 65 is managed by the control section 58 in accordance with the expiry date and priority for storing the application.

It should be noted that the application acquisition process will be described in detail later with reference to the flowchart shown in FIG. 21.

Figure 19:
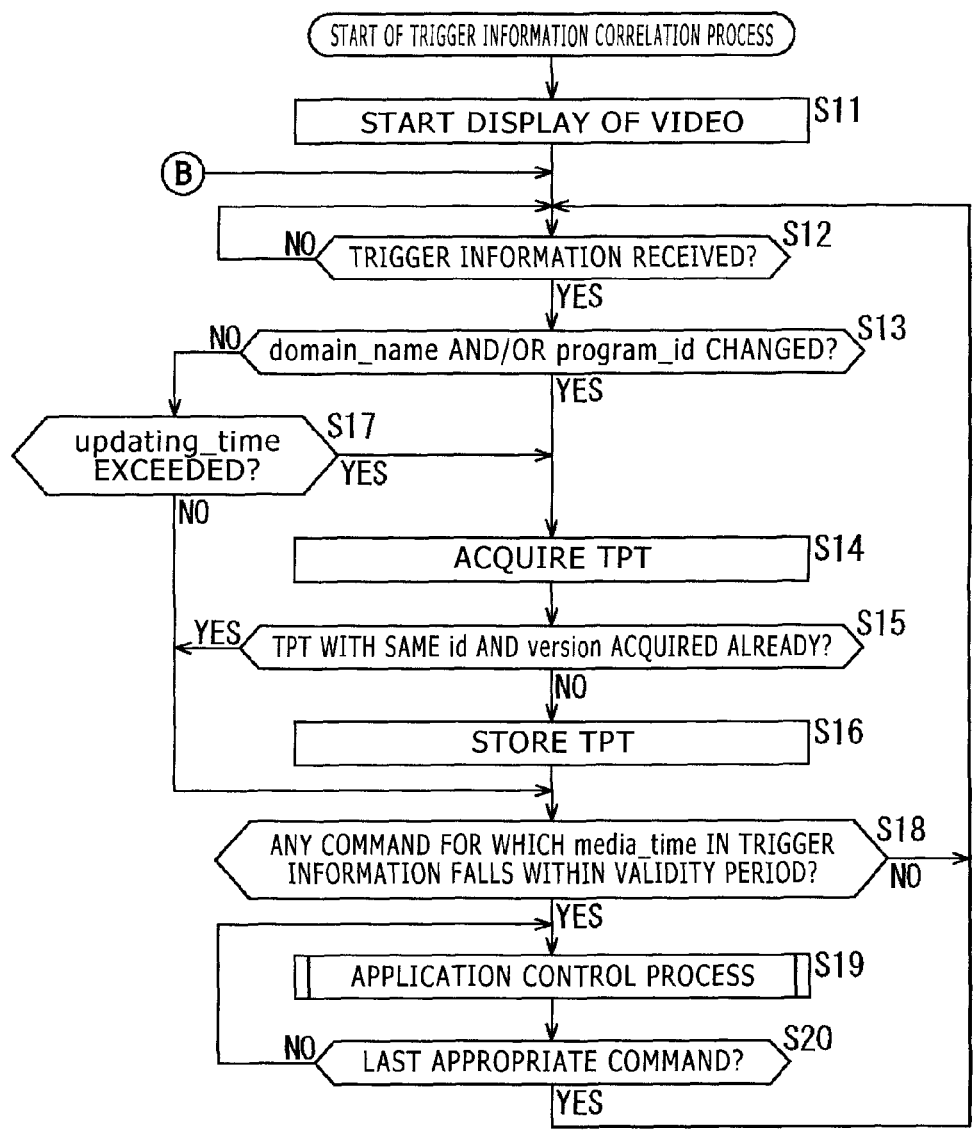
FIG. 19 is a flowchart describing a trigger information correlation process.

Then, the process returns to step S19 shown in FIG. 19 to repeat the subsequent processes.

If it is determined in step S32 that the command pinpointed in step S31 is not the register command, the process proceeds to step S34. In step S34, the control section 58 determines whether the command pinpointed in step S31 is the execute command. When it is determined that the command is the execute command, the process proceeds to step S35.

In step S35, the application engine 64 determines, under control of the control section 58, whether the data broadcasting application pinpointed by the application ID of the TPT is suspended (in the suspended state). More specifically, the application engine 64 determines that the data broadcasting application pinpointed by the application ID is suspended if the data indicating the suspension of the application is saved in the save memory 66B.

If it is determined in step S35 that the data broadcasting application pinpointed by the application ID is not suspended, the process proceeds to step S36. If the data broadcasting application pinpointed by the application ID has yet to be acquired (is not stored in the cache memory 65), the application engine 64 performs the application acquisition process in step S36 under control of the control section 58, acquiring the application.

It should be noted that the application acquisition process will be described in detail later with reference to the flowchart shown in FIG. 21.

In step S37, the application engine 64 terminates the data broadcasting application under execution (if any) under control of the control section 58. Then, in step S38, the application engine 64 activates the data broadcasting application pinpointed by the application ID under control of the control section 58.

On the other hand, when it is determined in step S35 that the data broadcasting application pinpointed by the application ID is suspended (in the suspended state), the process proceeds to step S39.

In step S39, the application engine 64 moves the data in the save memory 66B to the work memory 66A under control of the control section 58, activating the data broadcasting application pinpointed by the application ID. As a result, the suspended data broadcasting application pinpointed by the application ID is resumed from the suspended state. Then, the process returns to step S19 shown in FIG. 19 to repeat the subsequent processes.

If it is determined in step S34 that the command pinpointed in step S31 is not the execute command, the process proceeds to step S40. In step S40, the control section 58 determines whether the command pinpointed in step S31 is the event command. When it is determined that the command is the event command, the process proceeds to step S41.

In step S41, the control section 58 controls the application engine 64 to fire (execute) the event correlated to the event ID of the command in the data broadcasting application under execution only if the application ID pinpointed by the TPT matches that of the data broadcasting application under execution. Then, the process returns to step S19 shown in FIG. 19 to repeat the subsequent processes.

If it is determined in step S40 that the command pinpointed in step S31 is not the event command, the process proceeds to step S42. In step S42, the control section 58 determines whether the command pinpointed in step S31 is the suspend command. When it is determined that the command is the suspend command, the process proceeds to step S43.

In step S43, the application engine 64 saves the data indicating the state of the data broadcasting application under execution to the save memory 66B under control of the control section 58. Then, the process returns to step S19 shown in FIG. 19 to repeat the subsequent processes.

If it is determined in step S42 that the command pinpointed in step S31 is not the suspend command, the command pinpointed in step S31 is the terminate command. Therefore, the process proceeds to step S44.

In step S44, the application engine 64 terminates the data broadcasting application pinpointed by the application ID if the application is under execution under control of the control section 58. In step S45, the application engine 64 deletes the data relating to the data broadcasting application pinpointed by the application ID from the work memory 66A and save memory 66B and also deletes the data broadcasting application from the cache memory 65 under control of the control section 58. Then, the process returns to step S19 shown in FIG. 19 to repeat the subsequent processes.

This concludes the description of the application control process. The application control process makes it possible to activate or terminate a data broadcasting application, fire an event and terminate the application, for example, in response to a television program. Further, the application control process makes it possible to suspend a data broadcasting application while maintaining the state of the active application, execute and terminate other data broadcasting application, and then resume the suspended data broadcasting application from the suspended state.

(Application Acquisition Process)

A detailed description will be given next of the application acquisition process for step S33 or S36 shown in FIG. 20 with reference to the flowchart shown in FIG. 21.

In step S51, the control section 58 verifies whether the receiver 12 has the capability specified as the capability element of the TPT from the TPT analysis section 62. Here, if "avc_40" is specified as the capability element, it is verified whether the receiver 12 supports the capability to play back content compression-coded according to AVC level 4.0.

In step S52, the control section 58 determines, based on the verification result of step S51, whether the receiver 12 meets the requirement specified as the capability element. When it is determined in step S52 that the receiver 12 meets the requirement specified as the capability element, the process proceeds to step S53.

In step S53, the control section 58 determines whether "flute" is specified as the capability element of the TPT. When it is determined in step S53 that "flute" is specified as the capability element of the TPT, an NRT service is transmitted by a broadcasting wave. Therefore, the process proceeds to step S54.

In step S54, the flute processing section 63 determines, under control of the control section 58 and by referring to the NRT-IT, whether the same Internet Location as the application URL acquired from the TPT is specified. When it is determined in step S54 that the same URL is specified, the process proceeds to step S55.

In step S55, the flute processing section 63 searches for the same Service ID (SMT) as the Service ID (NRT-IT) correlated to the Internet Location under control of the control section 58 and by referring to the SMT, pinpointing the NRT service meeting the requirement.

In step S56, the flute processing section 63 acquires the IP(src), IP(dest) and FLUTE Session Info correlated to the pinpointed Service ID under control of the control section 58, thus acquiring the FDT with TOI=0 from the FLUTE session pinpointed by a combination of the acquired IP addresses and FLUTE Session Info.

In step S57, the flute processing section 63 searches for the same Content Linkage (FDT) as the Content Linkage (NRT-IT) correlated to the Internet Location under control of the control section 58 and by referring to the FDT, pinpointing the TOI correlated to the Content Linkage meeting this requirement.

In step S58, the flute processing section 63 acquires, based on the object identified by the pinpointed TOI, the data broadcasting application in a FLUTE session under control of the control section 58, storing the application in the cache memory 65. As a result, the data broadcasting application has been acquired from a broadcasting wave.

On the other hand, if it is determined in step S53 that "flute" is not specified as the capability element, or if it is determined in step S54 that the same URL is not specified, the data broadcasting application cannot be acquired from a broadcasting wave. Therefore, the process proceeds to step S59.

In step S59, the application engine 64 accesses the application server 14 via the Internet 20 by controlling the communication I/F 61 under control of the control section 58, requesting the data broadcasting application. The communication I/F 61 receives the data broadcasting application from the application server 14, storing the application in the cache memory 65. In this case, the data broadcasting application is acquired via the Internet 20 rather than a broadcasting wave. It should be noted that, as for the URL used to access the application server 14, either the Internet Location of the NRT-IT or the application URL of TPT may be referred to.

Figure 20:
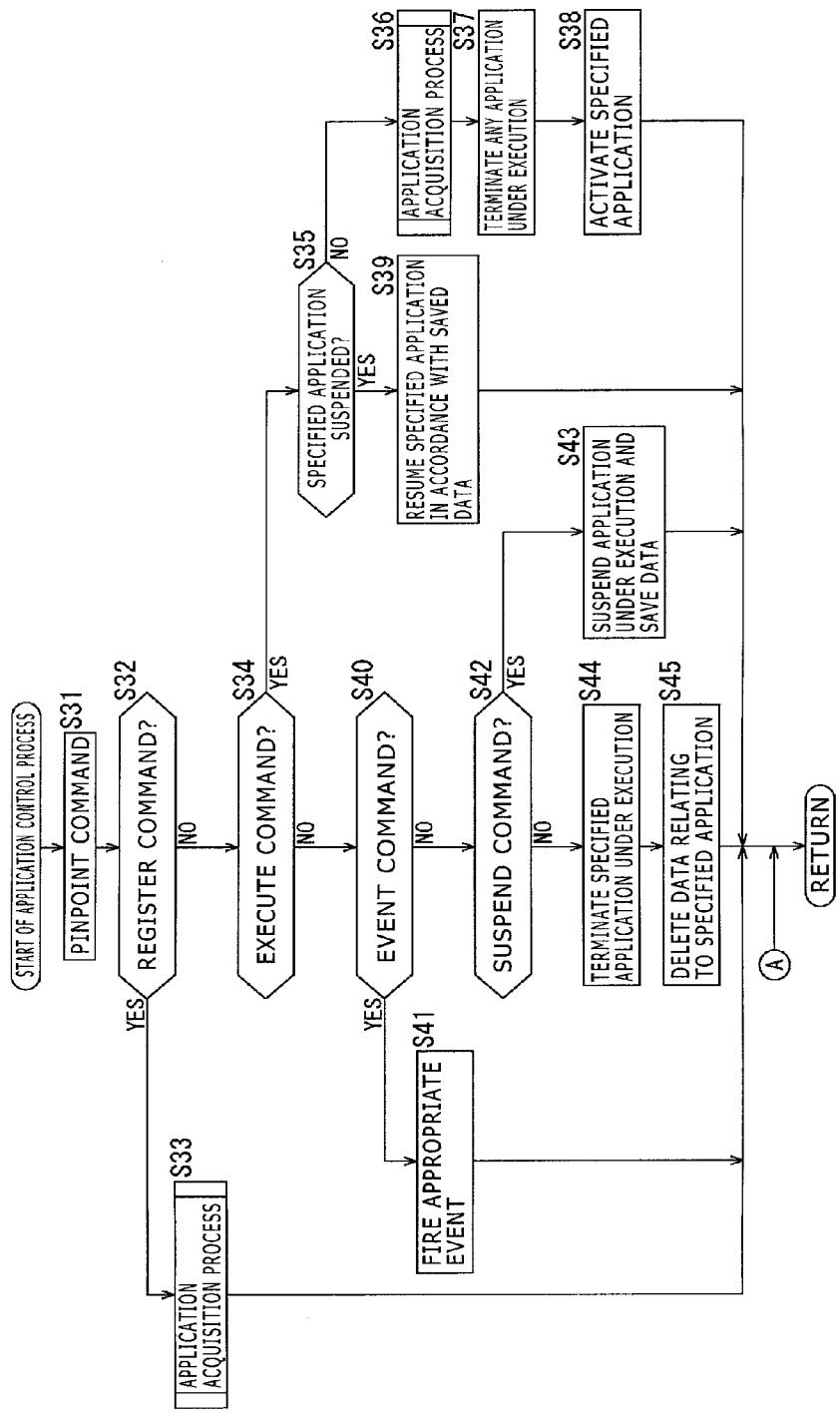
FIG. 20 is a flowchart describing an application control process.
Figure 21:
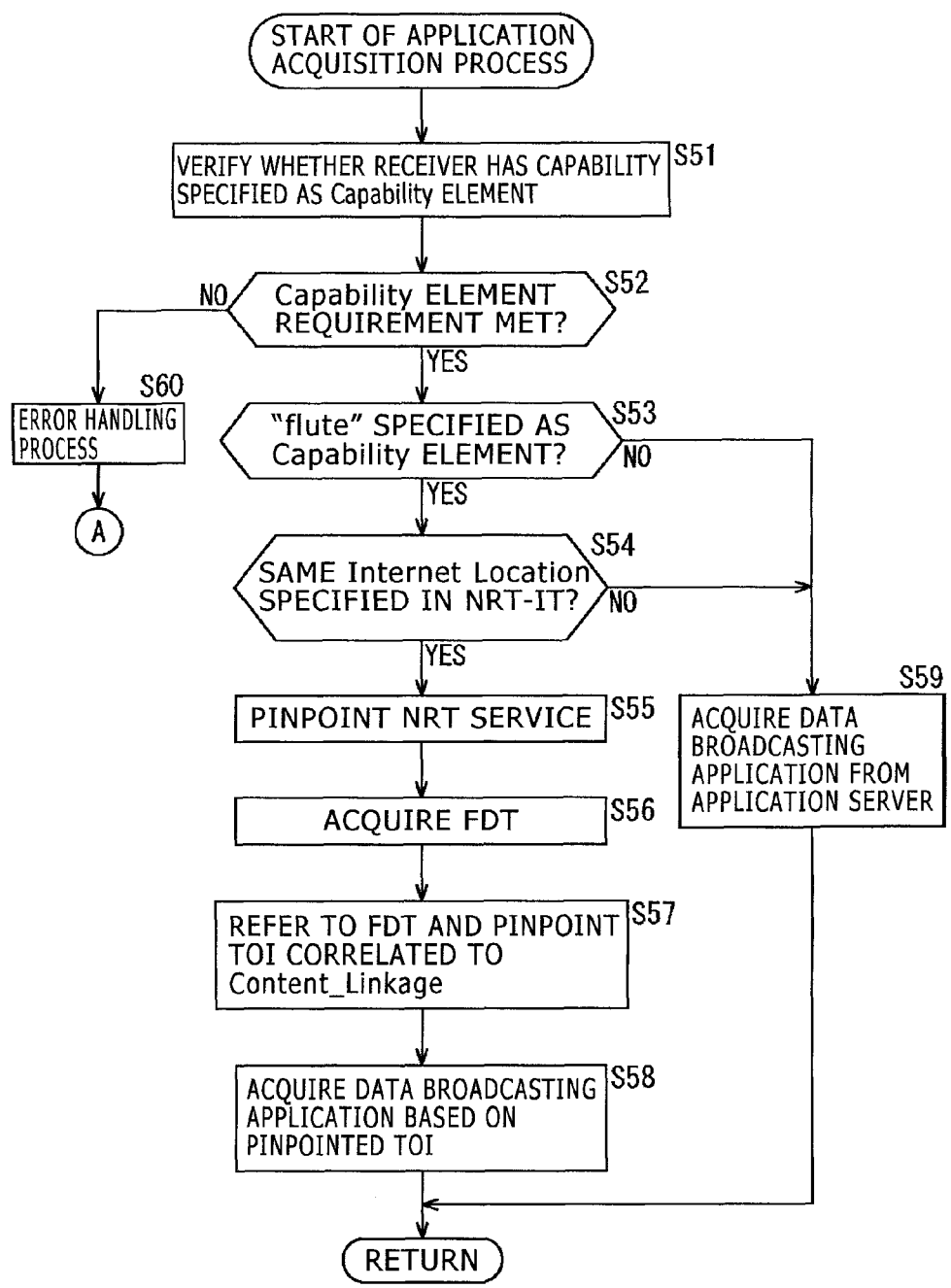
FIG. 21 is a flowchart describing an application acquisition process.

When the process in step S58 or S59 ends, the process returns to step S33 or S36 shown in FIG. 20 to repeat the subsequent processes.

It should be noted that if it is determined in step S52 that the receiver 12 does not meet the requirement specified as the capability element, the process proceeds to step S60. In step S60, the control section 58 disables the command. Then, the process returns to step S19 shown in FIG. 19 to repeat the subsequent processes.

This concludes the description of the application acquisition process. In the application acquisition process, a data broadcasting application transmitted by a broadcasting wave is, as a general rule, acquired.

However, if no NRT service is provided, or if the data broadcasting application to be acquired by the receiver 12 is not available in a broadcasting wave, the data broadcasting application is acquired from the application server 14 via the Internet 20.

[Method of Acquiring a TPT]

Incidentally, it was described above that a new TPT file is acquired when either a value of domain_name or program_id changes. However, when a TPT file is acquired, that appropriate to the capability of the receiver 12 may be acquired. For example, if a plurality of data broadcasting applications are available for different capabilities of the receiver 12, separate TPT files, one appropriate to each capability class, are made available.

Figure 22:
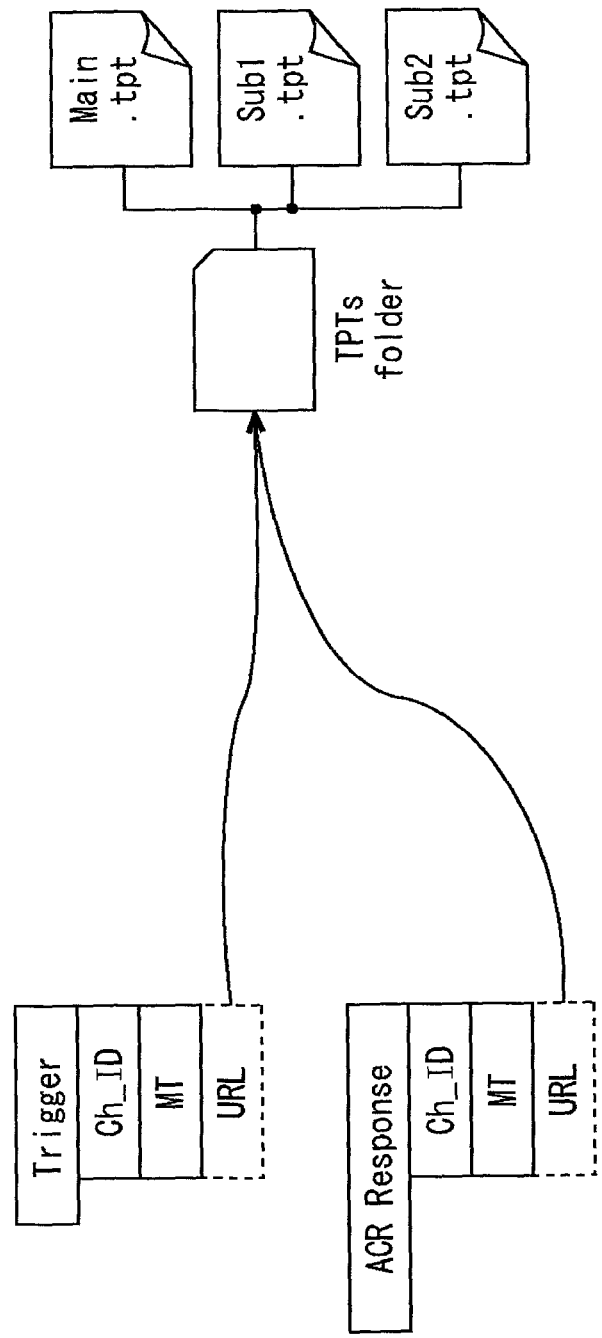
FIG. 22 is a diagram illustrating the hierarchical structure of a TPT file.

As illustrated in FIG. 22, the TPT server 13 retains and stores TPT files, one appropriate to each class, in a given TPT folder. The receiver 12 accesses the TPT server 13 based on the URL acquired from trigger information transmitted in a broadcasting wave. In the URL, the given TPT folder is specified rather than the given TPT file. On the other hand, the priority for acquiring TPT files is set in advance in the receiver 12, making it possible to specify the TPT files stored in the TPT folder in accordance with the priority.

For example, if TPT files, i.e., Main.tpt, Sub1.tpt and Sub2.tpt, are stored in the TPT folder in the TPT server 13, and when the priority set in the receiver 12 is, in descending order, Main.tpt, Sub1.tpt and Sub2.tpt, the receiver 12 attempts to acquire the files in the order of the priority. At this time, the receiver 12 can access a given file stored in the TPT folder by adding the character string of the TPT file name to the character string indicating the URL acquired from the trigger information.

On the other hand, assuming, for example, that Main.tpt is the TPT file appropriate to the class requiring the highest capability, Sub1.tpt the TPT file appropriate to the class requiring the second highest capability, and Sub2.tpt the TPT file appropriate to the class requiring the lowest capability, the receiver 12 acquires Main.tpt first to verify whether its capability meets the required capability. When the required capability is met, the receiver 12 stores Main.tpt as a TPT.

On the other hand, if the capability required by Main.tpt is not met, the receiver 12 acquires Sub1.tpt next. When the capability required by Sub1.tpt is met, the receiver 12 stores Sub1.tpt as a TPT. If not, the receiver 12 acquires Sub2.tpt next. When the capability required by Sub2.tpt is met, the receiver 12 stores Sub2.tpt as a TPT.

On the other hand, if the capability required by Sub2.tpt is not met, the receiver 12 refrains from performing the operation adapted to acquire a TPT and that adapted to acquire a data broadcasting application until either of a value of domain_name or program_id included in the trigger information is changed.

It should be noted that although trigger information included in a broadcasting wave was described above, TPT files, one appropriate to each class, are acquired in the same manner if trigger information (ACR Response) appropriate to the identification result of the ACR identification process, which will be described later as a second embodiment, is acquired.

[Details of TPT Appropriate to Class]

FIG. 23 is a diagram illustrating an example of a TPT format appropriate to each class.

The TPT shown in FIG. 23 differs from that shown in FIG. 13 in that the capability element has been added to the tpt element and that the capability element has been deleted from the application element. The TPT shown in FIG. 23 is the same as that shown in FIG. 13 in all other respects. Therefore, the description thereof is omitted.

Various capabilities required of the receiver are specified as the capability element of the tpt element. The capability element includes the essential attribute. "yes" is specified as the essential attribute when the required capability is essential, and "no" is specified if the capability is optional.

It should be noted that the values shown in FIG. 14 are, for example, specified as the capability element.

[Example of Writing a TPT Appropriate to a Class]

FIG. 24 is a diagram illustrating an example of writing a TPT appropriate to each class.

"flute" is written as the capability element next to the start tag of the tpt element. Further, "no" is specified as the essential attribute of the capability element. That is, a FLUTE session is an optional capability. Therefore, the receiver 12 need not support the FLUTE session capability. In the case of this example of writing, if the receiver 12 does not support the FLUTE session capability, it is only necessary to acquire the data broadcasting application from the application server 14. Therefore, "no" is specified as the essential attribute.

Further, "avc_40" is specified as the capability element, and "yes" is specified as the essential attribute thereof. That is, AVC level 4.0 is an essential capability. Therefore, the receiver 12 must support the capability to play back content compression-coded according to AVC level 4.0. In the case of this example of writing, if the receiver 12 does not support AVC level 4.0, it is unable to play back content activated from the data broadcasting application. Therefore, "yes" is specified as the essential attribute.

It should be noted that the writing other than the above is basically the same as the example of writing a TPT shown in FIG. 15. Therefore, the description thereof is omitted.

[TPT Acquisition Process]

Figure 25:
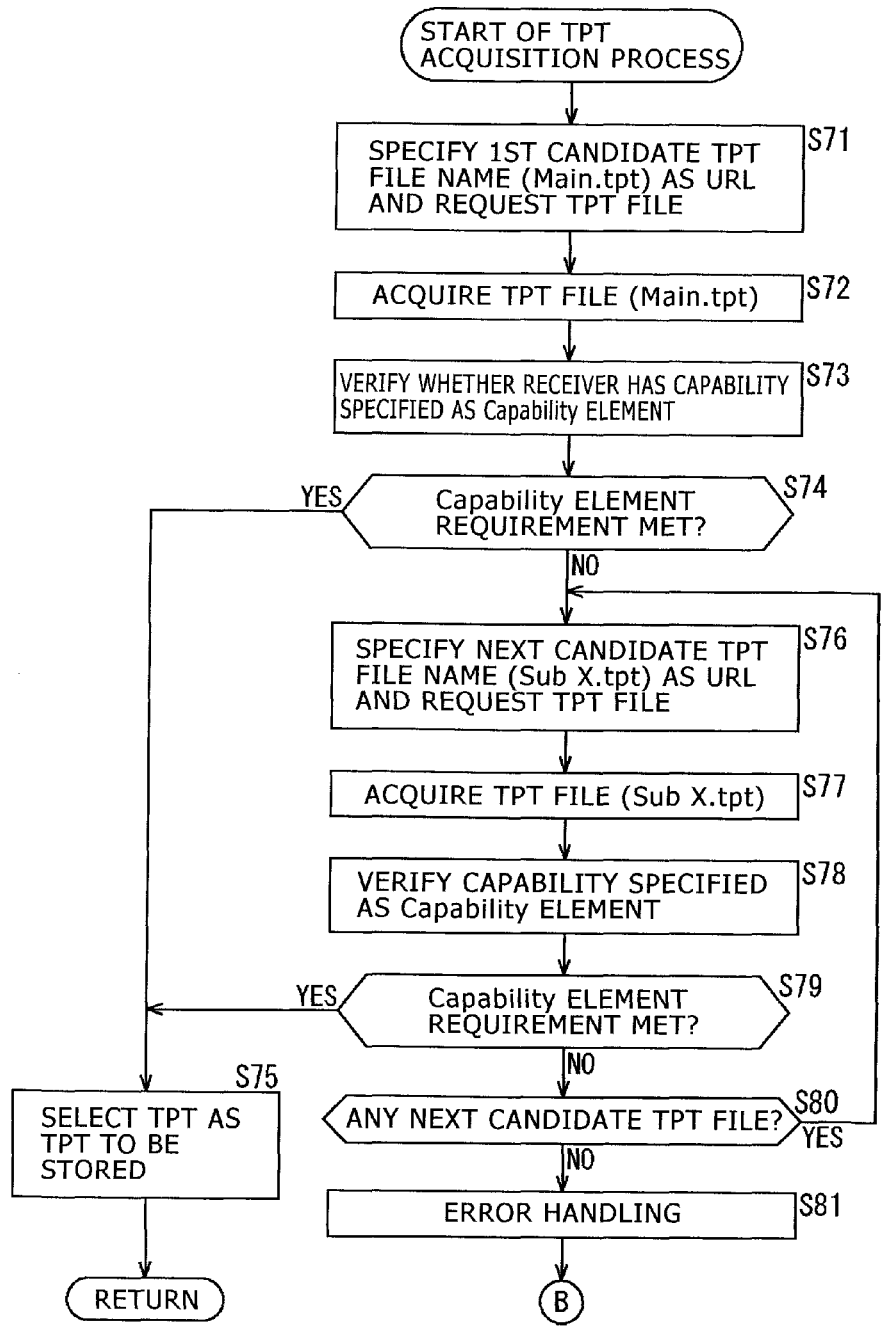
FIG. 25 is a flowchart describing a TPT acquisition process.

A description will be given next of the TPT acquisition process with reference to the flowchart shown in FIG. 25. It should be noted that the TPT acquisition process is appropriate to step S14 in FIG. 19.

In step S71, the control section 58 specifies the first candidate TPT file name (e.g., Main.tpt) as the URL acquired from the extracted trigger information, accessing the TPT server 13 by controlling the communication I/F 61 and requesting the TPT file.

In step S72, the TPT analysis section 62 acquires the TPT file (e.g., Main.tpt) from the TPT server 13 by controlling the communication I/F 61.

In step S73, the control section 58 verifies whether the receiver 12 has the capability specified as the capability element of the TPT from the TPT analysis section 62. Here, if "avc_42" is specified as the capability element, it is verified whether the receiver 12 supports the capability to play back content compression-coded according to AVC level 4.2.

In step S74, the control section 58 determines, based on the verification result of step S73, whether the receiver 12 meets the requirement specified as the capability element. When it is determined in step S74 that the receiver 12 meets the requirement specified as the capability element, the process proceeds to step S75.

In step S75, the control section 58 selects the TPT file meeting the requirement specified as the capability element as a file to be stored. As a result, the TPT file is stored by the TPT analysis section 62 in step S16 of FIG. 19.

On the other hand, if it is determined in step S74 that the receiver 12 does not meet the requirement specified as the capability element, the process proceeds to step S76. In step S76, the control section 58 specifies the second candidate TPT file name (e.g., Sub1.tpt) as the URL acquired from the extracted trigger information, accessing the TPT server 13 by controlling the communication I/F 61 and requesting the TPT file.

In step S77, the TPT analysis section 62 acquires the TPT file (e.g., Sub1.tpt) from the TPT server 13 by controlling the communication I/F 61.

In step S78, the control section 58 verifies whether the receiver 12 has the capability specified as the capability element of the TPT from the TPT analysis section 62. Here, if "avc_40" is specified as the capability element, it is verified whether the receiver 12 supports the capability to play back content compression-coded according to AVC level 4.0.

In step S79, the control section 58 determines, based on the verification result of step S78, whether the receiver 12 meets the requirement specified as the capability element. When it is determined in step S79 that the receiver 12 meets the requirement specified as the capability element, the process proceeds to step S75, and the TPT file is selected as a file to be stored.

On the other hand, if it is determined in step S79 that the receiver 12 does not meet the requirement specified as the capability element, the process proceeds to step S80. In step S80, the control section 58 verifies whether there is a next candidate TPT file.

When it is determined that there is a next candidate TPT file in step S80, the process returns to step S76 to repeat the subsequent processes. Here, for example, Sub2.tpt is specified as the URL as the next candidate TPT file name, and it is determined whether the requirement specified as the capability requirement of the acquired Sub2.tpt is met.

It should be noted that if it is determined that there is no next candidate TPT file in step S80, the process proceeds to step S81. In step S81, the control section 58 performs a given error handling. Then, the process returns to step S12 shown in FIG. 19 to repeat the subsequent processes.

This concludes the description of the TPT acquisition process. In the TPT acquisition process, when a new TPT file is acquired after domain_name or program_id has changed, that appropriate to the capability of the receiver 12 is acquired.

Thus far a description has been given of the first embodiment.

Second Embodiment

[Configuration Example of the Broadcasting System]

Figure 26:
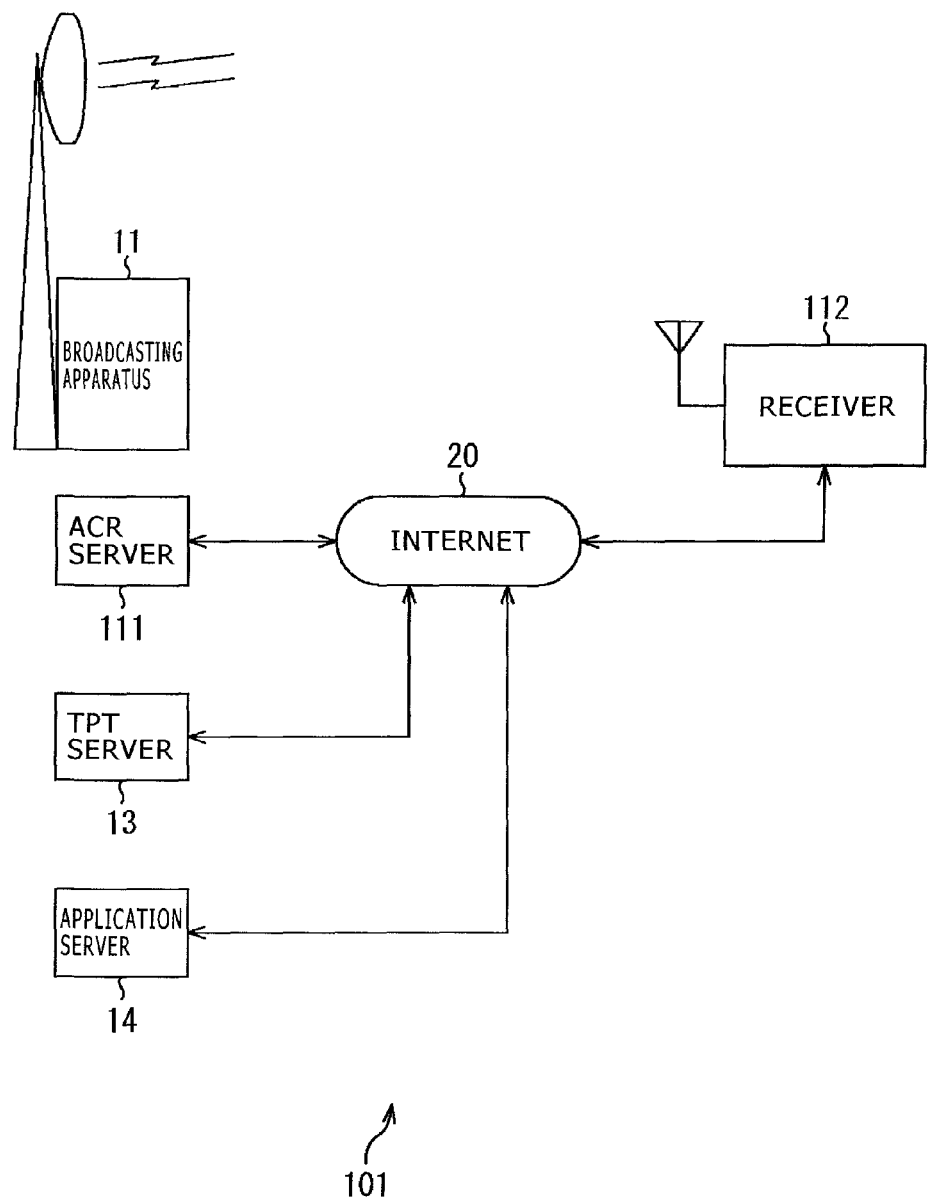
FIG. 26 is a diagram illustrating the configuration of an embodiment of the broadcasting system to which the present technology is applied.

FIG. 26 illustrates a broadcasting system 101 according to a second embodiment. The broadcasting system 101 includes the broadcasting apparatus 11, TPT server 13, application server 14, an ACR server 111 and receiver 112. On the other hand, TPT server 13, application server 14, ACR server 111 and receiver 112 are connected to each other via the Internet 20.

That is, the broadcasting system 101 shown in FIG. 26 differs from the broadcasting system 1 shown in FIG. 10 in that the ACR server 111 is provided anew and that the receiver 112 is provided rather than the receiver 12. Other components are identical to those shown in FIG. 10, and the description thereof will be omitted as appropriate.

The receiver 112 accesses the ACR server 111 via the Internet 20 on a regular basis, inquiring about trigger information. At that time, a feature quantity (hereinafter also referred to as fingerprint information (Finger Print)) extracted from either or both of video and audio signals of AV content such as television program is transmitted to the ACR server 111.

The ACR server 111 is provided by a broadcaster engaged in broadcasting television programs using the broadcasting apparatus 11 or other business operator. The ACR server 111 has a database in which feature quantities extracted from the video and audio signals of arbitrary AV content are registered, identifying AV content using ACR technology in response to an inquiry from the arbitrary receiver 112 connected to the Internet 20.

More specifically, the ACR server 111 checks the fingerprint information from the receiver 112 against the database, identifying the AV content and generating trigger information (ACR Response) appropriate to the identification result. The ACR server 111 transmits the generated trigger information to the receiver 112 via the Internet 20.

The receiver 112 accesses the TPT server 13 via the Internet 20 in accordance with the trigger information received from the ACR server 111, acquiring a TPT. The receiver 112 pinpoints the valid command based on the TPT acquired from the TPT server 13 if the time indicating the progress of AV content acquired from trigger information from the broadcasting apparatus 11 falls within the validity period or if the valid start time is exceeded.

The receiver 112 controls the operation of the data broadcasting application in accordance with the pinpointed command. Further, the receiver 112 acquires the data broadcasting application transmitted by a broadcasting wave in accordance with the pinpointed command. It should be noted, however, that the receiver 112 acquires the data broadcasting application by accessing the application server 14 via the Internet 20 if the receiver 112 fails to acquire the data broadcasting application transmitted by a broadcasting wave.

The broadcasting system 101 is configured as described above.

[Configuration Example of the Receiver]

Figure 27:
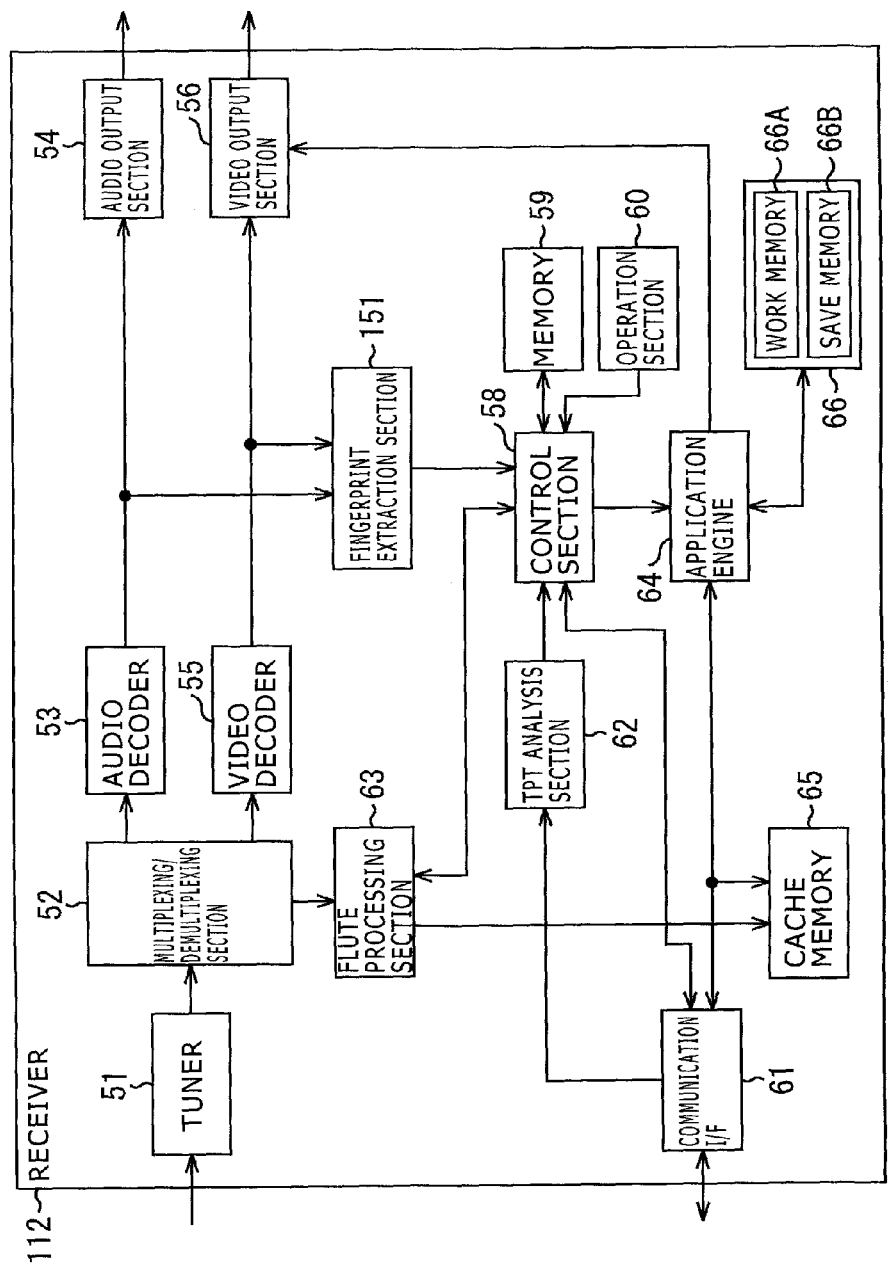
FIG. 27 is a diagram illustrating the configuration of an embodiment of the receiver to which the present technology is applied.

FIG. 27 illustrates a configuration example of the receiver 112 shown in FIG. 26.

The receiver 112 includes the components ranging from the tuner 51 to the application memory 66 as does the receiver 12 shown in FIG. 11. However, the receiver 112 differs from the receiver 12 shown in FIG. 11 in that a fingerprint extraction section 151 is provided rather than the trigger extraction section 57. In the receiver 112, like components to those of the receiver 12 shown in FIG. 11 are denoted by the same reference numerals, and the description thereof will be omitted as appropriate.

The fingerprint extraction section 151 is supplied with an audio signal from the audio decoder 53 and a video signal from the video decoder 55. The fingerprint extraction section 151 extracts a feature quantity from either or both of the audio and video signals, supplying the feature quantity to the control section 58 as fingerprint information.

The control section 58 transmits the fingerprint information from the fingerprint extraction section 151 to the ACR server 111 via the Internet 20 by controlling the communication I/F 61. On the other hand, the communication I/F 61 receives trigger information from the ACR server 111, supplying the trigger information to the control section 58.

The control section 58 accesses the TPT server 13 via the Internet 20 by controlling the communication I/F 61 in accordance with the acquired trigger information, requesting a TPT. The communication I/F 61 receives the TPT from the TPT server 13 via the Internet 20, supplying the TPT to the TPT analysis section 62. As a result, the TPT analysis section 62 stores the TPT in its internal memory (not shown), supplying the TPT stored in the memory to the control section 58 in response to a request.

Further, the control section 58 pinpoints the valid command based on the TPT from the TPT analysis section 62 if the time indicating the progress of AV content acquired from time information (media_time) contained in trigger information from the communication I/F 61 falls within the validity period of the command or if the valid start time is exceeded. The control section 58 controls, for example, the acquisition or registration of the data broadcasting application, acquisition or activation thereof, firing of an event, suspension of the data broadcasting application or termination thereof in accordance with the pinpointed command.

The receiver 112 is configured as described above.

[Correlation between Trigger Information and Commands]

A description will be given next of an example of a process adapted to pinpoint, using a TPT, a command correlated to trigger information acquired in accordance with fingerprint information. FIG. 28 is a diagram illustrating an example of correlation between trigger information and commands.

As illustrated in FIG. 28, after fingerprint information is extracted from a transport stream on a regular basis, the receiver 112 transmits the fingerprint information to the ACR server 111 ("ACR system" in FIG. 28). The ACR server 111 generates trigger information based on the fingerprint information from the receiver 112, transmitting the trigger information to the receiver 112.

After acquiring trigger information in accordance with fingerprint information extracted on a regular basis, the receiver 112 determines whether to acquire a TPT from the TPT server 13 based on either or both of domain_name and program_id included in the trigger information. For example, if the receiver 112 stores a TPT (for program A) for program A, and when the value of program_id included in the acquired trigger information changes, the receiver 112 accesses the TPT server 13 and acquires the TPT. As a result, the receiver 112 stores the TPT (for program B) shown in FIG. 28.

Of the processes adapted to pinpoint, using a TPT, the command correlated to media_time included in trigger information acquired in accordance with fingerprint information, that performed after the acquisition of trigger information is the same as that described with reference to FIG. 16. That is, it is determined whether media_time included in trigger information acquired in accordance with fingerprint information extracted on a regular basis falls within the validity period of each of the commands stored in the TPT (for program B), thus pinpointing a valid command.

As described above, if media_time included in trigger information acquired in accordance with fingerprint information extracted on a regular basis falls within the validity period, the receiver 112 controls the operation of the data broadcasting application in accordance with the valid command.

[Trigger Information Correlation Process]

A description will be given next of the trigger information correlation process performed when the receiver 112 receives trigger information.

(Trigger Information Correlation Process Appropriate to ACR Identification Result)

FIG. 29 is a flowchart illustrating the trigger information correlation process appropriate to ACR identification result.

When a given channel is selected by user operation, the receiver 112 starts to display the image of the television program of that channel (step S111).

In step S112, the fingerprint extraction section 151 waits until a given period of time elapses. Then, when the given period of time elapses, the process proceeds to step S113.

In step S113, the fingerprint extraction section 151 extracts a feature quantity (fingerprint information) from either or both of the audio and video signals.

In step S114, the control section 58 transmits the fingerprint information to the ACR server 111 by controlling the communication I/F 61 via the Internet 20, inquiring about trigger information.

Here, fingerprint information refers to information specific to the whole of AV content or some constituent elements thereof. A number of pieces of information specific to AV content are registered in advance in the ACR server 111. The ACR identification process determines the degree of similarity or match between these pieces of specific information. This ACR identification process provides two pieces of information, i.e., information adapted to identify the channel number of the television program (hereinafter referred to as channel identification information) and information indicating the time position at which fingerprint information is extracted when the period of time from the start to end of the television program is represented by the time axis (hereinafter referred to as time position information).

Further, two pieces of information, i.e., server pinpointing information adapted to pinpoint the TPT server 13 and content identification information adapted to identify AV content, are registered in advance in the ACR server 111, for example, in a manner correlated to channel identification information. The ACR server 111 acquires the server pinpointing information and content identification information correlated to the channel identification information acquired by the ACR identification process, generating trigger information (ACR Response) containing domain_name as server pinpointing information, program_id as content identification information and media_time as time position information acquired by the ACR identification information. The ACR server 111 transmits the generated trigger information to the receiver 112 via the Internet 20.

In step S115, the control section 58 determines, by controlling the communication I/F 61, whether trigger information has been received from the ACR server 111. If it is determined in step S115 that trigger information has yet to be received, the process returns to step S112 to repeat the subsequent processes. On the other hand, when it is determined in step S115 that trigger information has been received, the process proceeds to step S116.

If either or both of the domain_name and program_id included in the trigger information received from the ACR server 111 change in steps S116 to S123 as in steps S13 to S20 shown in FIG. 19, the TPT analysis section 62 acquires a TPT, and the acquired TPT is stored if it has yet to be acquired. On the other hand, when the control section 58 determines that media_time included in the received trigger information falls within the validity period, the operation of the data broadcasting application is controlled in accordance with that valid command.

It should be noted that if a data broadcasting application is acquired in the trigger information correlation process appropriate to ACR identification result, the Internet Location of the NRT-IT of NRT-IT appropriate to the application URL of the TPT is, as a general rule, pinpointed, and the SMT and NRT-IT are looked up in reverse so as to acquire a data broadcasting application to be transmitted by a FLUTE session. It should be noted, however, that if a data broadcasting application is acquired from the application server 14 via the Internet 20 if it cannot be acquired from a broadcasting wave.

Alternatively, as described earlier, the TPT acquisition process shown in FIG. 25 may be performed in step S117 so that a TPT file appropriate to the capability of the receiver 112 is acquired.

This concludes the description of the trigger information correlation process.

Thus far a description has been given of the second embodiment.

It should be noted that although the manners in which trigger information is acquired in the first and second embodiments differ, trigger information and TPT acquired by the receivers 12 and 112 are in the same form. Therefore, these embodiments may be used simultaneously as illustrated in FIG. 30.

On the other hand, an example has been described in which the plurality of servers, i.e., TPT server 13, application server 14 and ACR server 111, one for each capability provided, are available, all or some of these capabilities may be combined and supplied by a single or a plurality of servers.

[Specific Example of Operation]

A description will be given next of an example of operation that can be achieved by specifying each of the attributes of the tpt element of the TPT shown in FIG. 13 and operating the receiver 12 (receiver 112) with reference to FIGS. 31A to 34.

Figure 31A:
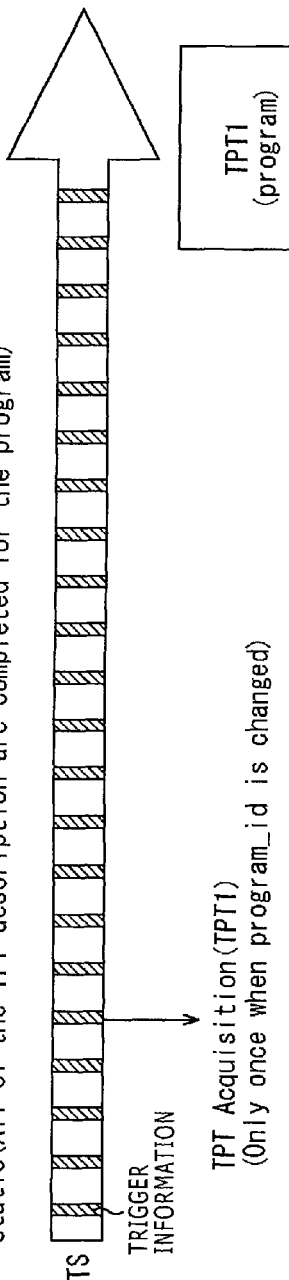
FIGS. 31A and 31B are diagrams describing a type attribute of a tpt element.
Figure 31B:
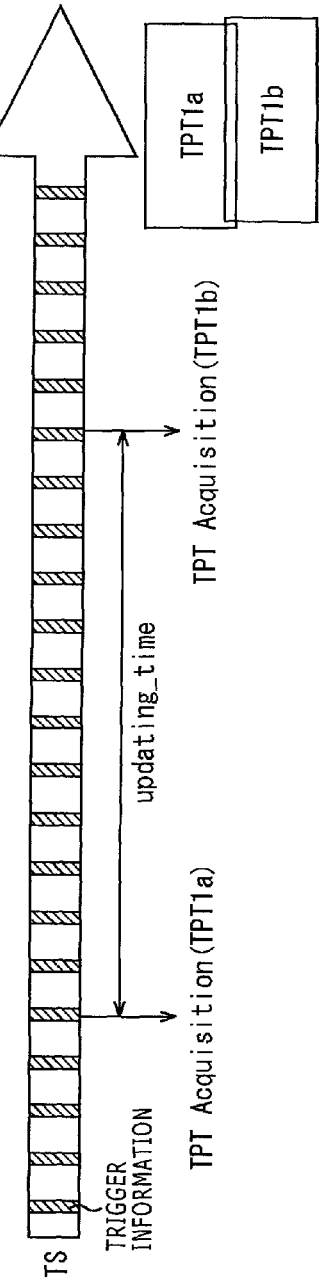

FIGS. 31A and 31B are diagrams describing the type attribute of the tpt element.

FIG. 31A illustrates the timing at which the TPT is updated when "static" is specified as the type attribute. For example, if the receiver 12 stores a TPT1 appropriate to the trigger information extracted from the transport stream of a television program, the TPT1 contains all the information required to control the operation of the data broadcasting application executed in the television program.

Therefore, there is no need to update the TPT1 unless program_id assigned to the television program is changed. However, if program_id is changed, a TPT appropriate to a new program_id is acquired to update the TPT1. As described above, if "static" is specified as the type attribute, the TPT is statically stored so long as program_id remains unchanged.

FIG. 31B illustrates the timing at which the TPT is updated when "dynamic" is specified as the type attribute. For example, if the receiver 12 stores a TPT1*a* appropriate to the trigger information extracted from the transport stream of a television program, the TPT1*a* contains part of the information required to control the operation of the data broadcasting application executed in the television program.

Therefore, after acquiring and storing the TPT1*a*, the receiver 12 acquires a TPT1*b* from the TPT server 13 and stores this TPT in accordance with the updating period indicated by updating_time of the tpt element of the TPT1*a*. As a result, even if program_id assigned to the television program is not changed, a TPT is acquired for updating purposes. In the examples shown in FIGS. 31A and 31B, the number or "1" in the TPT1*a* and TPT1*b* represents the program_id, and the alphabets or "a" and "b" represent the versions. That is, the TPT1*a* and TPT1*b* are TPTs with the same program_id but different versions. It should be noted that the version is specified with the version attribute of the tpt element.

On the other hand, the TPT1*a* and TPT1*b* are TPTs with different versions contain part of all the information required to control the operation of the data broadcasting application executed in that television program. Further, some of the information, for example, overlaps in the TPT1*a* and TPT1*b*. Assuming, for example, that the content of the TPT shown in FIG. 15 is all the information required to control the operation of the data broadcasting application executed in a television program, the TPT1*a* contains the command elements whose id attributes are 1 to 4, and the TPT1*b* the command elements whose id attributes are 4 to 12. That is, in the case of this example, the TPT1*a* and TPT1*b* contain, as overlapping content, the command element whose id attribute is 4.

As described above, if "dynamic" is specified as the type attribute, a TPT appropriate to a new version is acquired for updating purposes even when the program_id assigned to a television program remains unchanged. That is, a TPT is dynamically stored irrespective of whether the program_id is changed.

It should be noted that "dynamic" is probably specified as the type attribute, for example, if a single program_id is assigned to a channel, that is, if, although it is possible to recognize different channels, it is not possible to recognize different programs broadcast by that channel.

A description will be given next of a specific example of operation when "static" or "dynamic" is specified as the type attribute.

Figure 32:
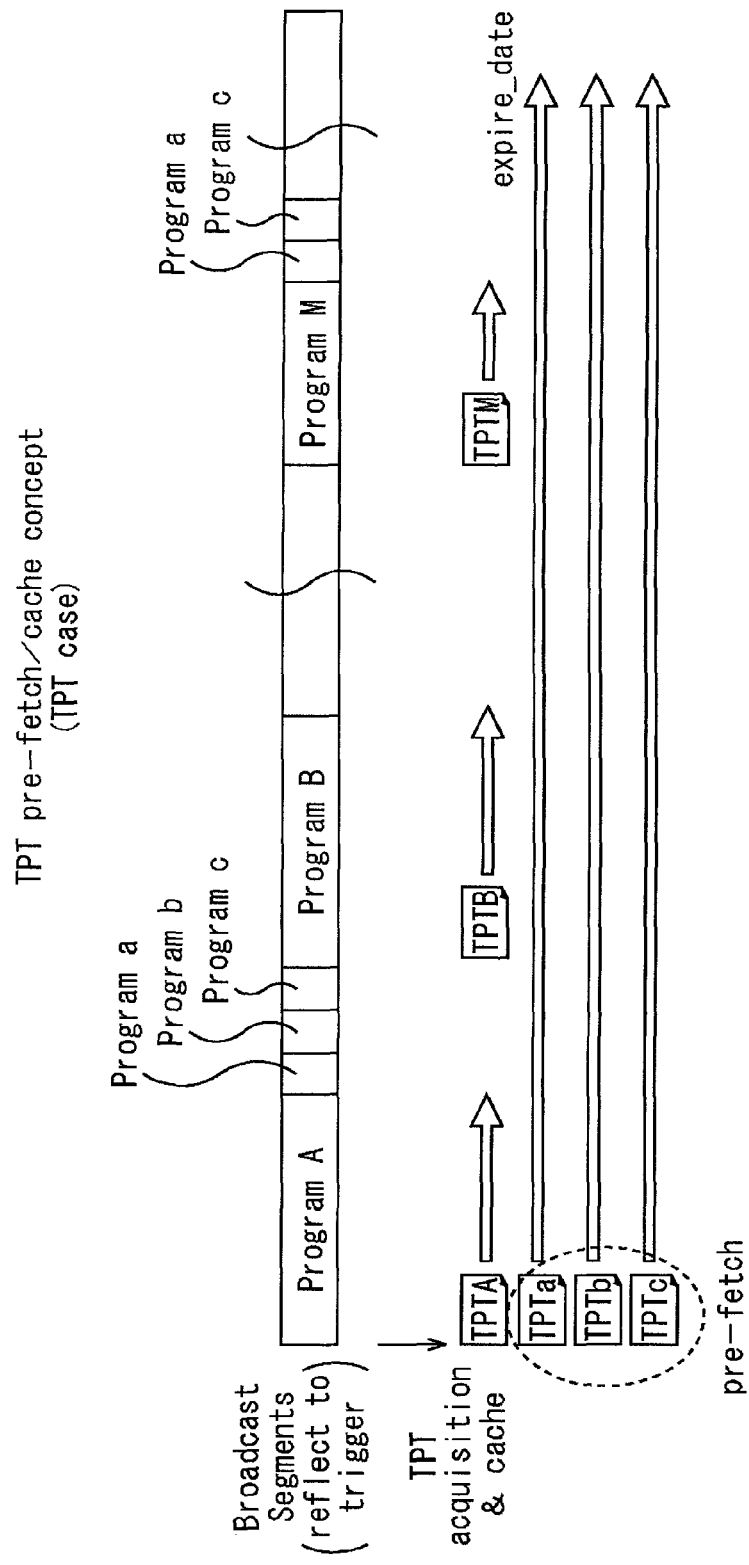
FIG. 32 is a diagram describing an example of operation when "static" is specified as the type attribute.

FIG. 32 is a diagram describing an example of operation when "static" is specified as the type attribute.

In the operation example shown in FIG. 32, the receiver 12 can acquire necessary TPTs all together from the TPT server 13 if the broadcaster has already finalized not only the time schedule for broadcasting television programs and commercials but also the required TPTs.

For example as illustrated in FIG. 32, we assume that commercials, i.e., Programs a, b and c, are inserted between television programs, i.e., Programs A and B. In this case, each of the commercials is broadcast for a short period of time or 15 or 30 seconds. Therefore, if a TPT is acquired after the broadcasting of a commercial has started, the data broadcasting application may fail to be activated in time. For this reason, when acquiring a TPTA for a television program, i.e., Program A, the receiver 12 acquires a TPTa for a commercial, i.e., Program a, a TPTb for another commercial, i.e., Program b, and a TPTc for still another commercial, i.e., Program c, all together and stores these TPTs.

As a result, when a television program, i.e., Program A, is switched over to a commercial, i.e., Program a, the receiver 12 can pinpoint the command appropriate to media_time included in the trigger information extracted based on the TPTa stored in advance, controlling the operation of the data broadcasting application in accordance with the pinpointed command.

On the other hand, commercials are broadcast repeatedly for a given period of time such as one month. If this period of time is specified as the expire_date attribute of the tpt element in the TPTa, TPTb and TPTc, the receiver 12 stores the TPTa, TPTb and TPTc for that specified period of time. As a result, if the commercials, i.e., Program a and Program b, are inserted in a television program, i.e., Program M, the receiver 12 can pinpoint the command appropriate to media_time included in the trigger information extracted based on the stored TPTa and TPTc so long as media_time falls within the validity period specified by the expire_date attribute.

Incidentally, a description has been given of the method (hereinafter referred to as method 1) adapted to operate a data broadcasting application by pinpointing a valid command if the time indicated by media_time included in trigger information falls within the validity period defined by the start_time attribute and end_time attribute of the command element of TPT. In method 1, however, the command is pinpointed based on the timing at which trigger information is extracted. Therefore, the command can be executed only when trigger information is extracted. Therefore, the longer the intervals at which trigger information is extracted, the more likely it is that the command may not be executed at a proper timing. For this reason, another method (hereinafter referred to as method 2) may be used in which the receiver 12 counts the time indicating the progress of AV content based on media_time included in trigger information so as to pinpoint the command when the internal time count reaches the validity period.

Here, the internal clock capability of the receiver 12 adapted to count the time indicating the progress of AV content is referred to as a media clock. That is, the receiver 12 generates a media clock by using media_time included in trigger information as reference information.

It should be noted that when methods 1 and 2 are compared, method 2 allows for execution of a command at a more proper timing. However, the receiver 12 must perform various operations for a media clock, thus putting more burden on the receiver 12 than method 1 does. It is, therefore, desirable to determine which of the two methods to select in accordance with the priority for command execution timing, processing capability of the receiver 12 and other conditions. On the other hand, no matter which of the two methods is selected, the form of trigger information received by the receiver 12 remains unaffected. Therefore, whether the receiver 12 selects method 1 or 2 is irrelevant, for example, to the broadcaster providing the broadcasting apparatus 11.

Figure 33:
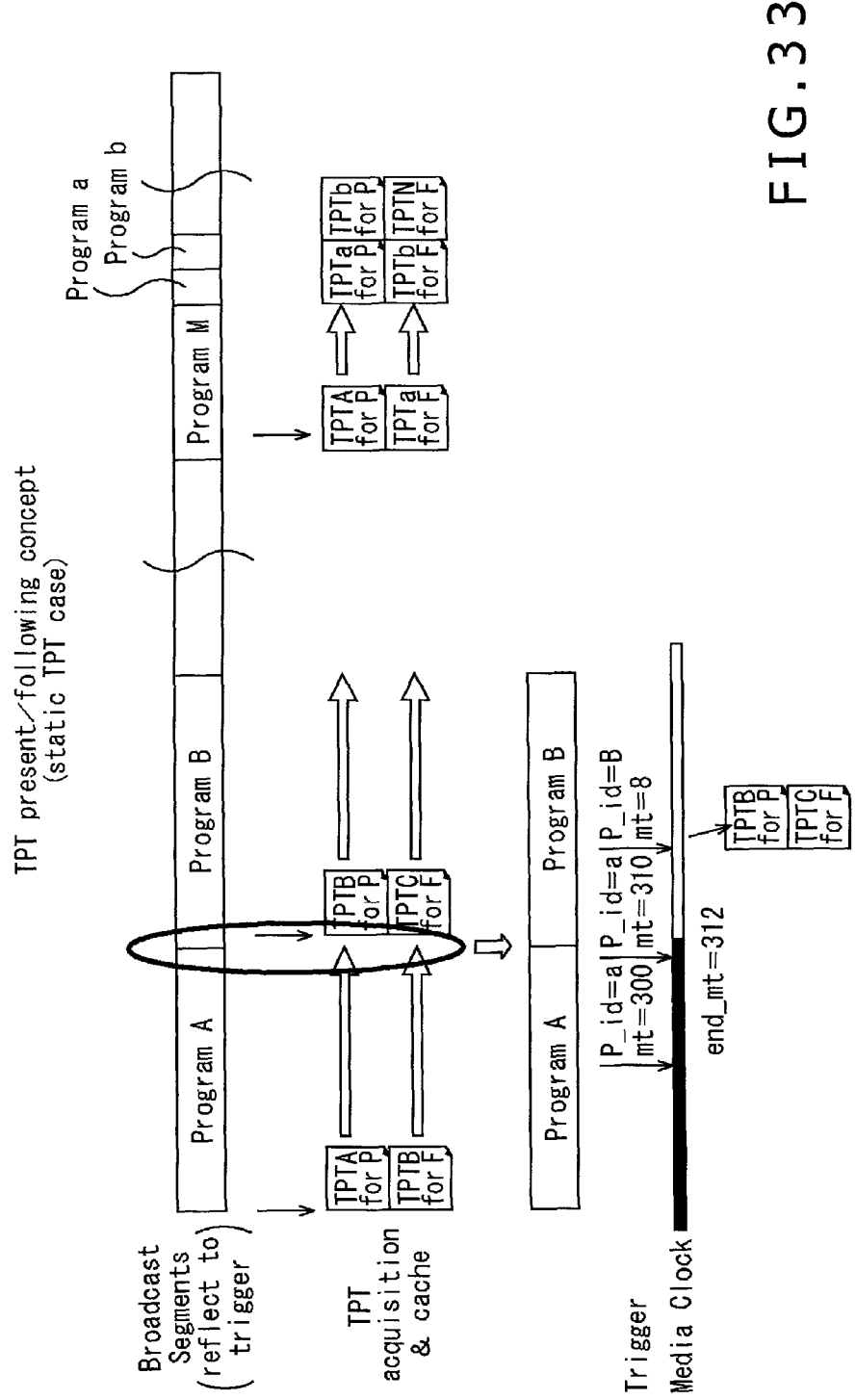
FIG. 33 is a diagram describing an example of operation when "static" is specified as the type attribute.

FIG. 33 is a diagram describing an example of operation when "static" is specified as the type attribute.

In the operation example shown in FIG. 33, a TPT for a television program and a TPT for a next television program can be acquired as a pair if the broadcaster has already finalized not only the time schedule for broadcasting television programs and commercials but also the required TPTs.

For example as illustrated at the top in FIG. 33, we assume that a television program, i.e., Program A, is broadcast first, followed by another television program, i.e., Program B, which is followed by still another television program, i.e., Program C. In this case, when acquiring a TPTA for a television program, i.e., Program A, the receiver 12 also acquires a TPTB for a television program to be broadcast next, i.e., Program B.

Then, the receiver 12 stores the acquired TPTA for the current television program and the acquired TPTB for the next television program. These TPTs are distinguished one from the other by the present_following attribute of the tpt element. That is, "present" is specified as the present_following attribute in the TPTA (TPTA for P in FIG. 33), and "following" as the present_following attribute in the TPTB (TPTB for F in FIG. 33).

Further, when receiving a television program, i.e., Program B, the receiver 12 acquires and stores a TPTC for a television program to be broadcast next, i.e., Program C. At this time, "present" is specified as the present_following attribute in the TPTB (TPTB for P in FIG. 33), and "following" as the present_following attribute in the TPTC (TPTC for F in FIG. 33).

Here, the details of the process performed during switching from one television program, i.e., Program A, over to another television program, i.e., Program B, are shown at the bottom in FIG. 33.

In this example, first trigger information (program_id=a, media_time=300) and second trigger information (program_id=a, media_time=310) are sequentially extracted as trigger information from the transport stream of a television program, i.e., Program A, prior to the switching. Further, third trigger information (program_id_b, media_time=8) is extracted as trigger information from the transport stream of a television program, i.e., Program B, immediately after the switching. It should be noted that a television program, i.e., Program A, and a television program, i.e., Program B, are provided by the same broadcaster. Therefore, the domain_name is the same. As a result, the description thereof is omitted.

On the other hand, the receiver 12 stores the TPTA (TPTA for P in FIG. 33) and TPTB (TPTB for F in FIG. 33) as a pair as described earlier. Further, 312nd second is specified as the end_mt attribute of the tpt element in the TPTA. As a result, the television program, i.e., Program A, ends at the media_time of 312nd second.

In FIG. 33, the receiver 12 is operating according to method 2 described earlier, counting the time on the media clock of the television program, i.e., Program A, based on media_time included in the trigger information. Therefore, the receiver 12 can recognize that the television program, i.e., Program A, ends when the time indicated by the media clock of the television program, i.e., Program A, reaches 312th second that is specified as the end_mt attribute. At this time, the receiver 12 switches the TPT for the current television program from the TPTA over to the TPTB. Further, the receiver 12 starts counting from 0th second as a media clock of the television program, i.e., Program B. As a result, the receiver 12 pinpoints the valid command if the time indicated by the media clock of the television program, i.e., Program B, falls within the command validity period of the TPTB immediately after the switching between the television programs.

That is, if the present_following attribute and end_mt attribute are not specified, even if Program A is switched over to Program B, i.e., a television program, the time is counted on the media clock of the television program, i.e., Program A, until third trigger information is extracted, making it impossible to control the operation of the data broadcasting application for the television program, i.e., Program B. In the example shown in FIG. 33, for example, the time cannot be counted on the media clock of the television program, i.e., Program B, for the period of time from the switching over to the television program, i.e., Program B, to eighth second indicated by media_time. For this reason, the end_mt attribute is specified in the example shown at the bottom in FIG. 33 so that the time is counted on the media clock of the switched-over television program immediately after the switching, thus making it possible to precisely control the operation of the data broadcasting application.

It should be noted that although the switching from one television program to another was described with reference to the example at the bottom in FIG. 33, the same is true for the switching from a television program to a commercial. An example is shown at the top in FIG. 33 in which a television program, i.e., Program M, is switched over to a commercial, i.e., Program a, and the commercial, i.e., Program a, is further switched over to another commercial, i.e., Program b. Similarly in this case, the present_following attribute and end_mt attribute are specified so that the time is counted on the media clock of the switched-over commercial, for example, immediately after the switching to the commercial, thus making it possible to precisely control the operation of the data broadcasting application for the commercial.

Figure 34:
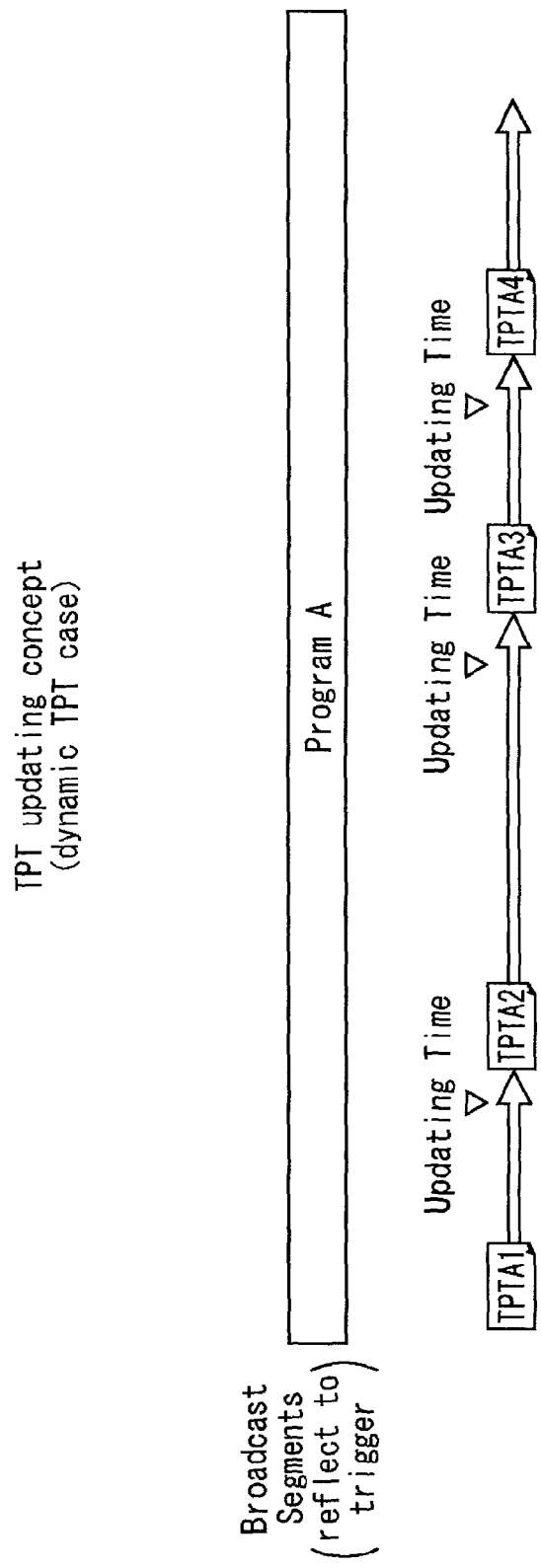
FIG. 34 is a diagram describing an example of operation when "dynamic" is specified as the type attribute.

FIG. 34 illustrates an example of operation when "dynamic" is specified as the type attribute.

In the operation example shown in FIG. 34, for example, the updating_time attribute of the tpt element is specified to update the TPT if a single program_id is assigned to a channel.

It is impossible to predict which data broadcasting application to operate next in a live program. Therefore, it is probable that the broadcaster may operate the receiver 12 so that the receiver acquires a TPT that contains, for example, the parameters for use from a given point in time to one minute later first, and then acquires another TPT that contains, for example, the parameters for use till one more minute later.

As illustrated in FIG. 34, when a live program, i.e., Program A, is selected, the receiver 12 acquires a TPTA1 from the TPT server 13 and stores this TPT. The updating_time attribute of the tpt element is specified in the TPTA1 so that the receiver 12 acquires a TPTA2 from the TPT server 13 and stores this TPTA2 in accordance with the time indicated by the updating_time attribute. As a result, even if a program_id is not changed, the receiver 12 acquires a TPT for updating purposes in accordance with the updating period indicated by the updating_time attribute.

Similarly, the receiver 12 acquires a TPTA3 from the TPT server 13 and stores this TPTA3 in accordance with the time indicated by the updating_time attribute of the stored TPTA2. Further, the receiver 12 acquires a TPTA4 from the TPT server 13 and stores this TPTA4 in accordance with the time indicated by the updating_time attribute of the stored TPTA3.

This makes it possible to update a TPT as appropriate in accordance with the progress of a program even if the program is, for example, live, whose future content is impossible to predict.

It should be noted that the alphabet or "A" in the TPTA1, TPTA2, TPTA3 and TPTA4 represents the program_id, and the numbers or "1," "2," "3" and "4" represent the versions. As described above, the TPTs are managed by versions. Therefore, if the receiver 12 attempts to acquire a TPT of a next version from the TPT server 13 in accordance with the time indicated by the updating_time attribute and fails to do so, the receiver 12 need only attempt to acquire the TPT of the next version again when next trigger information is extracted. A probable case in which the receiver 12 might fail to acquire a TPT of a next version would be if the TPT of the next version is not ready at the TPT server 13.

Thus far a description has been given of specific example of operation.

[Description of the Computer to Which the Present Technology is Applied]

The above series of processes may be performed by hardware or software. If the series of processes are performed by software, the program making up the software is installed to a computer. Here, the computer includes not only a computer incorporated in dedicated hardware but also, for example, a general-purpose personal computer capable of performing various functions when installed with various programs.

FIG. 35 illustrates a hardware configuration example of computer adapted to perform the above series of processes using a program.

In a computer 300, a CPU (Central Processing Unit) 301, ROM (Read Only Memory) 302 and RAM (Random Access Memory) 303 are connected to each other via a bus 304.

An I/O interface 305 is further connected to the bus 304. An input block 306, output block 307, recording block 308, communication block 309 and drive 310 are connected to the I/O interface 305.

The input block 306 includes, for example, a keyboard, mouse and microphone. The output block 307 includes, for example, a display and speaker. The recording block 308 includes, for example, a hard disk and non-volatile memory. The communication block 309 includes, for example, a network interface. The drive 310 drives a removable media 311 such as magnetic disk, optical disk, magneto-optical disk, or semiconductor memory.

In the computer 300 configured as described above, the CPU 301 loads the program stored in the recording block 308 into the RAM 303 for execution via the I/O interface 305 and bus 304, thus performing the above series of processes.

The program executed by the computer 300 (CPU 301) can be supplied by being recorded, for example, on the removable media 311 serving, for example, as a package media. Alternatively, the program can be supplied via a wired or wireless transmission medium such as local area network, the Internet or digital satellite broadcasting.

In the computer 300, the program is installed into the recording block 308 via the I/O interface 305 by loading the removable media 311 into the drive 310. Alternately, the program may be installed into the recording block 308 by being received by the communication block 309 via the wired or wireless transmission medium. Further, the program may be installed in advance in the ROM 302 or recording block 308.

It should be noted that the program executed by the computer 300 may perform the processes chronologically according to the sequence described in the present specification or perform the processes in parallel or when necessary as when invoked.

Here, in the present specification, the processing steps for writing the program adapted to cause the computer 300 to perform various processes need not necessarily perform the processes chronologically according to the sequence described in the flowcharts. Instead, the processing steps include those executed in parallel or separately (e.g., parallel processes and processes using objects).

On the other hand, the program may be run on a single computer or on a plurality of computers in a distributed manner. Further, the program may be transferred to a remote computer for execution.

Further, the term "system" in the present specification refers to a collection of a plurality of components (e.g., devices and modules (parts)) irrespective of whether all the components are housed in the same enclosure. Therefore, a plurality of devices, each housed in a separate enclosure and connected to each other via a network, and a single device whose plurality of modules are housed in a single enclosure, are both systems.

It should be noted that the embodiments of the present technology are not limited to those described above and may be modified in various ways without departing from the scope of the present technology.

For example, the present technology may be available in the form of cloud computer designed to process a function in a shared and collaborative manner among a plurality of devices.

Further, the steps described in the flowcharts may be performed not only by a single device but also by a plurality of devices in a shared manner.

Still further, if a single step includes a plurality of processes, the plurality of processes included in the single step may be performed not only by a single device but also by a plurality of devices in a shared manner.

It should be noted that the present technology may be configured as described below.

(1)

A receiver including:

a reception section operable to receive AV content transmitted by a broadcasting wave;

a trigger acquisition section operable to acquire trigger information adapted to operate an application program to be executed in response to the received AV content;

a table acquisition section operable to acquire a correlation table correlating the trigger information to commands adapted to control the operation of the application program;

an application acquisition section operable to acquire, based on the acquired correlation table, the application program transmitted by the broadcasting wave when the command correlated to the trigger information indicates the acquisition of the application program; and a control section operable to control the operation of the acquired application program in accordance with the command correlated to the trigger information.

(2)

The receiver of (1), wherein the application program is transmitted as NRT (Non-RealTime) content for NRT service using a FLUTE (File Delivery over Unidirectional Transport) session, and the application acquisition section refers to an FDT (File Delivery Table) pinpointed by an SMT (Service Map Table) and NRT-IT (NRT Information Table) based on source information indicating the source of the application program written in the correlation table so as to acquire the application program transmitted using a FLUTE session.

(3)

The receiver of (2), wherein the control section verifies whether the receiver has necessary capability to operate the application program to be acquired, and the application acquisition section acquires the application program transmitted using a FLUTE session when the receiver has capability to operate the application program.

(4)

The receiver of (2) or (3), wherein the application acquisition section acquires the application program delivered via the Internet based on the source information written in the NRT-IT if the application program transmitted using a FLUTE session cannot be acquired.

(5)

The receiver of any of (2) to (4), wherein the correlation table correlates the command to the validity time of the command, and if it is found that the time indicating the progress of the AV content acquired from the trigger information satisfies a given validity condition set with reference to the validity time of the command based on the correlation table, the control section controls the operation of the acquired application program in accordance with the valid command.

(6)

The receiver of any of (2) to (5), wherein the trigger information is transmitted by the broadcasting wave, and the trigger acquisition section acquires the trigger information transmitted by the broadcasting wave.

(7)

The receiver of any of (2) to (6) further including:

a feature quantity extraction section operable to extract a feature quantity from data of the received AV content, wherein the trigger acquisition section acquires the trigger information appropriate to the identification result of the AV content identified using the extracted feature quantity.

(8)

The receiver of any of (2) to (7), wherein the control section verifies whether the receiver has necessary capability to operate the application program to be acquired based on the acquired correlation table, and the table acquisition section acquires a correlation table different from the acquired correlation table if the receiver does not have capability to operate the application program.

(9)

The receiver of (8), wherein the table acquisition section acquires the correlation table in accordance with the priority set in advance for acquiring the correlation table.

(10)

The receiver of (2) to (4), wherein at least not only identification information of the NRT service but also an IP address and port number used for the transmission of the NRT content are written in the SMT, at least not only identification information of the NRT service and NRT content but also the source information of the application program are written in the NRT-IT, at least not only identification information of the NRT content but also a TOI (Transport Object Identifier) are written in the FDT, the application acquisition section refers to the NRT-IT to pinpoint the identification information of the NRT service and NRT content correlated to the source information matching that written in the correlation table, the application acquisition section refers to the SMT to pinpoint the FDT from a FLUTE session of a TSI (Transport Session Identifier) pinpointed by a combination of the IP address and port number correlated to the identification information matching that of the pinpointed NRT service, and the application acquisition section refers to the FDT to acquire the application program based on an object identified by the TOI correlated to the identification information matching that of the pinpointed NRT content.

(11)

The receiver of any of (1) to (10), wherein the command indicates one of acquisition or registration of the application program, acquisition or activation thereof, firing of an event, suspension of the application program or termination thereof in accordance with the command, and the control section controls the acquisition or registration of the application program, acquisition or activation thereof, firing of an event in the application program under execution, suspension of the application program under execution or termination thereof in accordance with the command.

(12)

A reception method of a receiver, the reception method including the steps of the receiver:

receiving AV content transmitted by a broadcasting wave;

acquiring trigger information adapted to operate an application program to be executed in response to the received AV content;

acquiring a correlation table correlating the trigger information to commands adapted to control the operation of the application program;

acquiring, based on the acquired correlation table, the application program transmitted by the broadcasting wave if the command correlated to the trigger information indicates the acquisition of the application program; and controlling the operation of the acquired application program in accordance with the command correlated to the trigger information.

(13)

A program for causing a computer to serve as:

a reception section operable to receive AV content transmitted by a broadcasting wave;

a trigger acquisition section operable to acquire trigger information adapted to operate an application program to be executed in response to the received AV content;

a table acquisition section operable to acquire a correlation table correlating the trigger information to commands adapted to control the operation of the application program;

an application acquisition section operable to acquire, based on the acquired correlation table, the application program transmitted by the broadcasting wave when the command correlated to the trigger information indicates the acquisition of the application program; and a control section operable to control the operation of the acquired application program in accordance with the command correlated to the trigger information.

(14)

An information processing system including:

a receiver;

a first information processor; and a second information processor, wherein the receiver includes a reception section operable to receive AV content transmitted by a broadcasting wave, a trigger acquisition section operable to acquire trigger information adapted to operate an application program to be executed in response to the received AV content transmitted by the broadcasting wave, a table acquisition section operable to acquire, from the first information processor, a correlation table correlating the trigger information to commands adapted to control the operation of the application program, an application acquisition section operable to acquire, based on the acquired correlation table, the application program transmitted by the broadcasting wave when the command correlated to the trigger information indicates the acquisition of the application program, and a control section operable to control the operation of the acquired application program in accordance with the command correlated to the trigger information, the application acquisition section acquires the application program from the second information processor if the application program transmitted by the broadcasting wave cannot be acquired, the first information processor includes a first provision section operable to provide the correlation table in response to an inquiry from the receiver, and the second information processor includes a second provision section operable to provide the application program in response to an inquiry from the receiver.

(15)

An information processing system including:

a receiver;

a first information processor;

a second information processor; and a third information processor, wherein the receiver includes a reception section operable to receive AV content transmitted by a broadcasting wave, a feature quantity extraction section operable to extract a feature quantity from data of the received AV content, a trigger acquisition section operable to acquire trigger information adapted to operate an application program to be executed in response to the received AV content, the trigger information being appropriate to the identification result of the AV content identified by the first information processor using the feature quantity, a table acquisition section operable to acquire, from the second information processor, a correlation table correlating the trigger information to commands adapted to control the operation of the application program, an application acquisition section operable to acquire, based on the acquired correlation table, the application program transmitted by the broadcasting wave when the command correlated to the trigger information indicates the acquisition of the application program, and a control section operable to control the operation of the acquired application program in accordance with the command correlated to the trigger information, the application acquisition section acquires the application program from the third information processor if the application program transmitted by the broadcasting wave cannot be acquired, the first information processor includes a first provision section operable to provide the trigger information appropriate to the identification result of the AV content identified using the feature quantity from the receiver, the second information processor includes a second provision section operable to provide the correlation table in response to an inquiry from the receiver, and the third information processor includes a third provision section operable to provide the application program in response to an inquiry from the receiver.

It should be understood by those skilled in the art that various modifications, combinations, sub-combinations and alternations may occur depending on design requirements and other factors insofar as they are within the scope of the appended claims or the equivalent thereof.

What is claimed is:

1. A receiver comprising:
receiving circuitry configured to receive a broadcast signal including audio/video (AV) content and application information, the application information indicating a uniform resource locator (URL) for obtaining application event information and indicating an elapsed time of the AV content, the application event information including one or more events each associated with an action to be taken by an application which is executed concurrently with display of the AV content; and
processing circuitry configured to
process the broadcast signal to display the AV content,
download the application event information using the URL indicated by the application information, and
execute the application in synchronization with the one or more events included in the application event information based on the elapsed time of the AV content indicated in the application information with the URL,
wherein each of the one or more events is associated with a validity time of the respective event, and when the elapsed time indicating a progress of the AV content acquired from the broadcast signal satisfies a given validity condition set with reference to the validity time of one of the one or more events, the processing circuitry is configured to execute the application in accordance with the valid one of the one or more events.

2. The receiver of claim 1, wherein
the application is transmitted as Non-RealTime content for Non-RealTime service using a File Delivery over Unidirectional Transport session, and
the processing circuitry is configured to refer to a File Delivery Table pinpointed by a Service Map Table and Non-RealTime Information Table based on source information indicating a source of the application written in the application event information so as to acquire the application transmitted using the File Delivery over Unidirectional Transport session.

3. The receiver of claim 2, wherein the processing circuitry is configured to
verify whether the receiver has necessary capability to execute the application, and
acquire the application transmitted using the File Delivery over Unidirectional Transport session when the receiver has the capability to operate the application.

4. The receiver of claim 3, wherein the processing circuitry is configured to acquire the application via the Internet based on the source information written in the Non-RealTime Information Table when the application transmitted using the File Delivery over Unidirectional Transport session cannot be acquired.

5. The receiver of claim 1, wherein the processing circuitry is configured to
verify whether the receiver has necessary capability to execute the application based on the downloaded application event information, and
download another application event information different from the downloaded application event information when the receiver does not have the capability to operate the application.

6. The receiver of claim 5, wherein the processing circuitry is configured to download the application event information or the other application event information in accordance with a priority set in advance for downloading the application event information.

7. The receiver of claim 2, wherein
at least not only identification information of the Non-RealTime service but also an IP address and port number used for the transmission of the Non-RealTime content are written in the Service Map Table,
at least not only identification information of the Non-RealTime service and Non-RealTime content but also the source information of the application are written in the Non-RealTime Information Table,
at least not only identification information of the Non-RealTime content but also a Transport Object Identifier are written in the File Delivery Table, and
the processing circuitry is configured to
refer to the Non-RealTime Information Table to pinpoint the identification information of the Non-RealTime service and Non-RealTime content correlated to the source information matching that written in the application event information,
refer to the Service Map Table to pinpoint the File Delivery Table from a File Delivery over Unidirectional Transport session of a Transport Session Identifier pinpointed by a combination of the IP address and port number correlated to the identification information matching that of the pinpointed Non-RealTime service, and
refer to the File Delivery Table to acquire the application based on an object identified by the Transport Object Identifier correlated to the identification information matching that of the pinpointed Non-RealTime content.

8. The receiver of claim 1, wherein
the action associated with an event of the one or more events is one of acquisition or registration of the application, acquisition or activation thereof, firing of the one of the one or more events, suspension of the application or termination thereof, and
the processing circuitry is configured to control the acquisition or registration of the application, acquisition or activation thereof, firing of the one of the one or more events in the application under execution, suspension of the application under execution or termination thereof in accordance with the action associated with the event of the one or more events.

9. The receiver of claim 1, wherein the processing circuitry is configured to select one of the one or more events based on the elapsed time indicated in the application information.

10. The receiver of claim 1, wherein the application information includes the URL.

11. The receiver of claim 1, wherein the processing circuitry is configured to poll a server using the URL to download the application event information when the audio/video content corresponds to a live television program.

12. A reception method of a receiver, the reception method comprising:
receiving a broadcast signal including audio/video (NV) content and application information, the application information indicating a uniform resource locator (URL) for obtaining application event information and indicating an elapsed time of the AV content, the application event information including one or more events each associated with an action to be taken by an application which is executed concurrently with display of the AV content;
processing the broadcast signal to display the AV content;

downloading, by processing circuitry of the receiver, the application event information using the URL indicated by the application information; and executing, by the processing circuitry of the receiver, the application in synchronization with the one or more events included in the application event information based on the elapsed time of the AV content indicated in the application information with the URL, wherein each of the one or more events is associated with a validity time of the respective event, and when the elapsed time indicating a progress of the AV content acquired from the broadcast signal satisfies a given validity condition set with reference to the validity time of one of the one or more events, the processing circuitry is configured to execute the application in accordance with the valid one of the one or more events.

13. The reception method of claim 12, wherein the application information includes the URL.

14. The reception method of claim 12, wherein the downloading comprises:

polling a server using the URL to download the application event information when the audio/video content corresponds to a live television program.

15. A non-transitory computer-readable storage medium storing a program for causing a computer to:

receive a broadcast signal including audio/video (NV) content and application information, the application information indicating a uniform resource locator (URL) for obtaining application event information and indicating an elapsed time of the AV content, the application event information including one or more events each associated with an action to be taken by an application which is executed concurrently with display of the AV content;

process the broadcast signal to display the AV content;

download the application event information using the URL indicated by the application information; and execute the application in synchronization with the one or more events included in the application event information based on the elapsed time of the AV content indicated in the application information with the URL, wherein each of the one or more events is associated with a validity time of the respective event, and when the elapsed time indicating a progress of the AV content acquired from the broadcast signal satisfies a given validity condition set with reference to the validity time of one of the one or more events, the processing circuitry is configured to execute the application in accordance with the valid one of the one or more events.

16. The non-transitory computer-readable storage medium of claim 15, wherein the application information includes the URL.

17. The non-transitory computer-readable storage medium of claim 15, wherein the program causes the computer to poll a server using the URL to download the application event information when the audio/video content corresponds to a live television program.

18. A television, comprising:

a display;

receiving circuitry configured to receive a broadcast signal including audio/video (AV) content and application information, the application information indicating a uniform resource locator (URL) for obtaining application event information and indicating an elapsed time of the AV content, the application event information including one or more events each associated with an action to be taken by an application which is executed concurrently with output of the AV content to the display; and processing circuitry configured to process the broadcast signal to display the AV content, download the application event information using the URL indicated by the application information, and execute the application in synchronization with the one or more events included in the application event information based on the elapsed time of the AV content indicated in the application information with the URL, wherein each of the one or more events is associated with a validity time of the respective event, and when the elapsed time indicating a progress of the AV content acquired from the broadcast signal satisfies a given validity condition set with reference to the validity time of one of the one or more events, the processing circuitry is configured to execute the application in accordance with the valid one of the one or more events.

\* \* \* \* \*